United States Patent [19]
Oizumi et al.

[11] Patent Number: 5,270,866
[45] Date of Patent: Dec. 14, 1993

[54] COMPACT ZOOM LENS

[75] Inventors: Kouji Oizumi; Keiji Ikemori; Yasuhisa Sato, all of Kanagawa; Yasuyuki Yamada, Tokyo; Hiroki Nakayama; Takashi Matsushita, both of Kanagawa, all of Japan

[73] Assignee: Canon Kabushiki Kaisha, Tokyo, Japan

[21] Appl. No.: 797,165

[22] Filed: Nov. 26, 1991

Related U.S. Application Data

[63] Continuation of Ser. No. 580,351, Sep. 7, 1990, abandoned, which is a continuation of Ser. No. 187;277, Apr. 28, 1988, abandoned, which is a continuation-in-part of Ser. No. 73,688, Jul. 15, 1987, abandoned.

[30] Foreign Application Priority Data

Jul. 18, 1986 [JP] Japan .................. 61-169382
Apr. 28, 1987 [JP] Japan .................. 62-105644
Sep. 11, 1987 [JP] Japan .................. 62-227734

[51] Int. Cl.$^5$ .................. G02B 15/14; G02B 15/177
[52] U.S. Cl. .................. 359/689; 359/676; 359/683
[58] Field of Search .................. 350/426, 427, 423; 359/676, 682, 686, 689, 784

[56] References Cited

U.S. PATENT DOCUMENTS

| | | | |
|---|---|---|---|
| 3,973,831 | 8/1976 | Minoura | 359/679 |
| 4,054,371 | 10/1977 | Yasukuni | 359/686 X |
| 4,168,110 | 9/1979 | Itoh | 350/426 |
| 4,198,127 | 4/1980 | Itoh | 359/689 X |
| 4,303,311 | 12/1981 | Nakamura | 350/427 |
| 4,509,833 | 4/1985 | Ikemori | 350/427 |
| 4,571,031 | 2/1986 | Kato | 350/426 |
| 4,586,793 | 5/1986 | Tanaka et al. | 350/426 |
| 4,636,040 | 1/1987 | Tokumaru | 350/427 |
| 4,653,873 | 3/1987 | Kawamura | 350/426 |
| 4,733,952 | 3/1988 | Fujioka | 350/426 |
| 4,781,446 | 11/1988 | Tanaka et al. | 350/426 |
| 4,859,040 | 8/1989 | Kitagishi et al. | 350/426 |
| 4,936,661 | 6/1991 | Betensky et al. | 359/692 |

Primary Examiner—Bruce Y. Arnold
Assistant Examiner—David R. Parsons
Attorney, Agent, or Firm—Fitzpatrick, Cella, Harper & Scinto

[57] ABSTRACT

A zoom lens comprising, from front to rear, a first lens unit of negative power, a second lens unit of positive power and a third lens unit of negative power, the second and third lens units being moved to effect zooming, and the third lens unit having its focal length $f_3$ laid in the following range:

$$0.5 f_W < |f_3| < 4 f_T$$

where $f_W$ and $f_T$ are the shortest and longest focal lengths of the entire system.

77 Claims, 36 Drawing Sheets

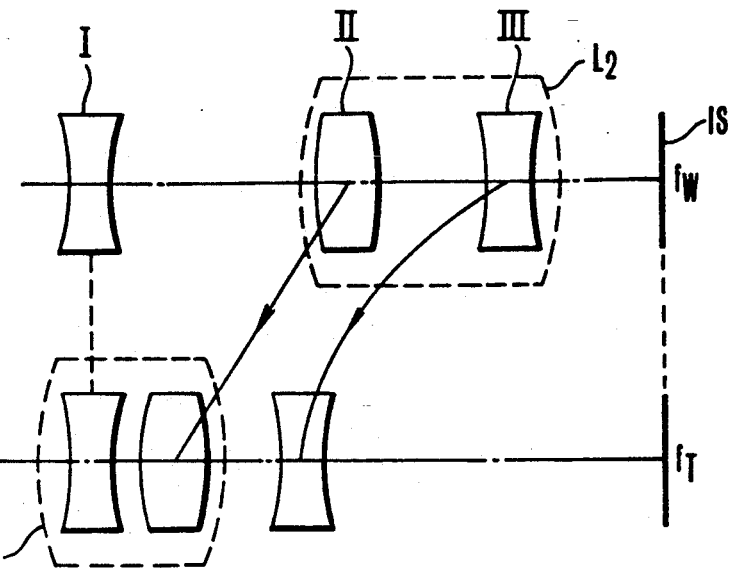
FIG.1(A)
FIG.1(B)
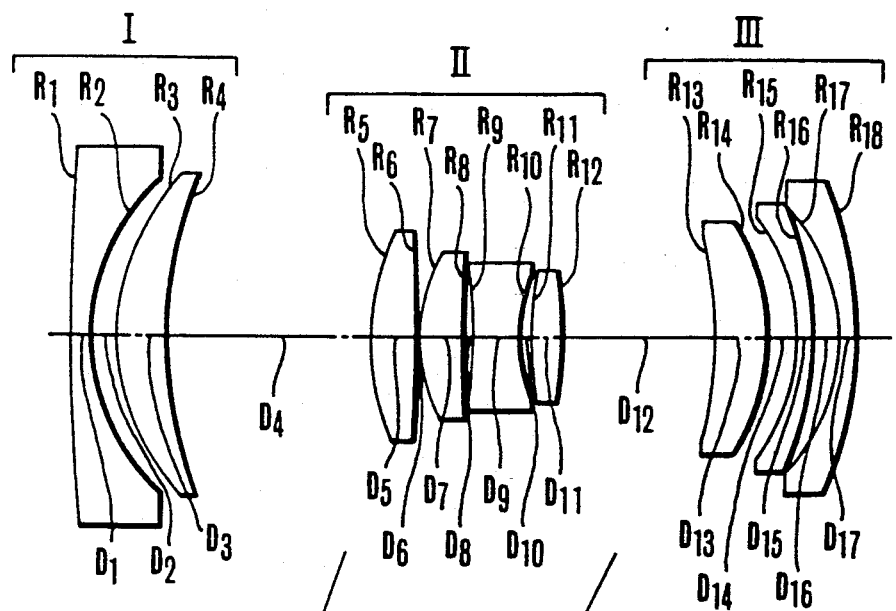
FIG.2(A)
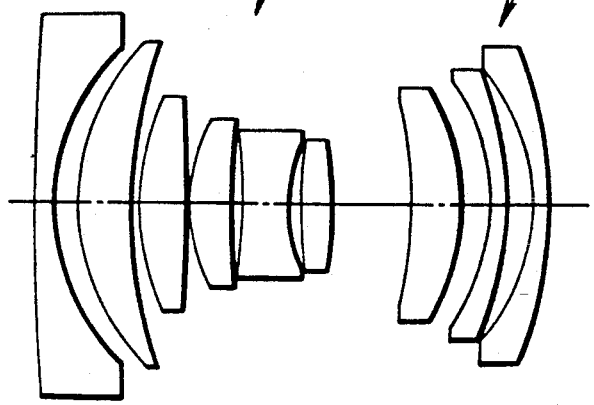
FIG.2(B)

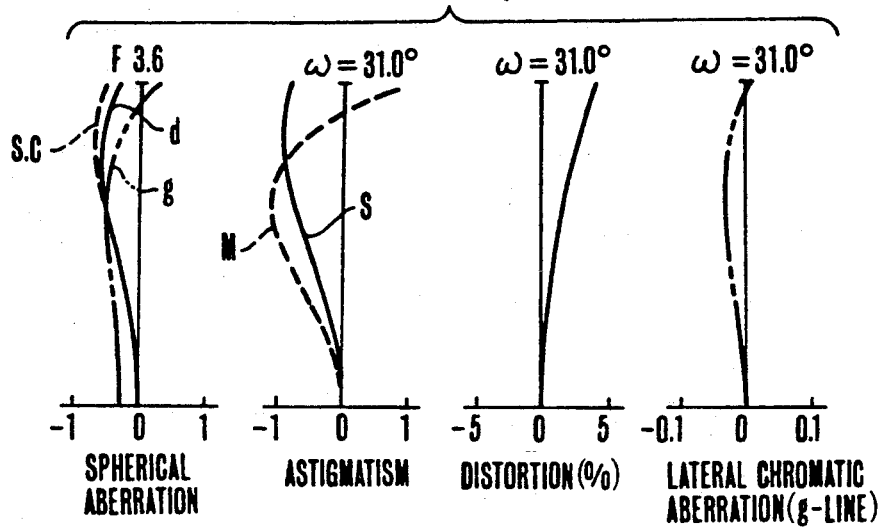
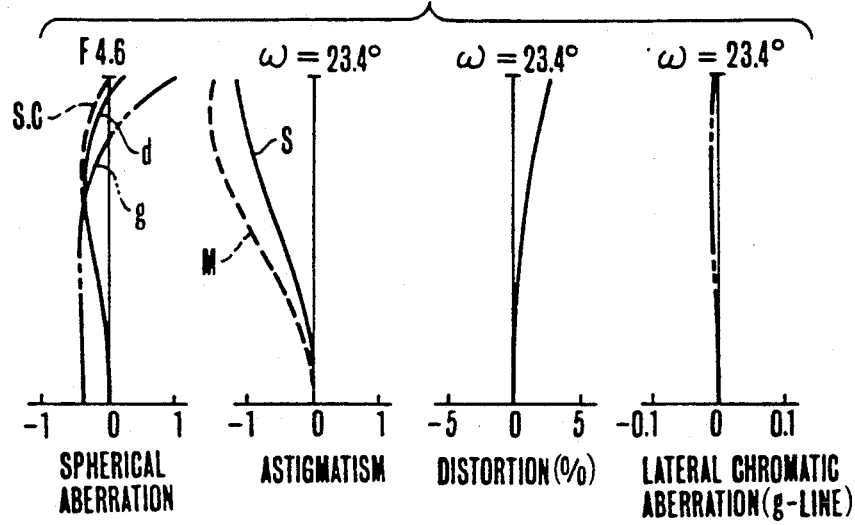
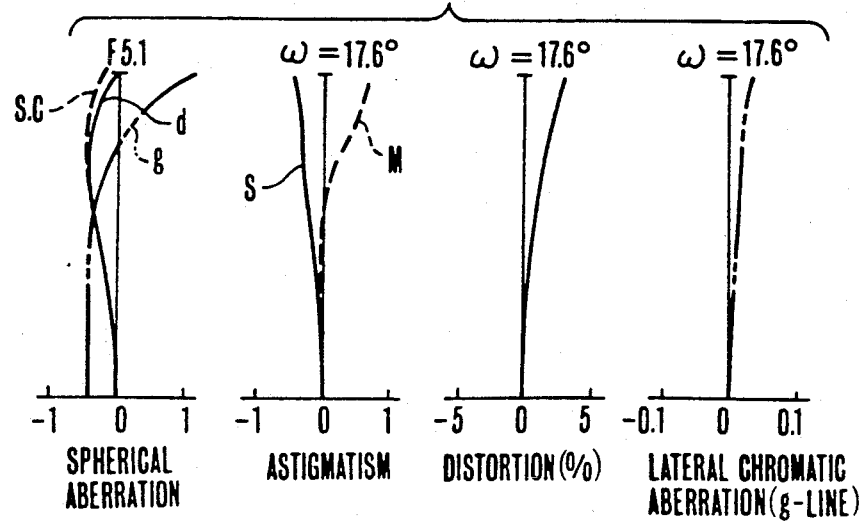

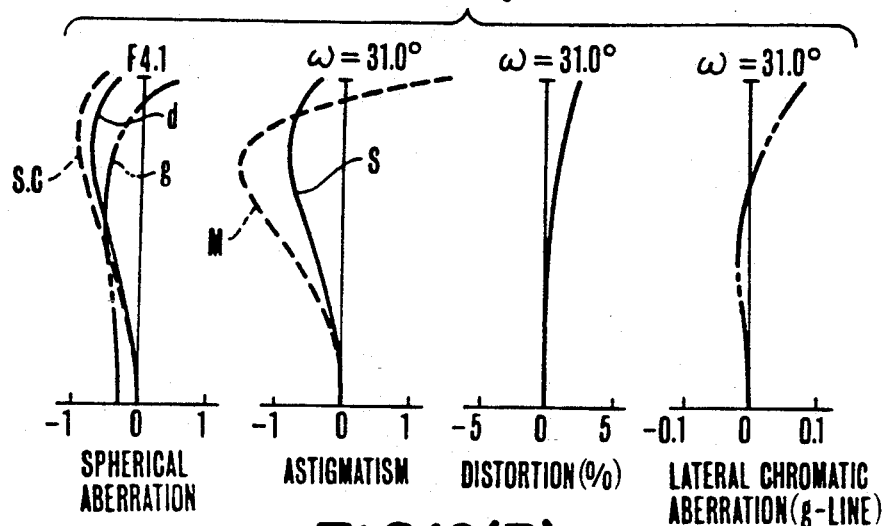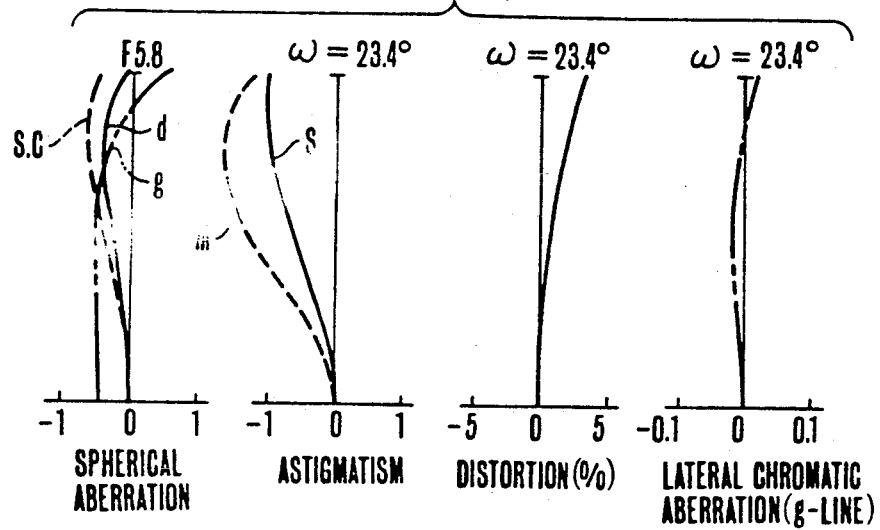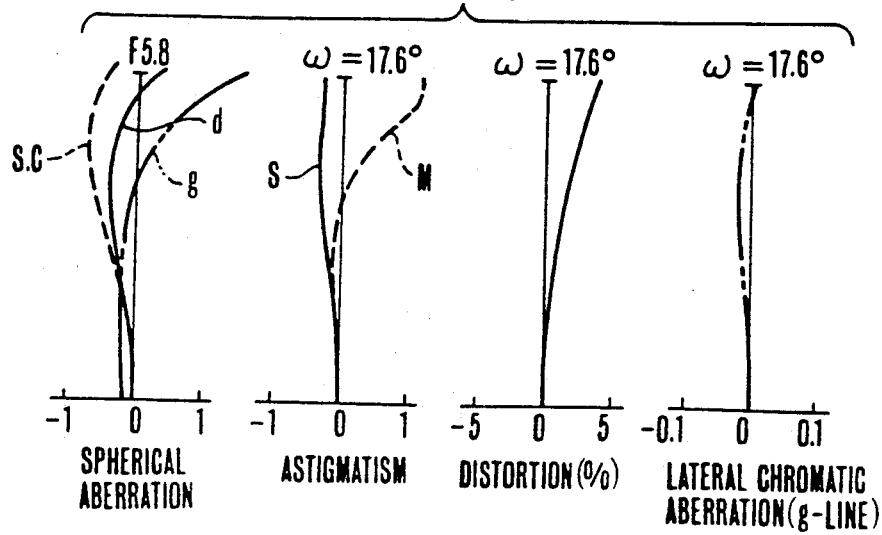

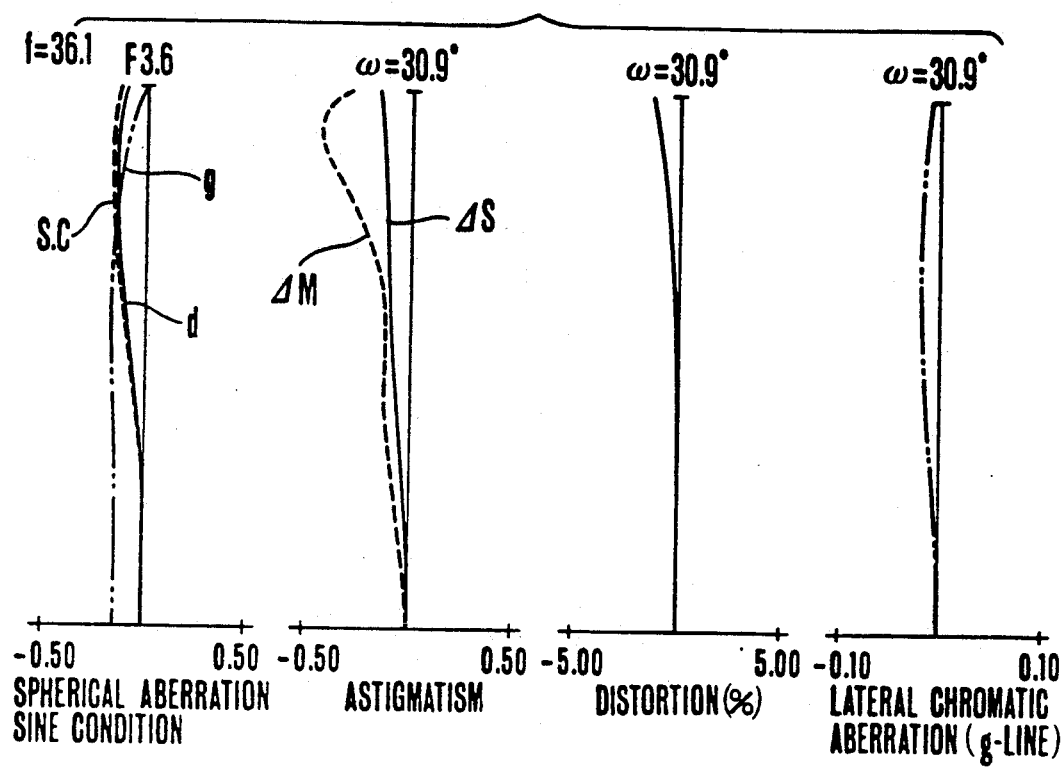
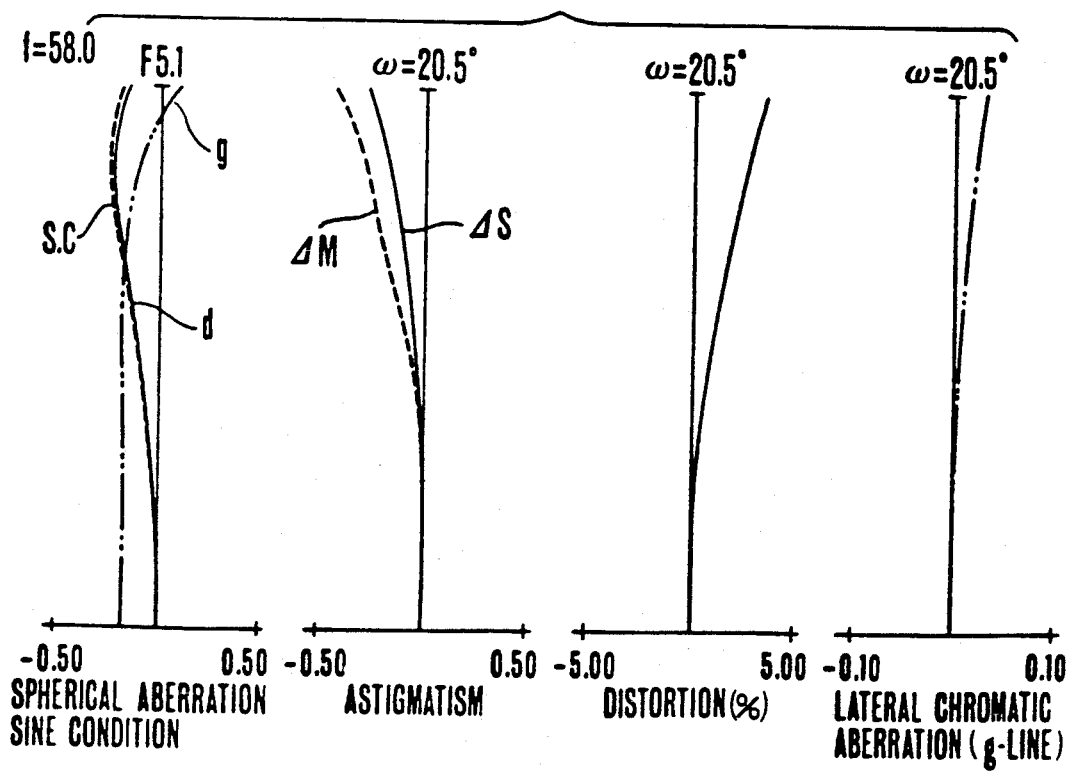

COMPACT ZOOM LENS

This application is a continuation of application Ser. No. 07/580,351, filed Sep. 7, 1990, now abandoned, which is a continuation of Ser. No. 07/187,277, filed Apr. 28, 1988, now abandoned, which is a continuation-in-part of Ser. No. 07/073,688, filed Jul. 15, 1987, now abandoned.

BACKGROUND OF THE INVENTION

1. Field of the Invention

This invention relates to compact zoom lenses suited to photographic cameras or video cameras, and more particularly to compact zoom lenses having at least three lens units of which the first counting from front is of negative power. Still more particularly it relates to a shortening of the total length of the lens system while still permitting good optical performance to be achieved.

2. Description of the Related Art

The zoom lens comprising from front to rear the first lens unit of negative power and the second lens unit of positive power both movable for zooming, or the so-called two-groups form of zoom lens, has found its use in many photographic and video cameras, since this form is favorable to widen the maximum angular field of view.

The zoom lenses of this two-group form have been proposed in Japanese Laid-Open Patent Applications Nos. SHO 53-132360 and 56-19022.

In general, such zoom lenses are designed to the retrofocus type with the minus-plus power distribution over the entire lens system and, therefore, have excellent image angle characteristics. However, the ratio of the distance between the front vertex and the focal plane to the focal length of the entire system, or the so-called telephoto ratio, tended to become relatively high.

Another type of zoom lens comprising from front to rear a first lens unit of positive power and a second lens unit of negative power with the separation therebetween being varied to effect zooming is proposed in Japanese Laid-Open Patent Applications Nos. SHO 56-128911 and 60-48009.

In this positive power-preceding zoom lens, because of its having plus-minus power distribution over the entire system, a rules of design for the telephoto lens type can apply. For this reason, it becomes possible to reduce the telephoto ratio to a relatively low value. This feature is advantageous at easily achieving realization of a zoom lens of reduced size with a shortened total length. As for a high zoom ratio with the use of the telephoto type design in the two-group form of zoom lens, reduced size can be obtained only when the refractive power of the first lens unit is strengthened.

However, the increase in the refractive power of the first lens unit calls for a large increase in the ratio of the shift, $\Delta$, of the image plane to the minute axial displacement, $\delta$, of the first lens unit, or the so-called responsiveness. Therefore, the structure or construction of the operating mechanism for all the movable lens units tended to become more precise.

SUMMARY OF THE INVENTION

A first object of the present invention is to provide a zoom lens which is amenable to the easy technique of widening the maximum image angle, while still permitting a relatively high zoom ratio to be obtained with the limitation of the total length of the entire lens system being at a minimum.

A second object is to provide a compact zoom lens of the negative power preceding type having high grade of imaging performance suited to photographic camera or video camera.

To achieve these objects, according to the present invention as applied to a zoom lens comprising, from front to rear, a first lens unit of negative power, a second lens unit of positive power and a third lens unit of negative power, the second and third lens units being movable for zooming, the following condition is set forth:

$$0.5 f_W < |f_3| < 4 f_T$$

where $f_3$ is the focal length of the third lens unit, and $f_W$ and $f_T$ are the shortest and longest focal lengths of the entire lens system respectively.

In another aspect of the present invention having the three lens units described above, the variation of the image magnification is performed by varying the unit space between said first lens unit and said second lens unit and the unit space between said second lens unit and said third lens unit, and the following conditions are satisfied:

$$0.25 < E1w/E2w < 0.95$$

$$0.3 < |f3|/FT < 0.8$$

where E1w and E2w are the principal point interval distance between said first and said second lens units and between said second and said third lens units in the wide angle end respectively, and f3 and FT are respectively the focal lengths of said third lens unit and the entire lens system in the telephoto end.

In another aspect of the present invention having the three lens units described above, the variation of the image magnification is performed by varying the unit space between said first and said second lens units and the unit space between said second and said third lens units, and the following conditions are satisfied:

$$0.25 < E1w/E2w < 2$$

$$0.3 < |f3|/FT < 0.8$$

where E1w and E2w are the principal point interval distances between said first and said second lens units and between said second and said third lens units in the wide angle lens respectively, and f3 and FT are the focal lengths of said third lens unit and the entire lens system in the telephoto end respectively.

In another aspect of the present invention having the three lens units described above, when zooming from the wide angle to the telephoto end, all said units are moved axially forward in such relation as to satisfy the following conditions:

$$0.27Z < M1/M3 < 0.5Z$$

$$0.3Z < M2/M3 < 0.47Z$$

where Z is the zoom ratio and Mi is the total zooming movement of the i-th lens unit where i represents the value 1, 2 or 3.

These and other features of the invention will be described in connection with the following embodiments thereof.

BRIEF DESCRIPTION OF THE DRAWINGS

FIGS. 1(A), 1(B) are schematic diagram of an embodiment of the optical system according to the invention.

FIGS. 2(A),2(B) through FIGS. 7(A),7(B) are longitudinal section views of examples 1 to 6 of specific zoom lenses of the invention respectively.

FIGS. 8(A), 8(B), 8(C) through FIGS. 13(A), 13(B), 13(C) are graphic representations of all the aberrations of the lenses of FIGS. 2 to 7 respectively.

In FIGS. 1(A) through 7(B), the wide angle end is shown in FIGS. 1(A), 2(A), 3(A), 4(A), 5(A), 6(A), and the telephoto end in FIGS. 1(B), 2(B), 3(B), 4(B), 5(B), 6(B). The aberrations in the wide angle end are shown in FIGS. 8(A), 9(A), 10(A), 11(A), 12(A), 13(A), those in the middle position in FIGS. 8(B), 9(B), 10(B), 11(B), 12(B), 13(B), and those in the telephoto end in FIGS. 8(C), 9(C), 10(C), 11(C), 12(C), 13(C).

Figure 3A:
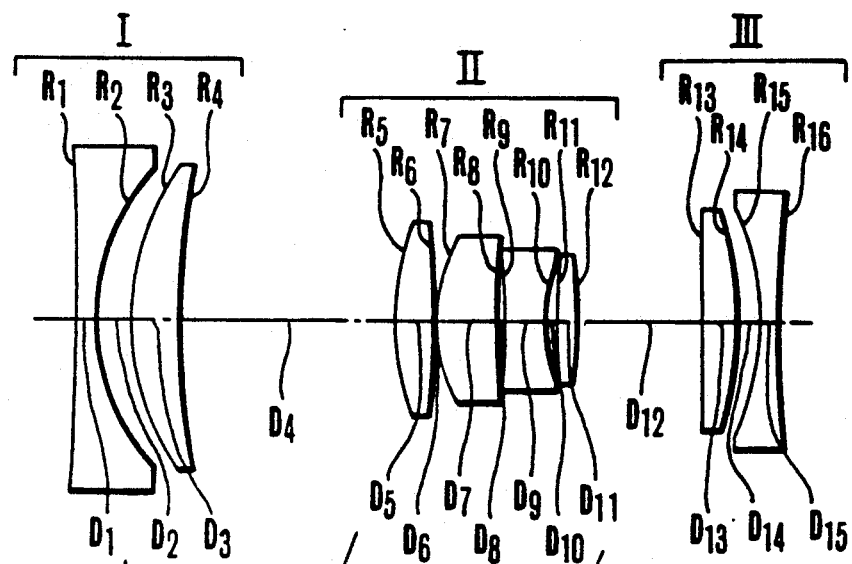
Figure 3B:
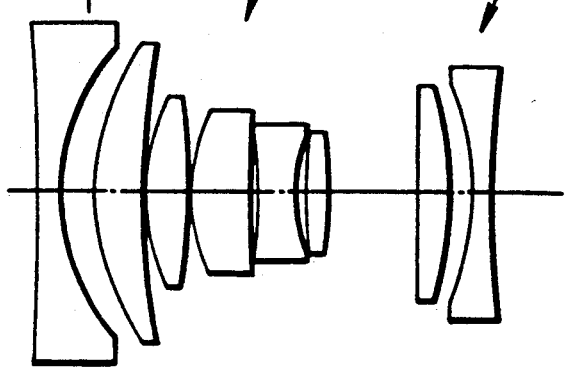
Figure 4A:
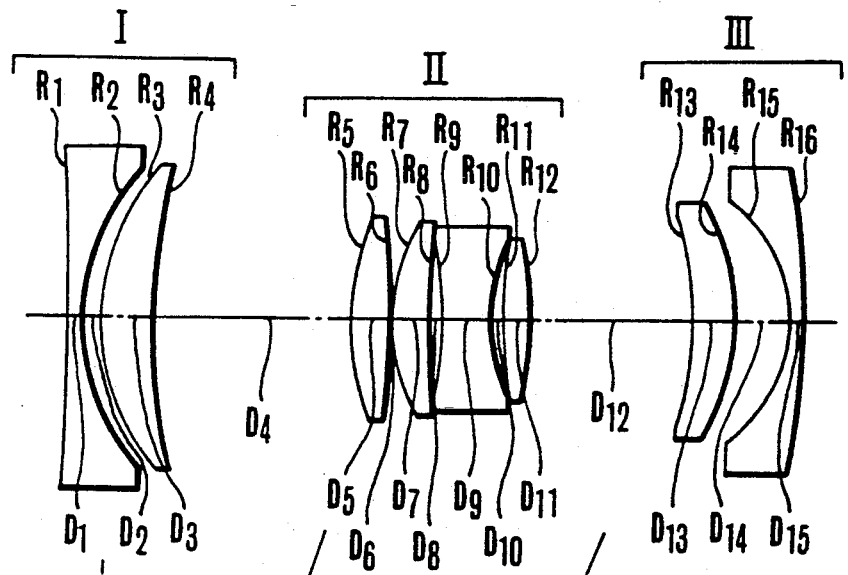
Figure 4B:
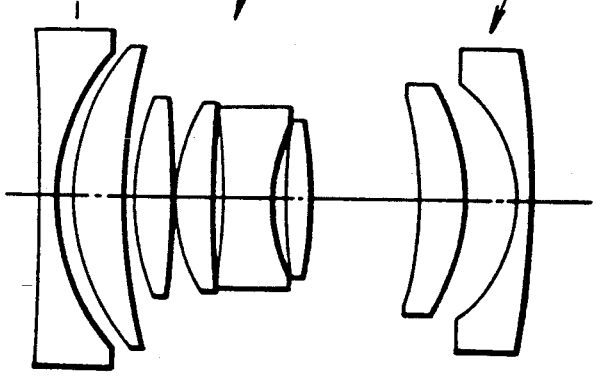
Figure 5A:
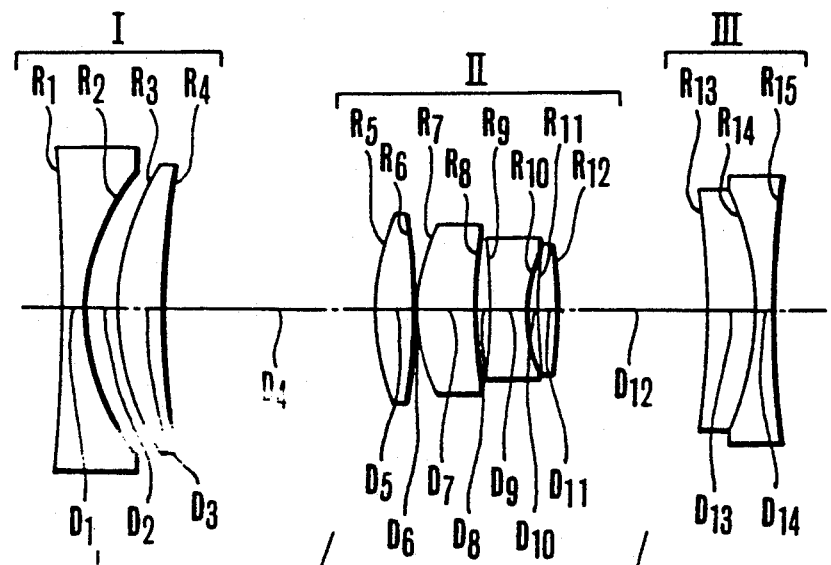
Figure 5B:
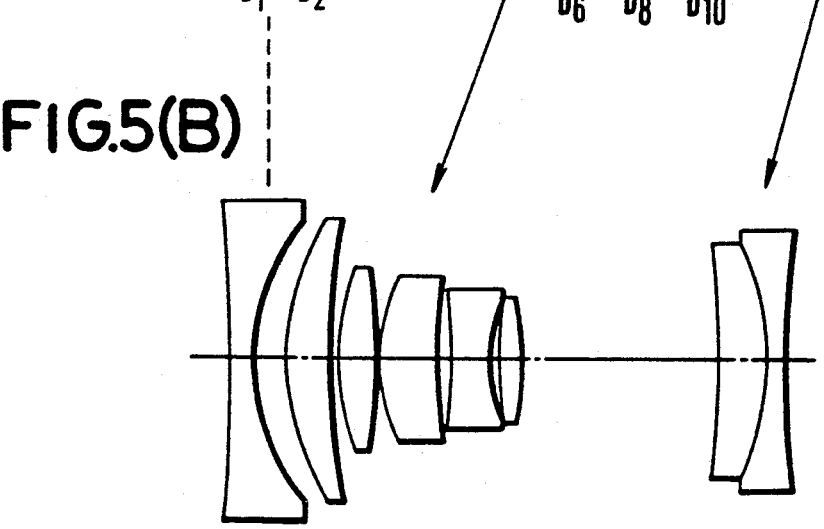
Figure 6A:
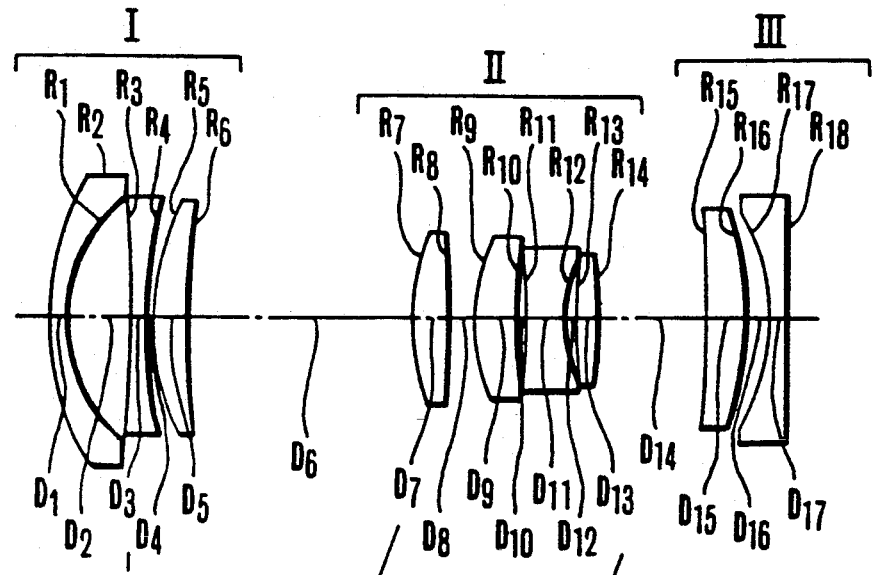
Figure 6B:
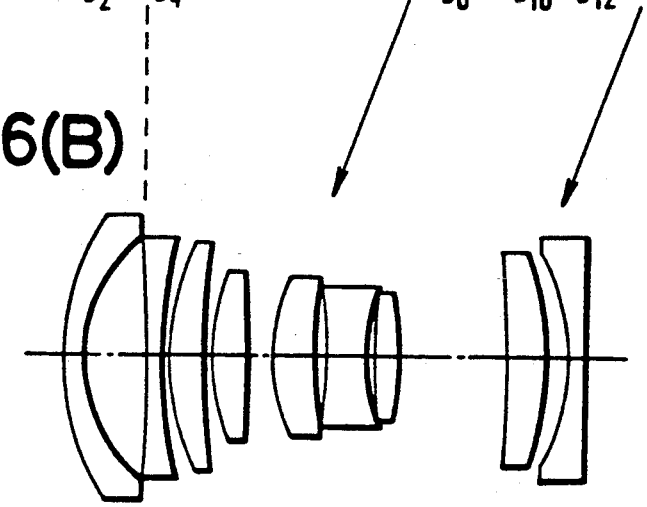
Figure 7A:
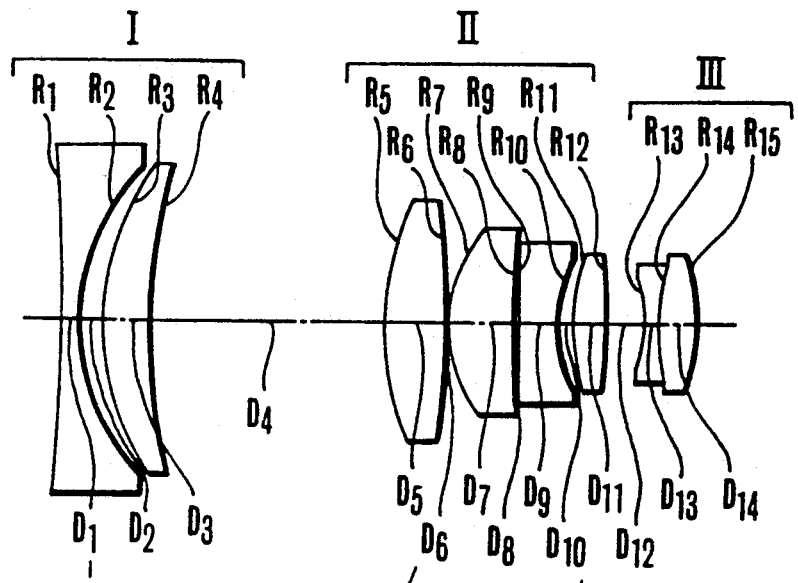
Figure 7B:
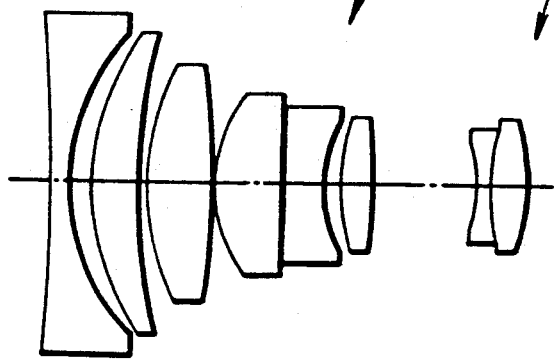
Figure 9A:
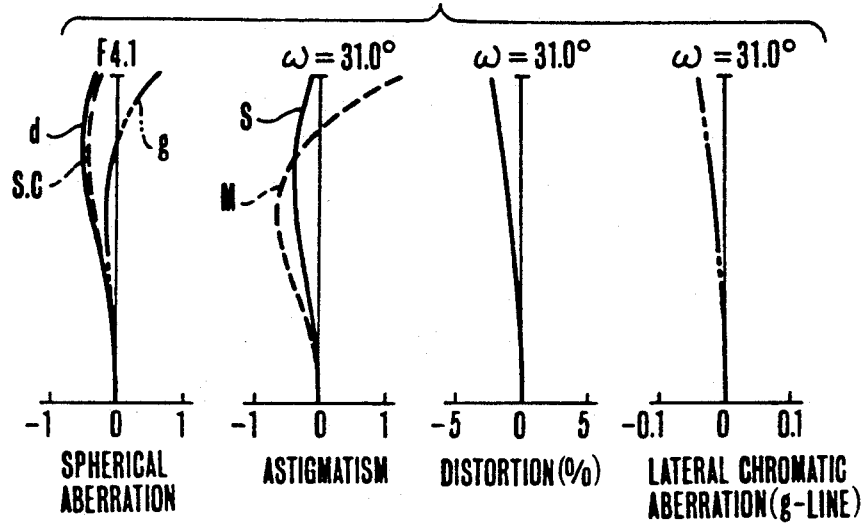
Figure 9B:
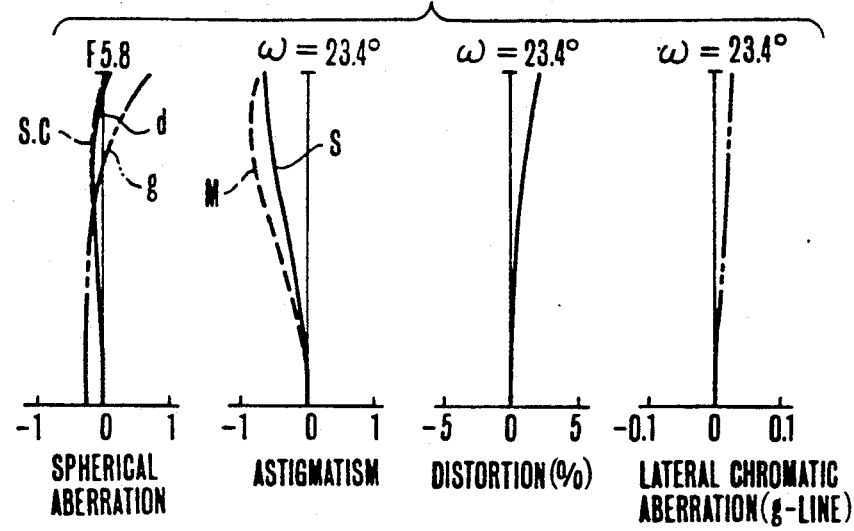
Figure 9C:
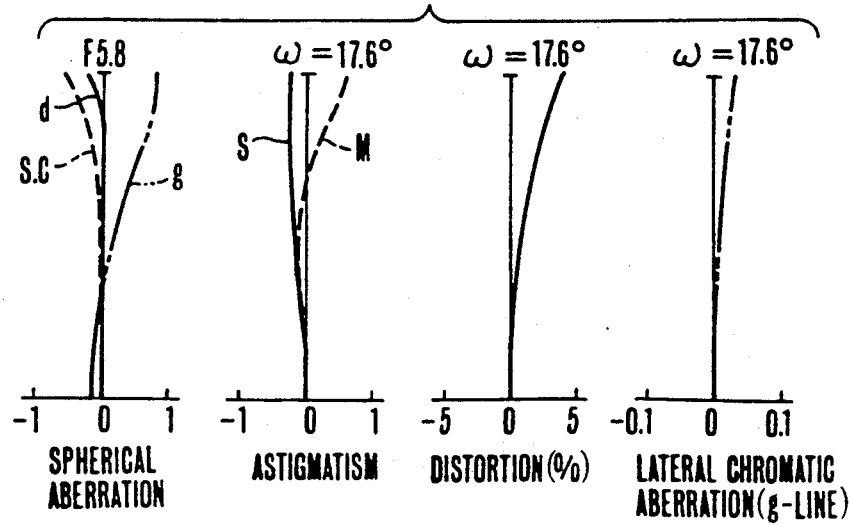
Figure 10A:
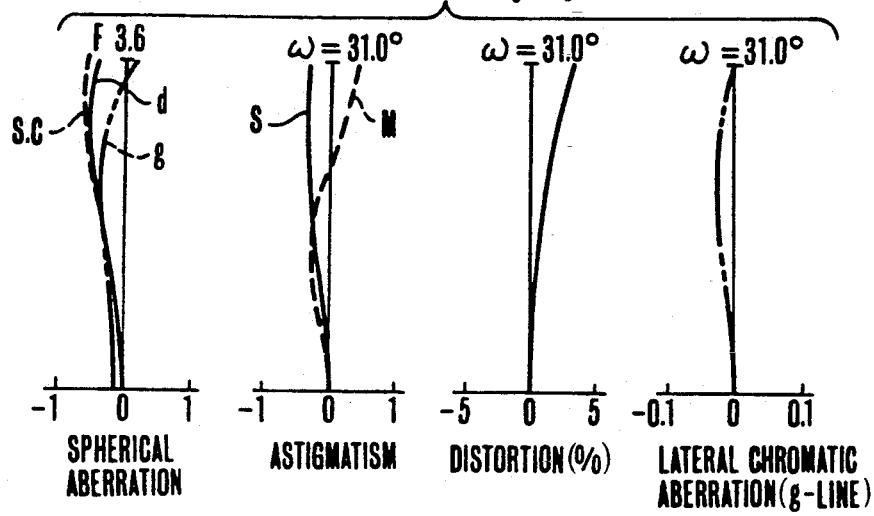
Figure 10B:
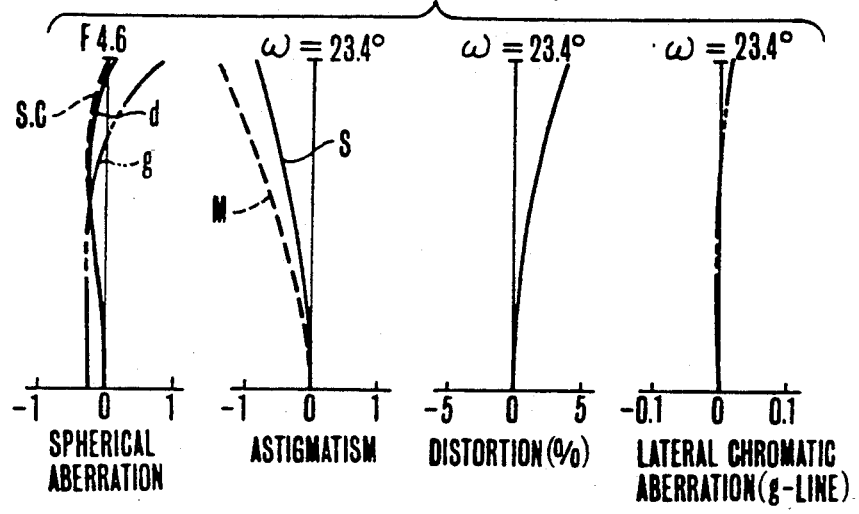
Figure 10C:
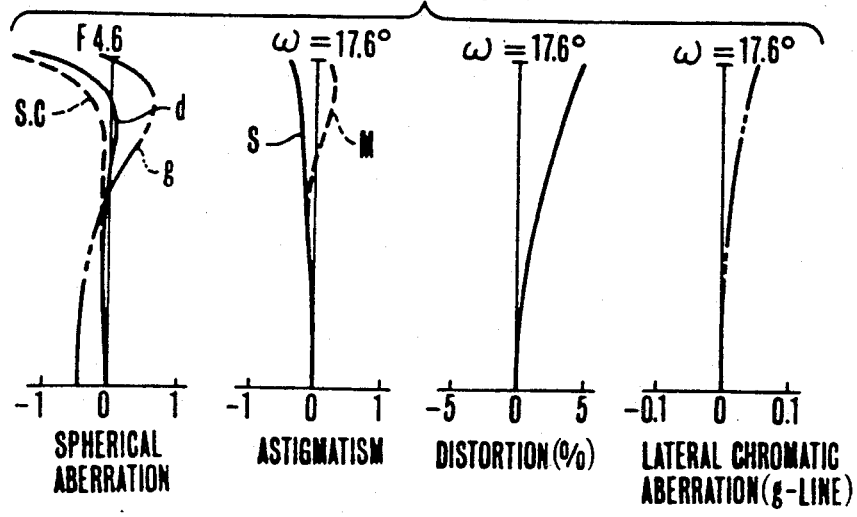
Figure 11A:
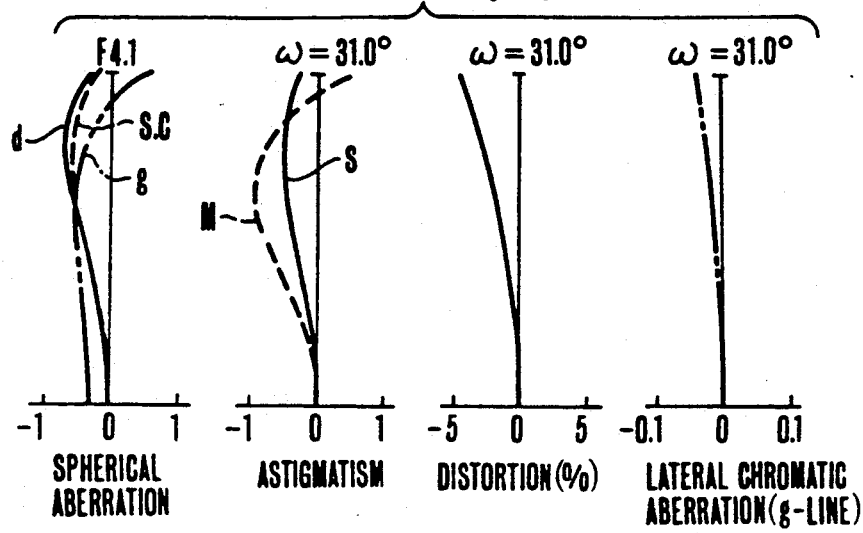
Figure 11B:
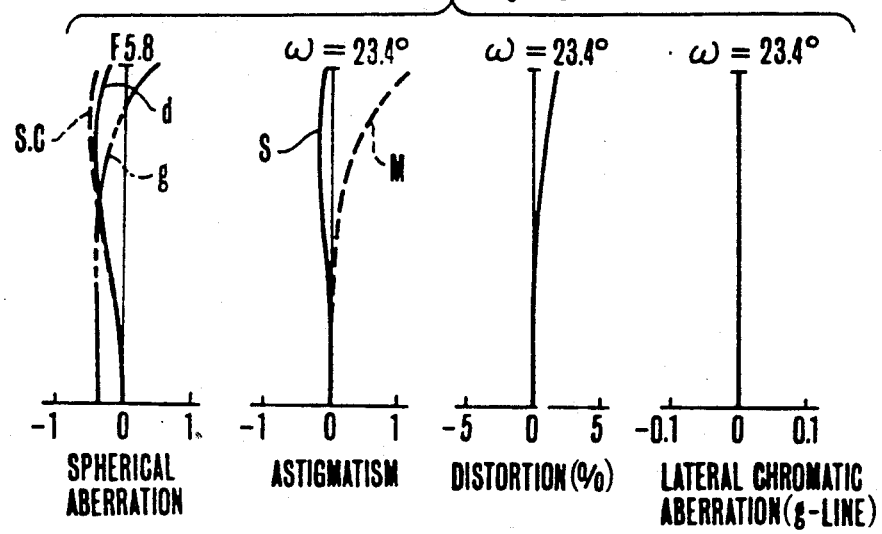
Figure 11C:
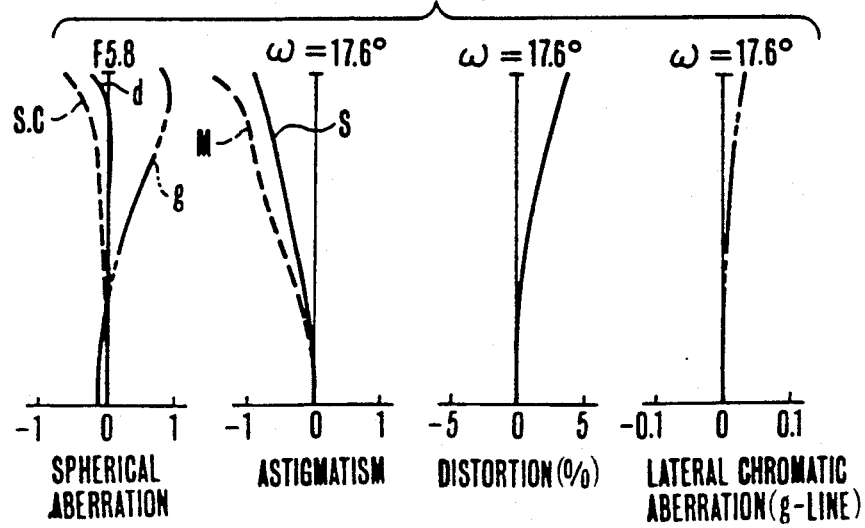
Figure 13A:
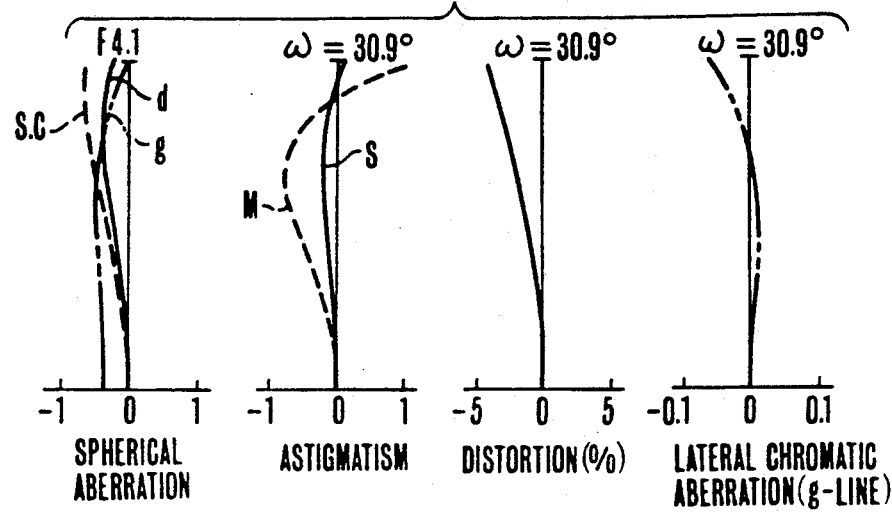
Figure 13B:
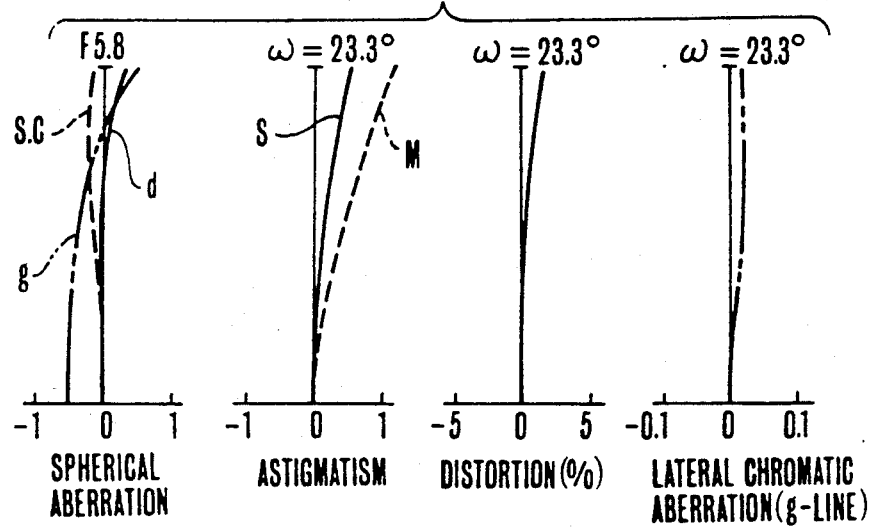
Figure 13C:
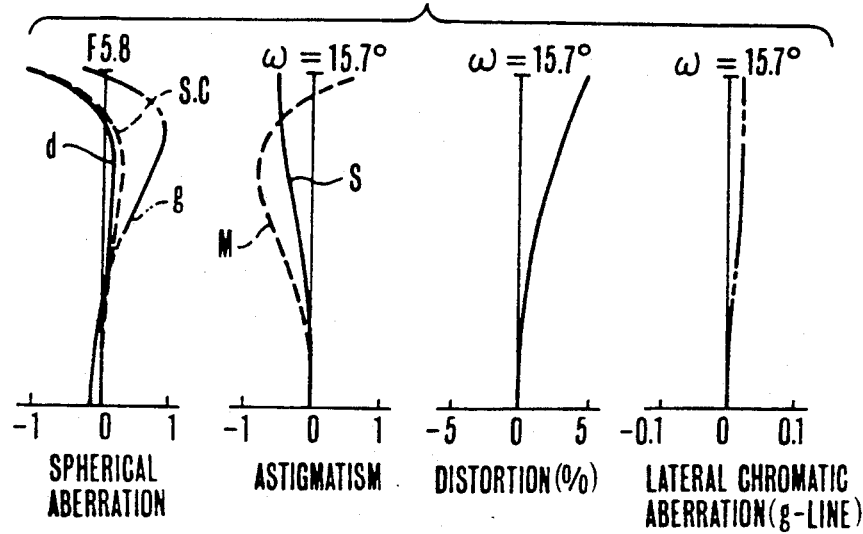
Figure 14:
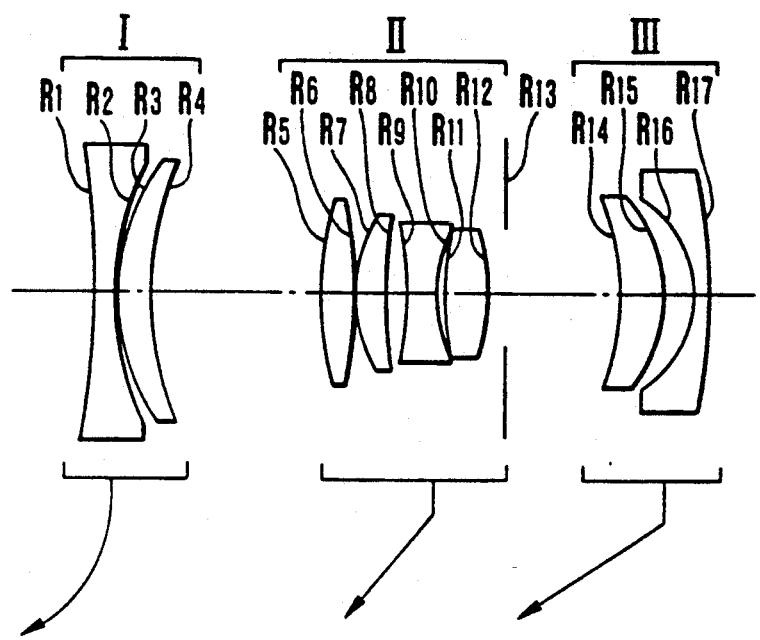
FIGS. 14 to 21 are longitudinal section views of numerical examples 7 to 14 of specific lenses of the invention respectively.
Figure 15:
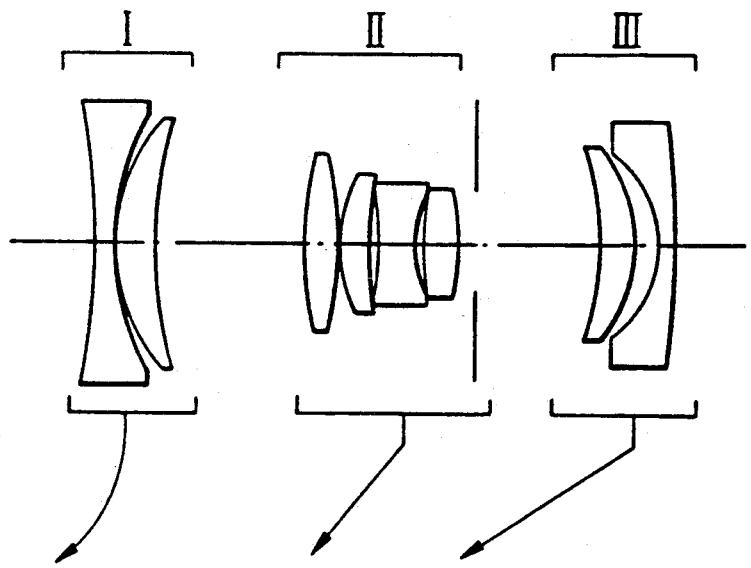
Figure 16:
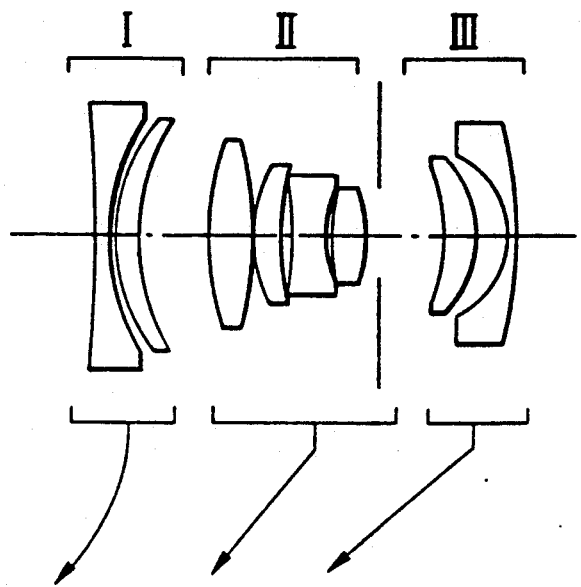
Figure 17:
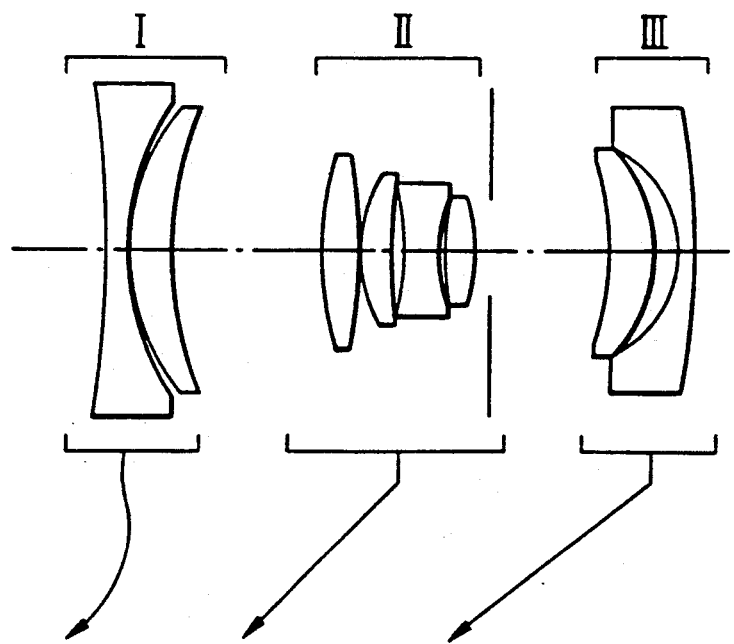
Figure 18:
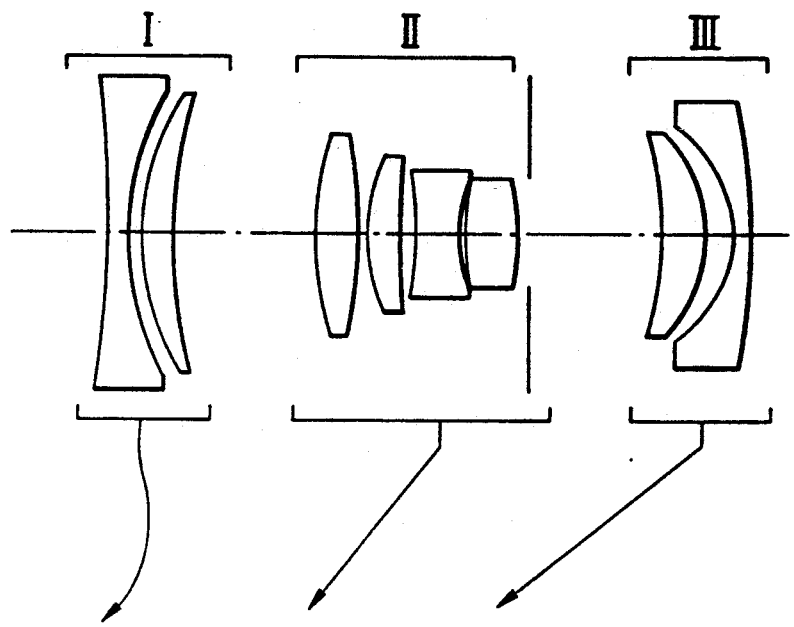
Figure 19:
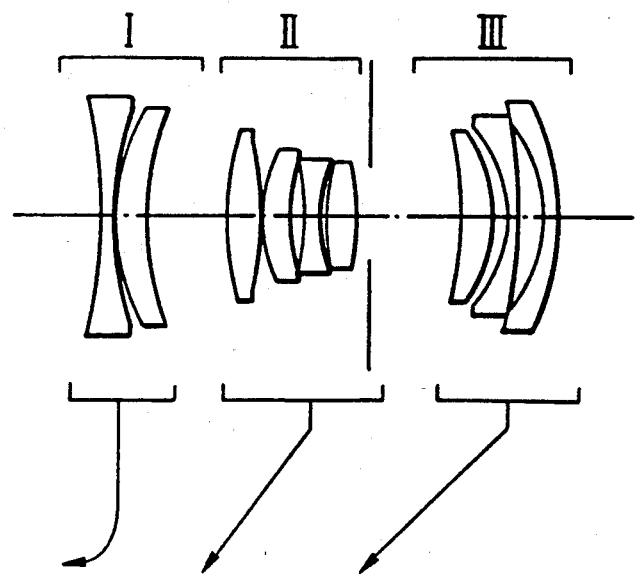
Figure 20:
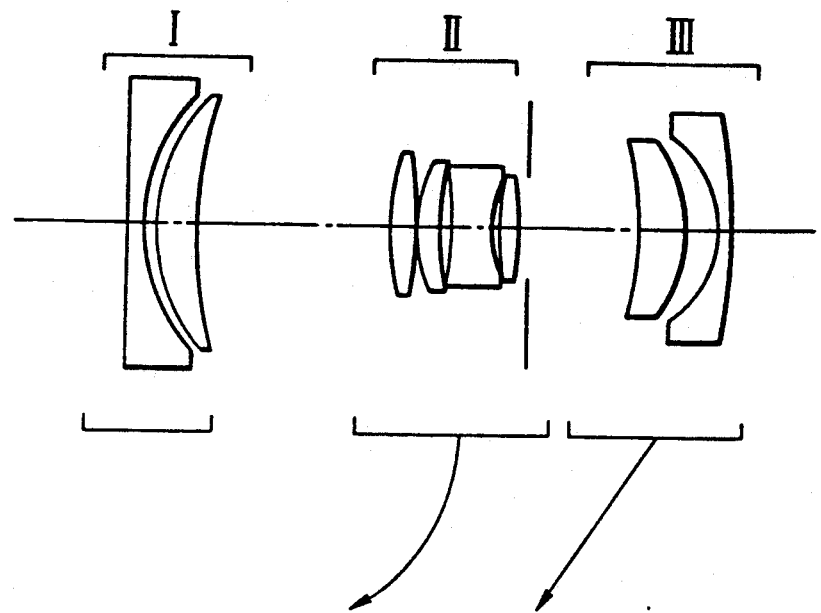
Figure 21:
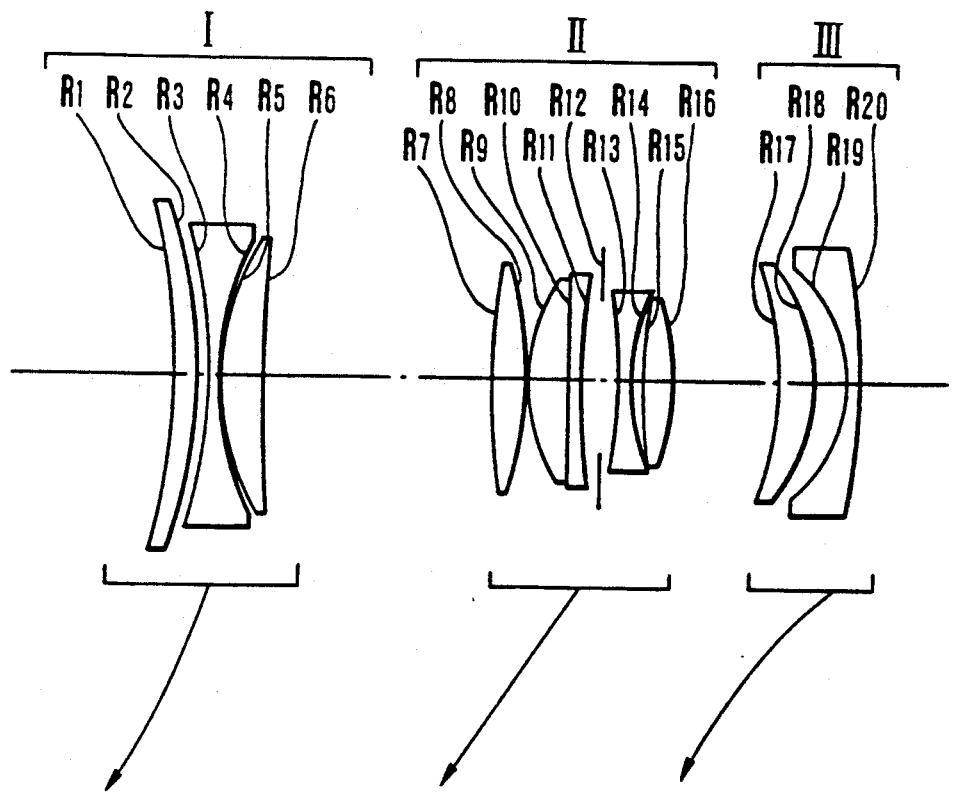
Figure 22A:
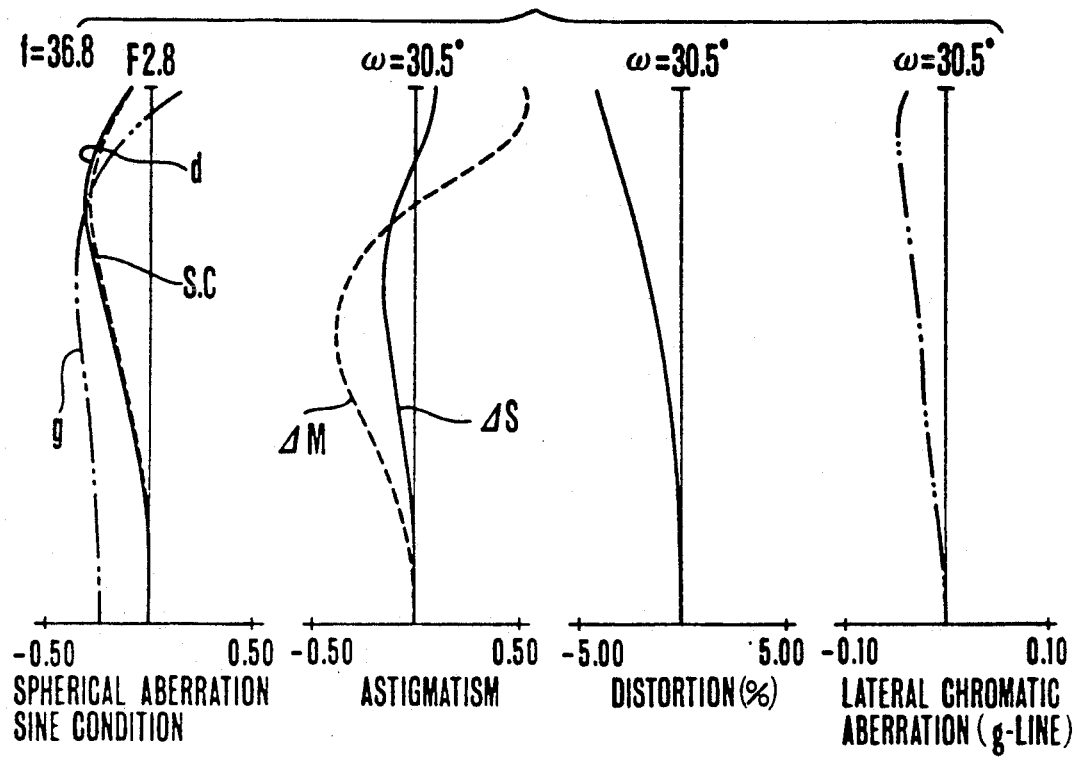
FIGS. 22(A)-22(C) to 29(A)-29(C) are graphic representations of the various aberrations of the lenses of FIGS. 14 to 21 respectively.
Figure 22B:
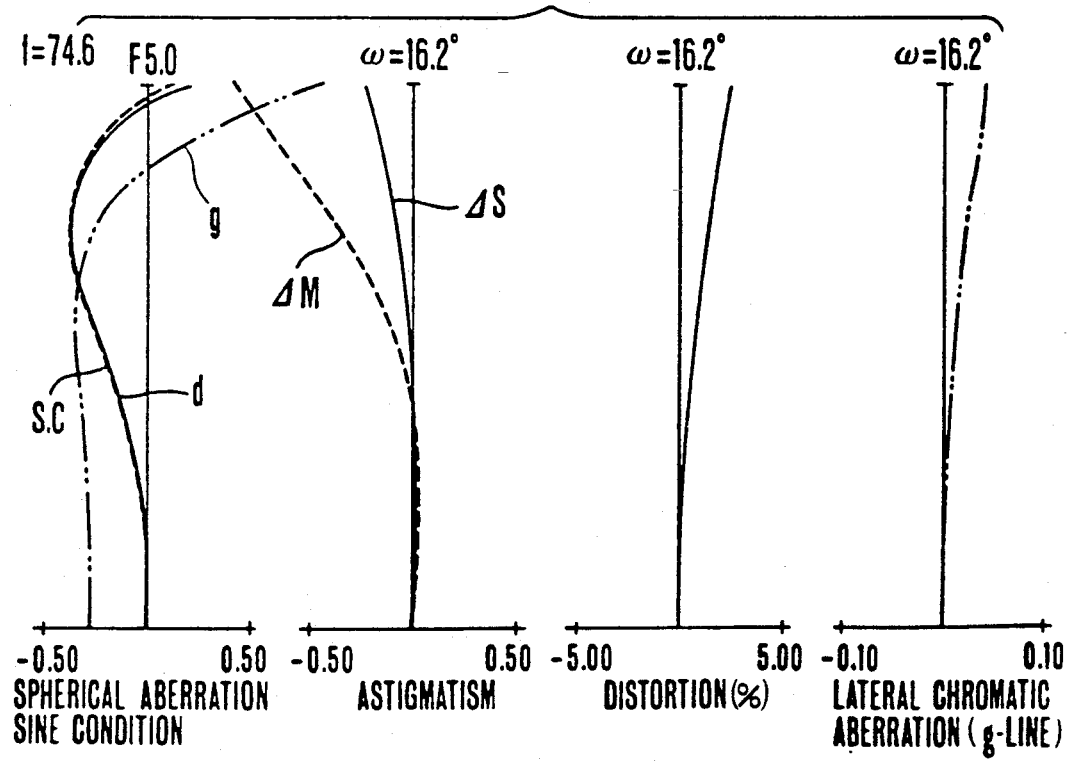
Figure 22C:
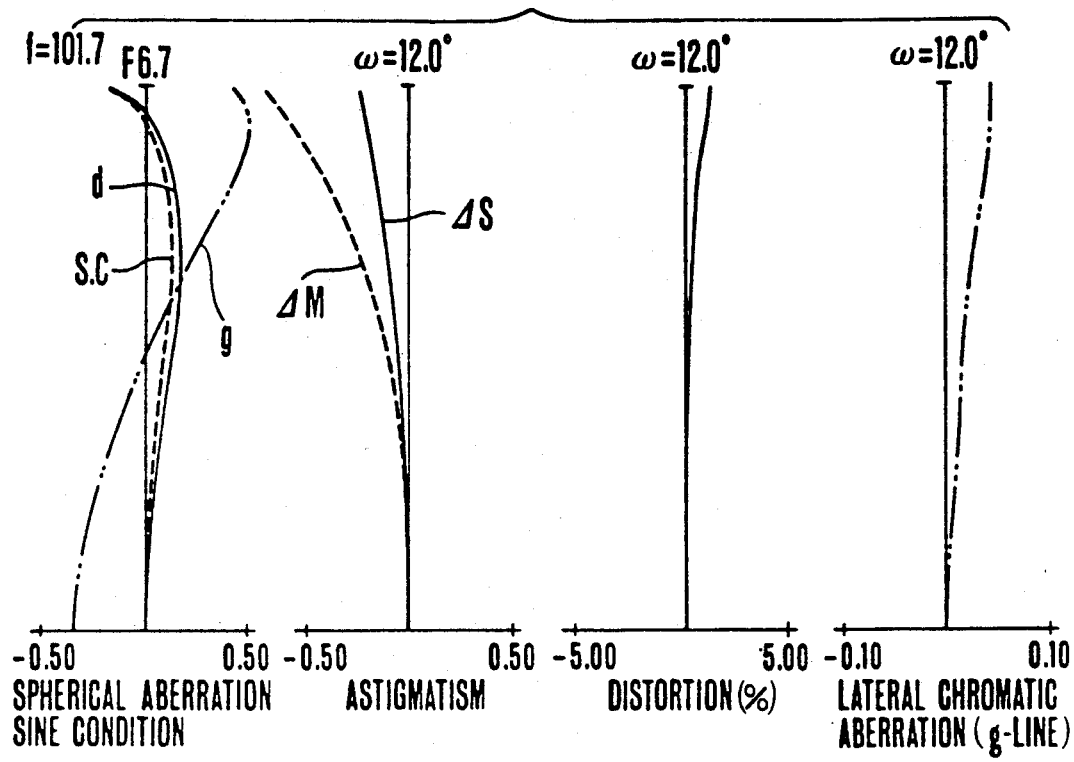
Figure 23A:
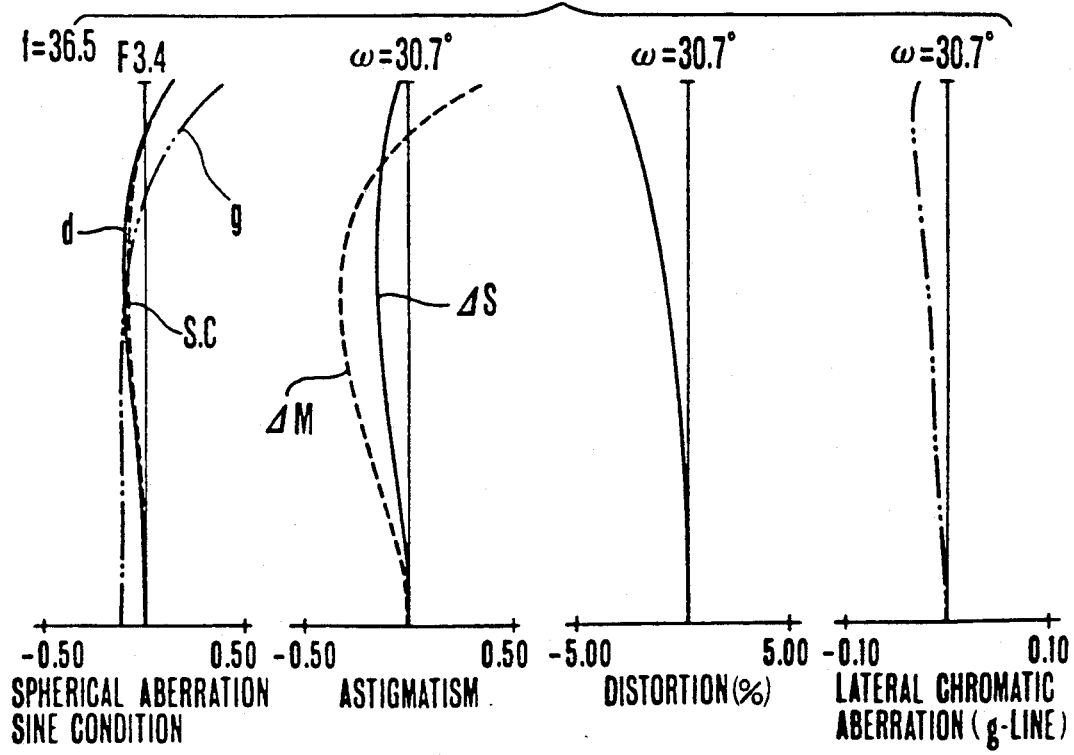
Figure 23B:
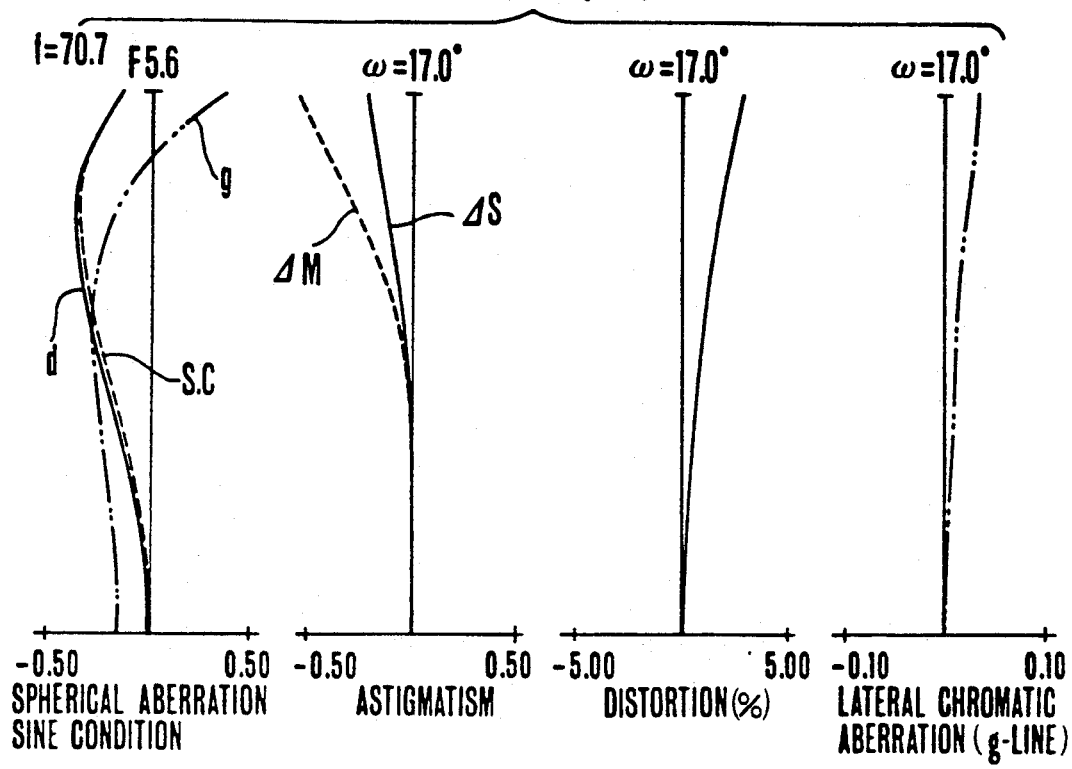
Figure 23C:
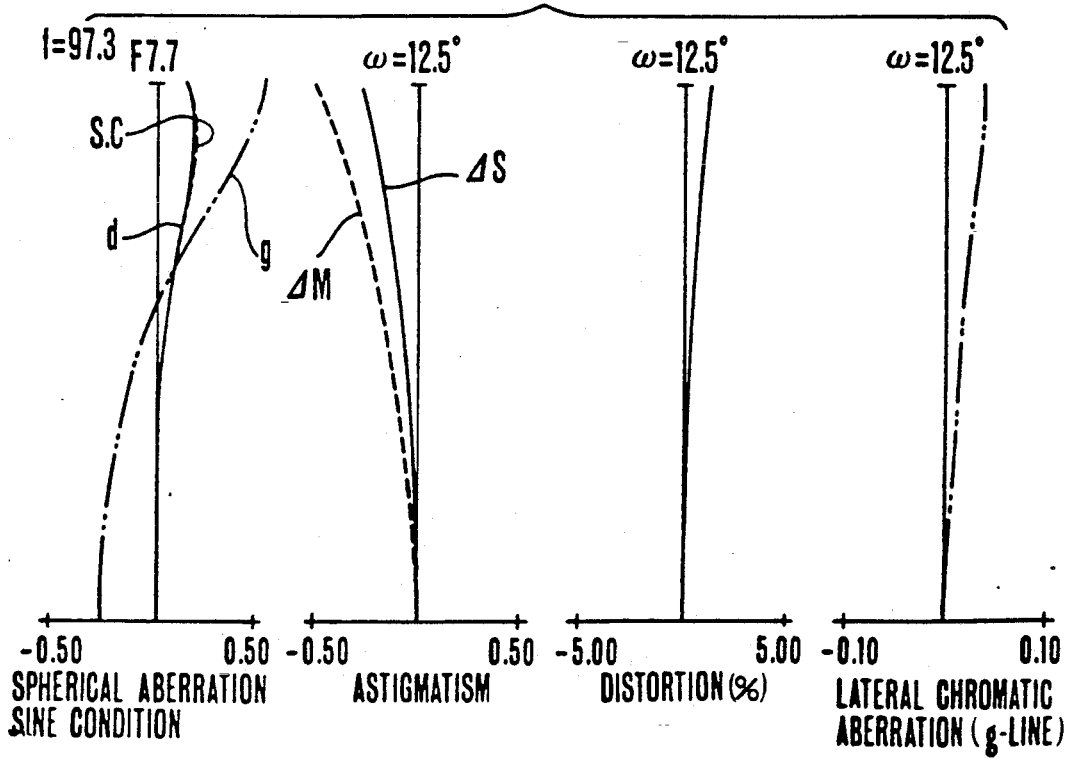
Figure 24A:
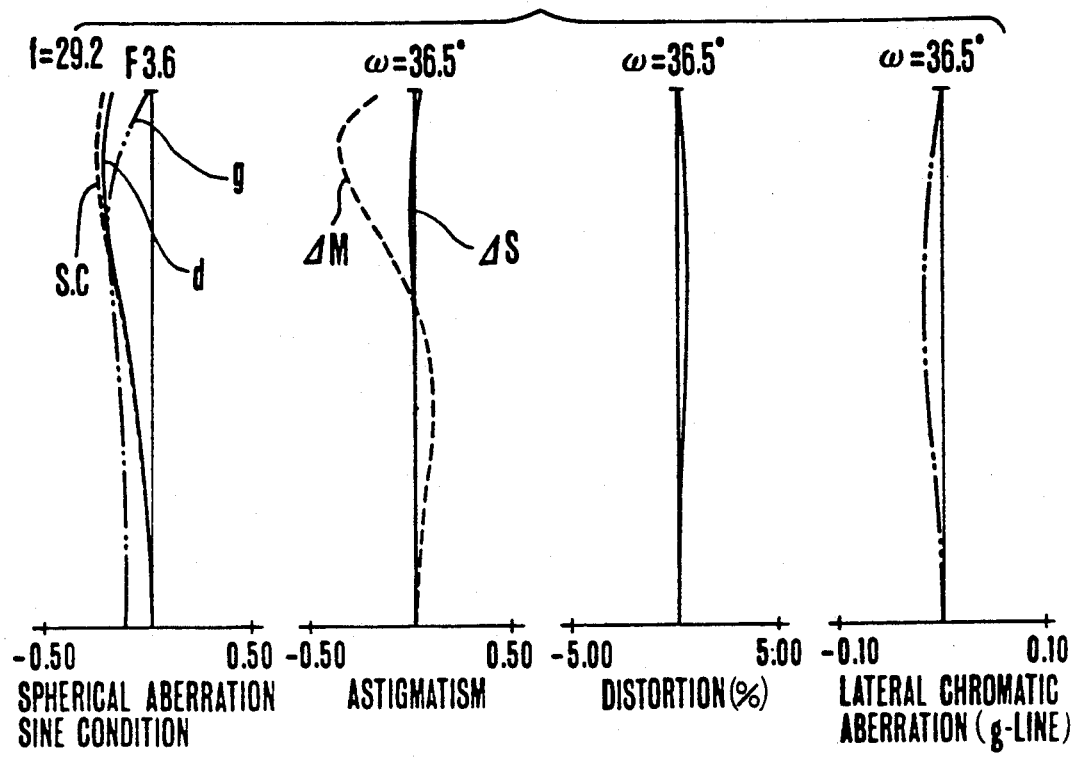
Figure 24B:
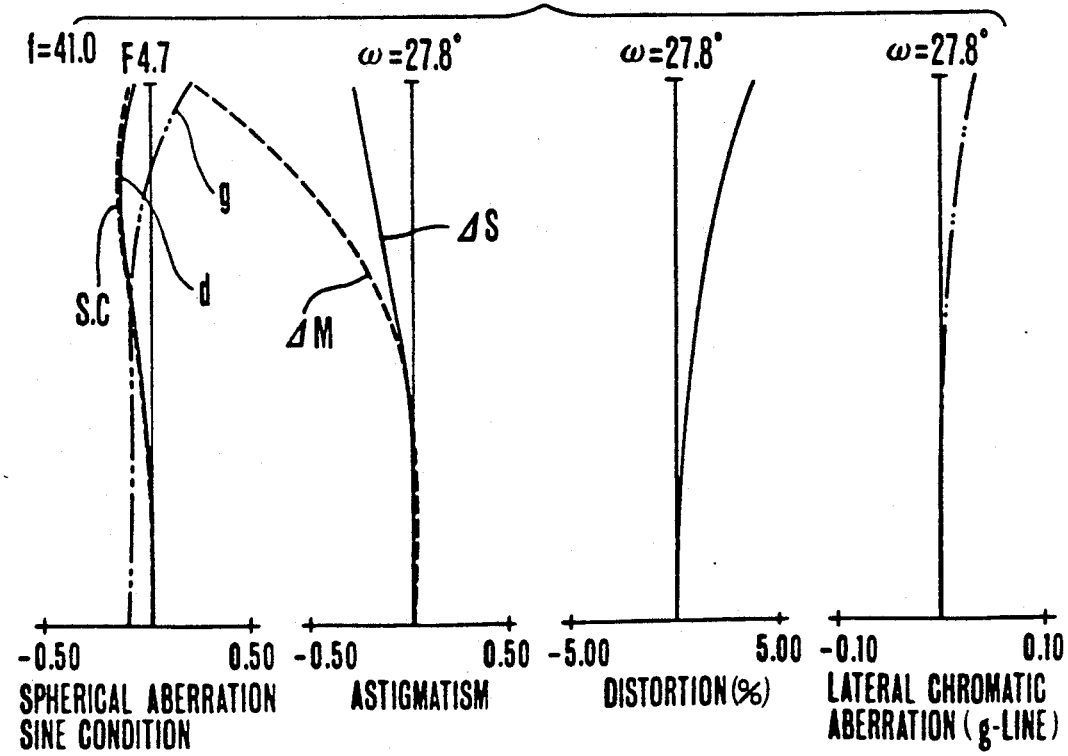
Figure 24C:
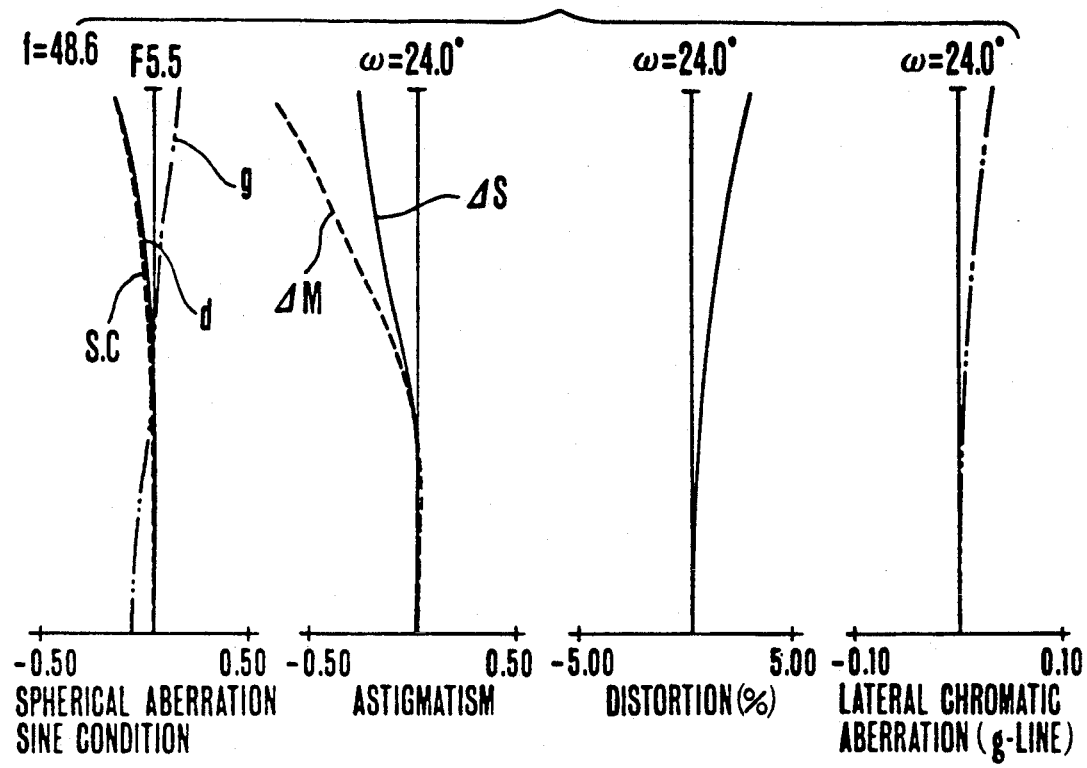
Figure 25A:
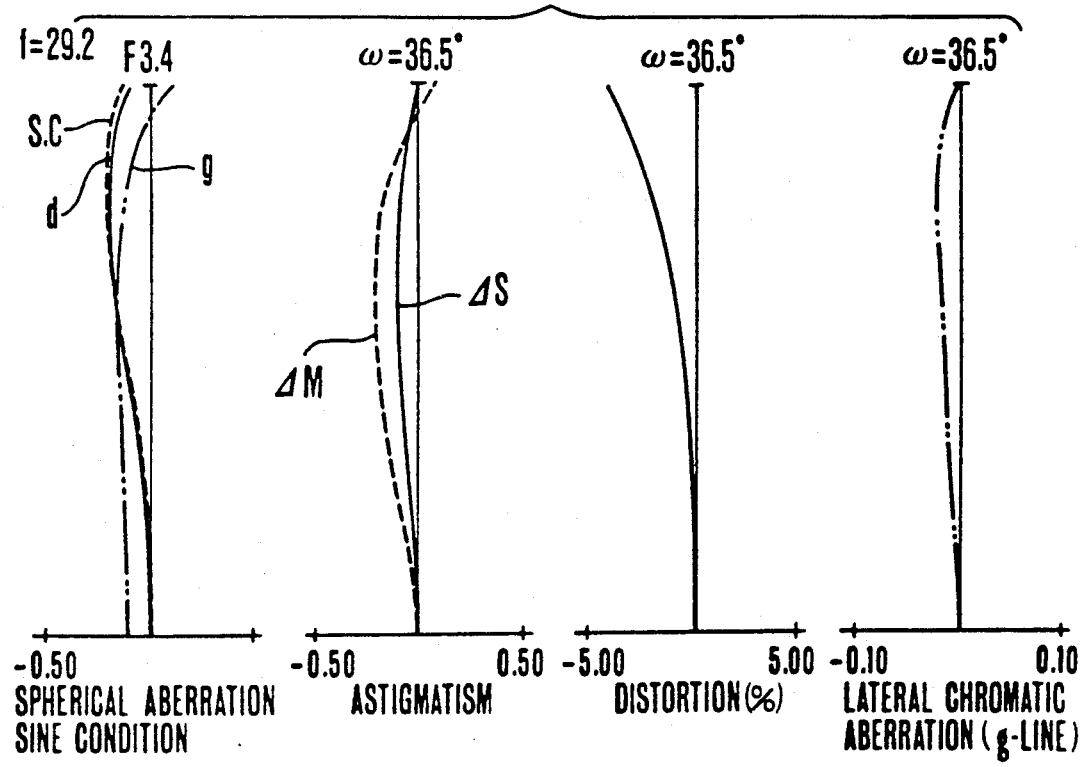
Figure 25B:
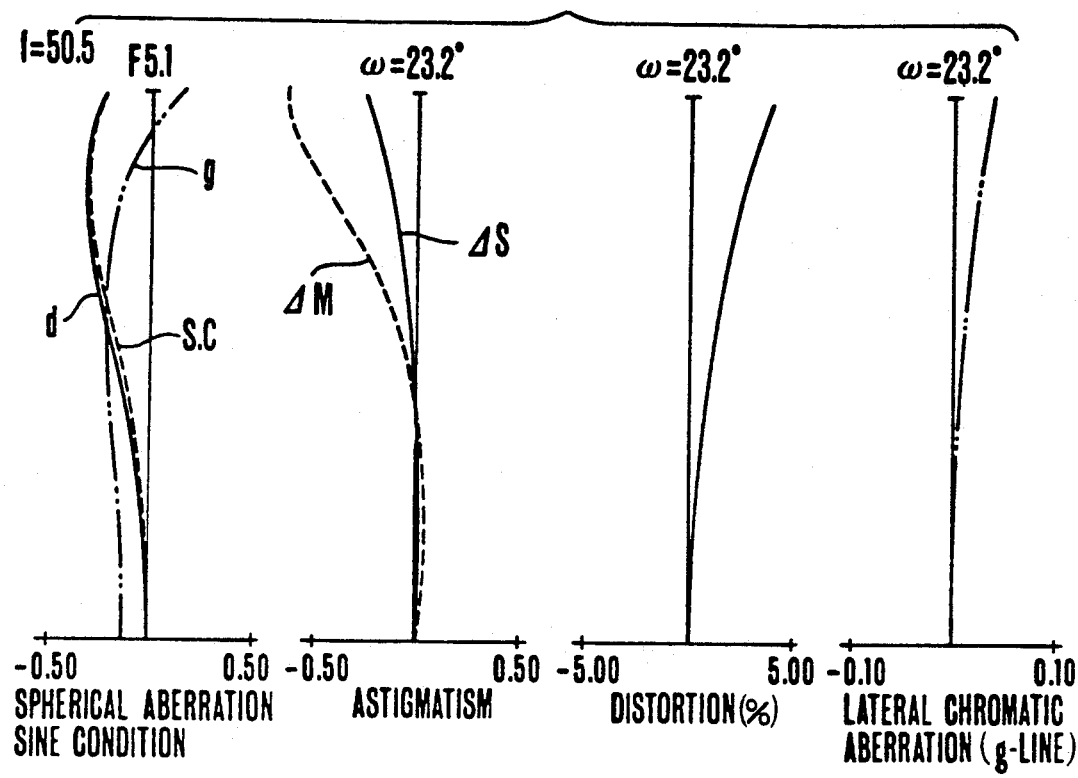
Figure 25C:
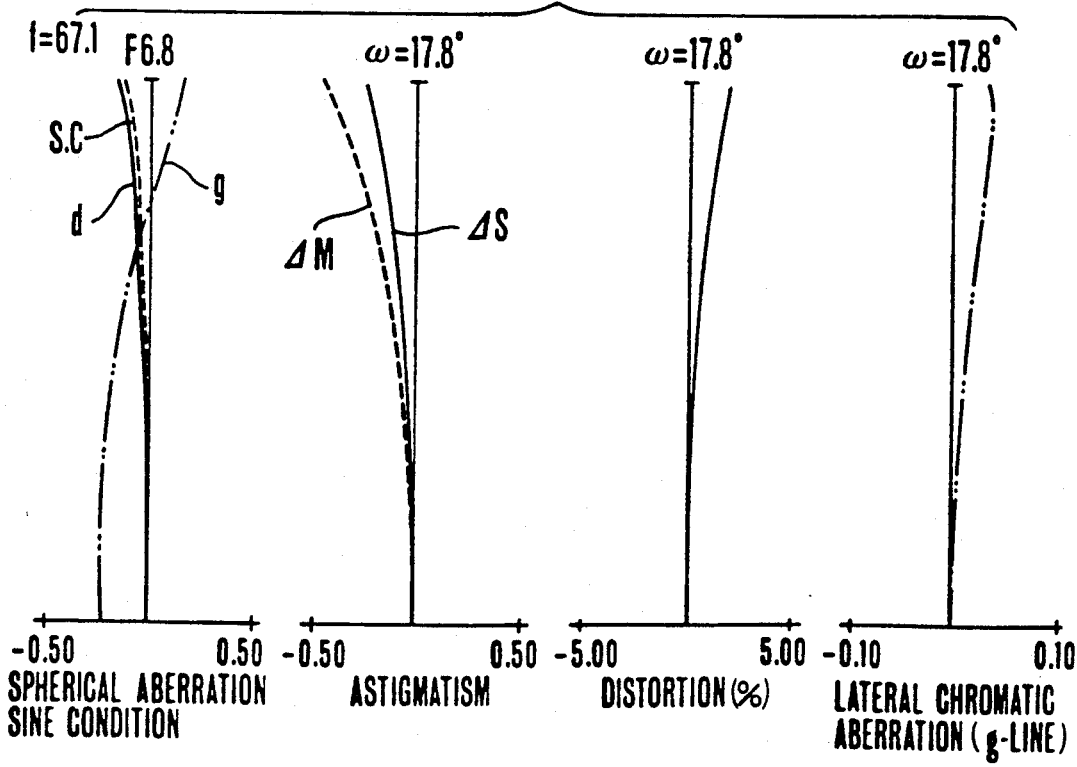
Figure 26C:
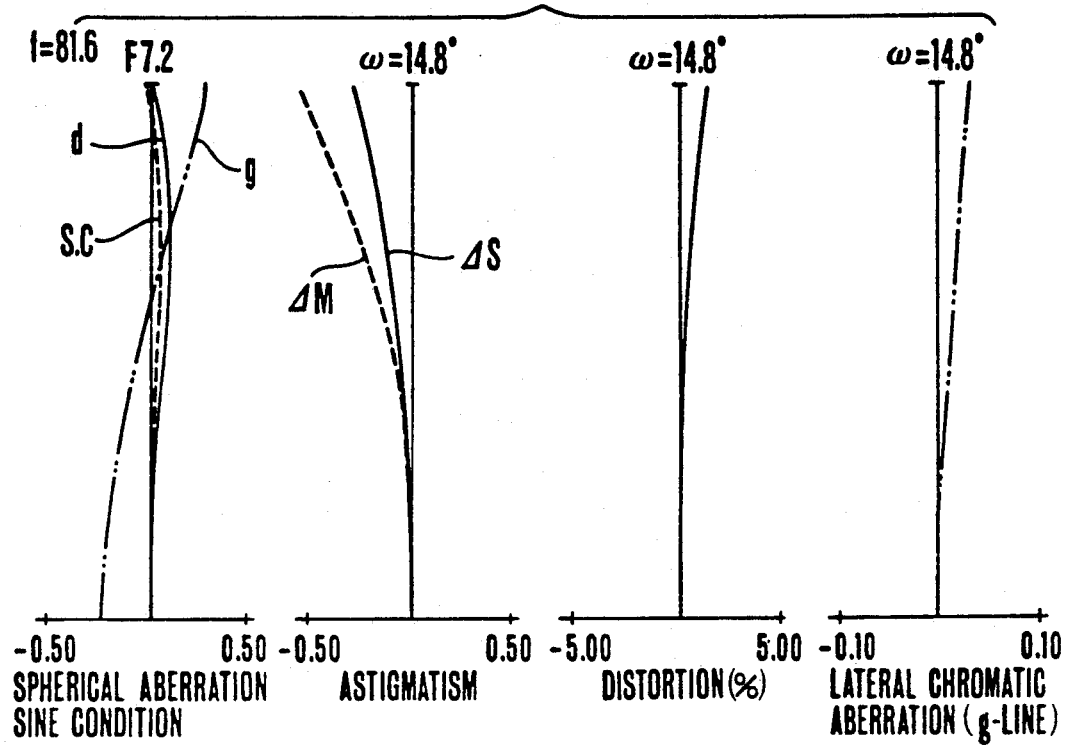
Figure 27A:
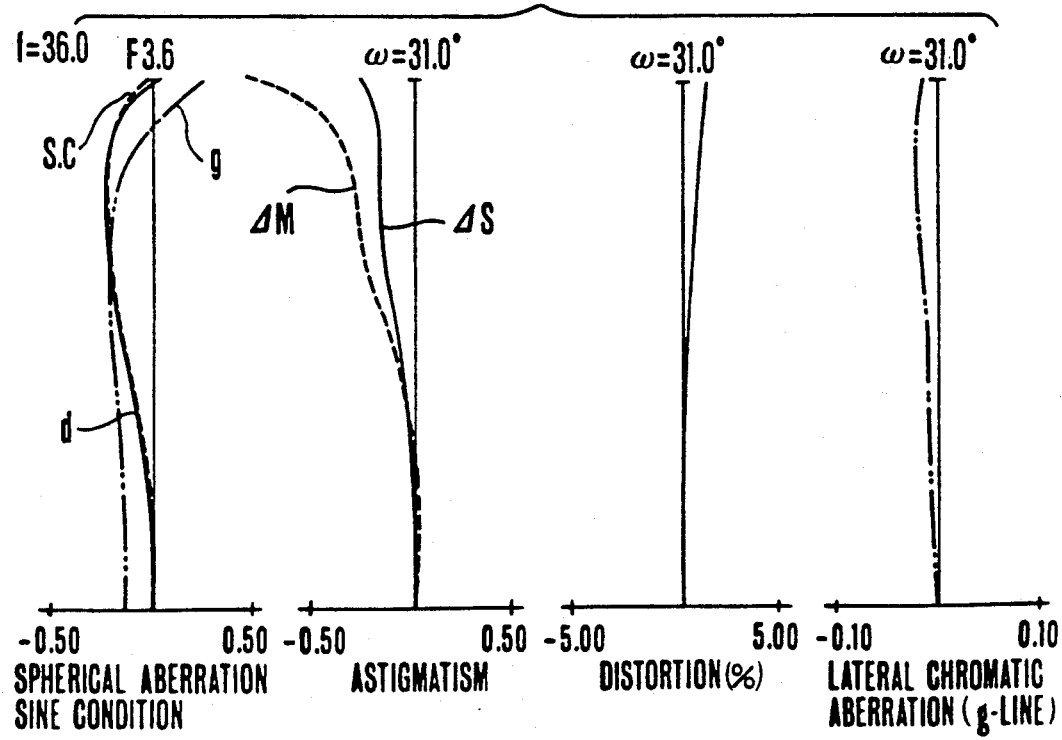
Figure 27B:
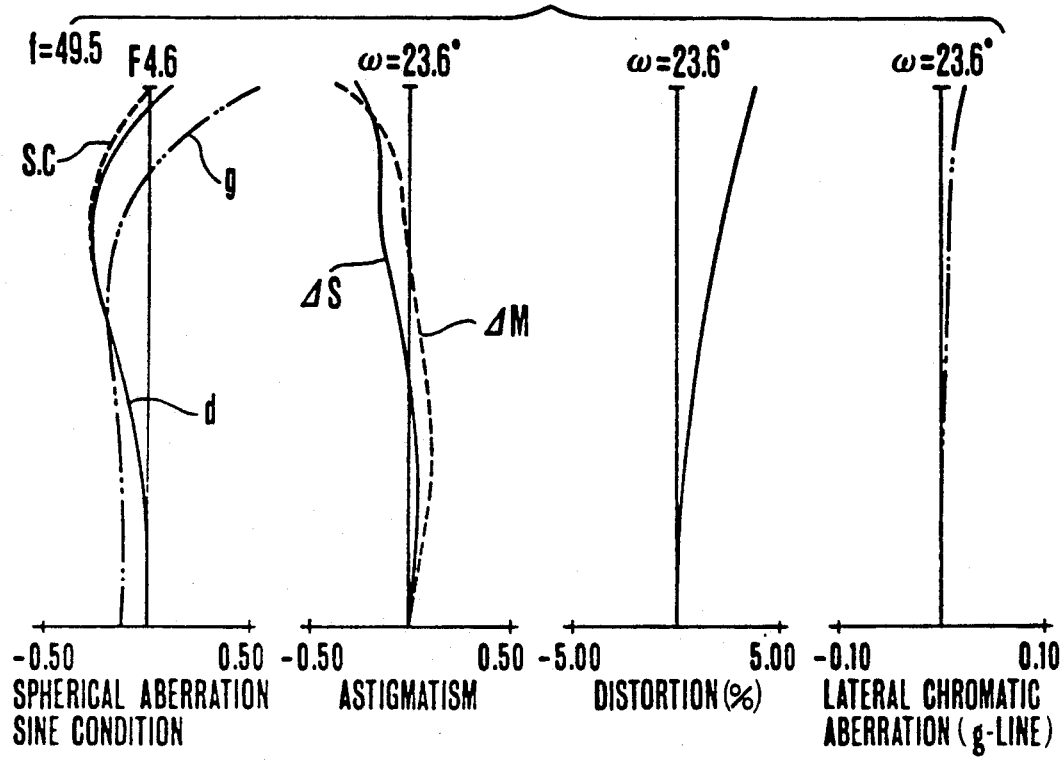
Figure 27C:
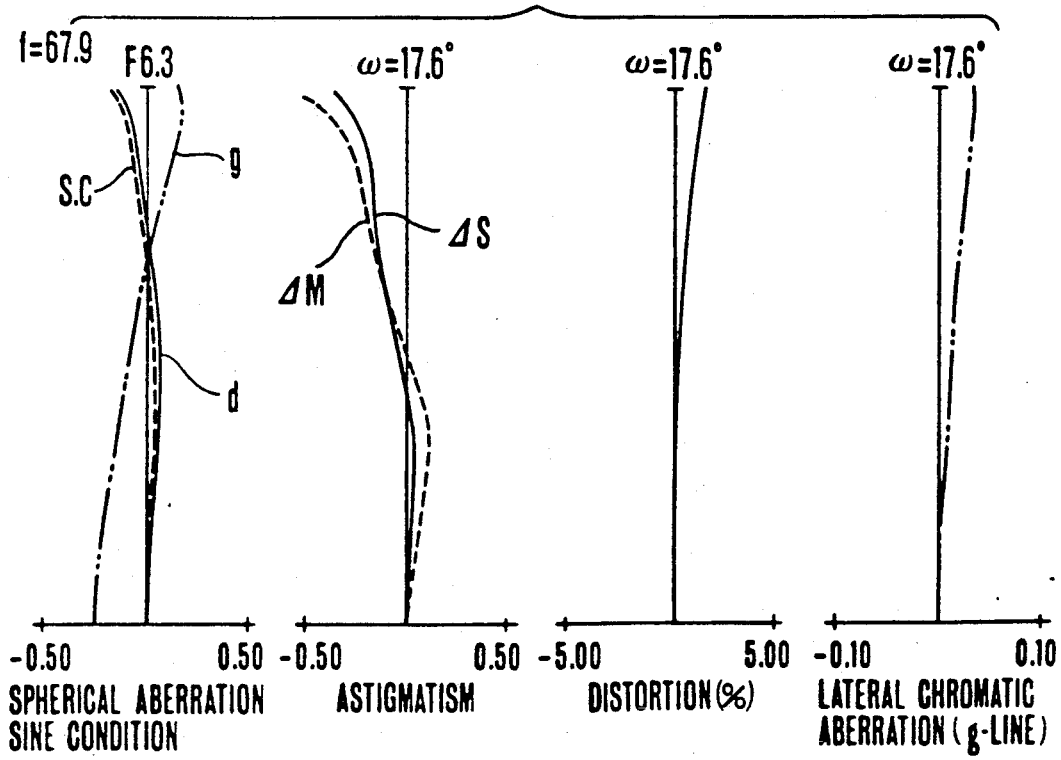
Figure 28A:
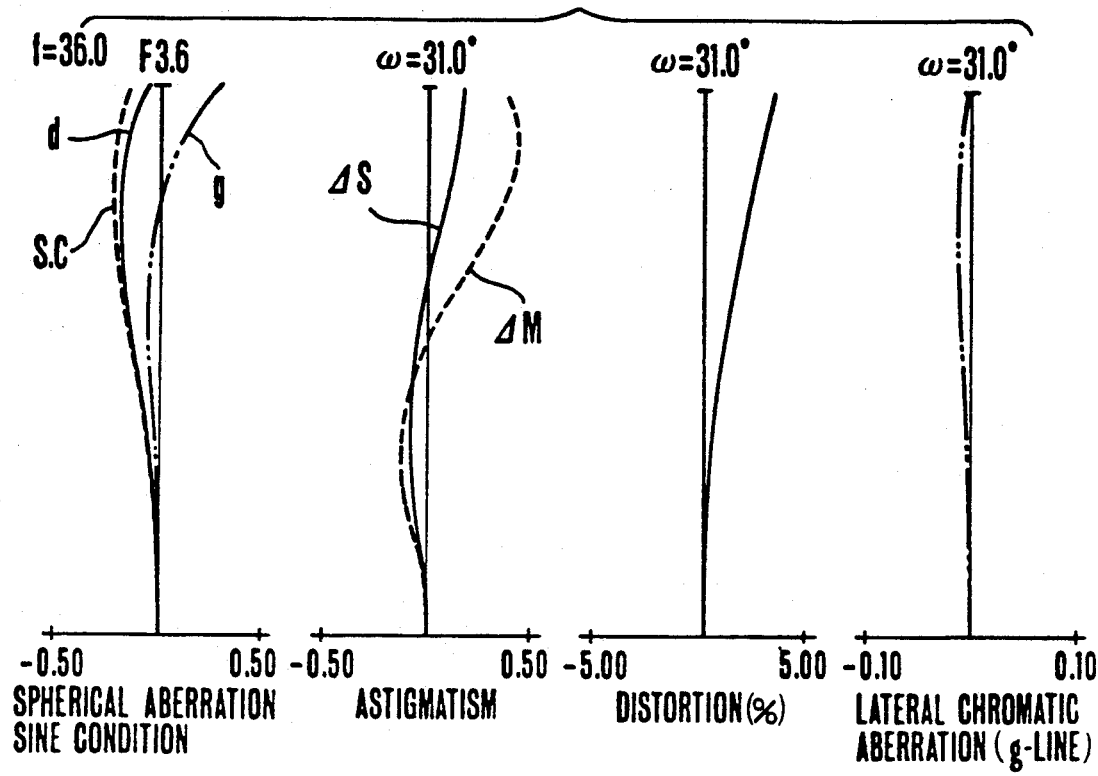
Figure 28B:
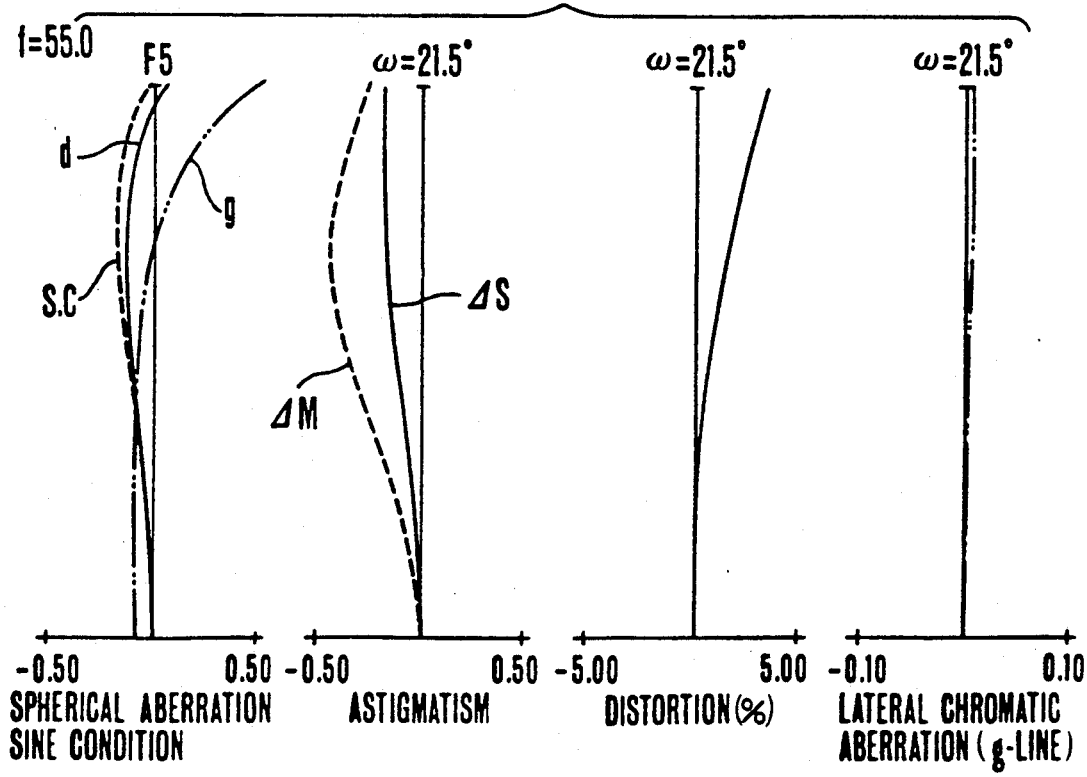
Figure 28C:
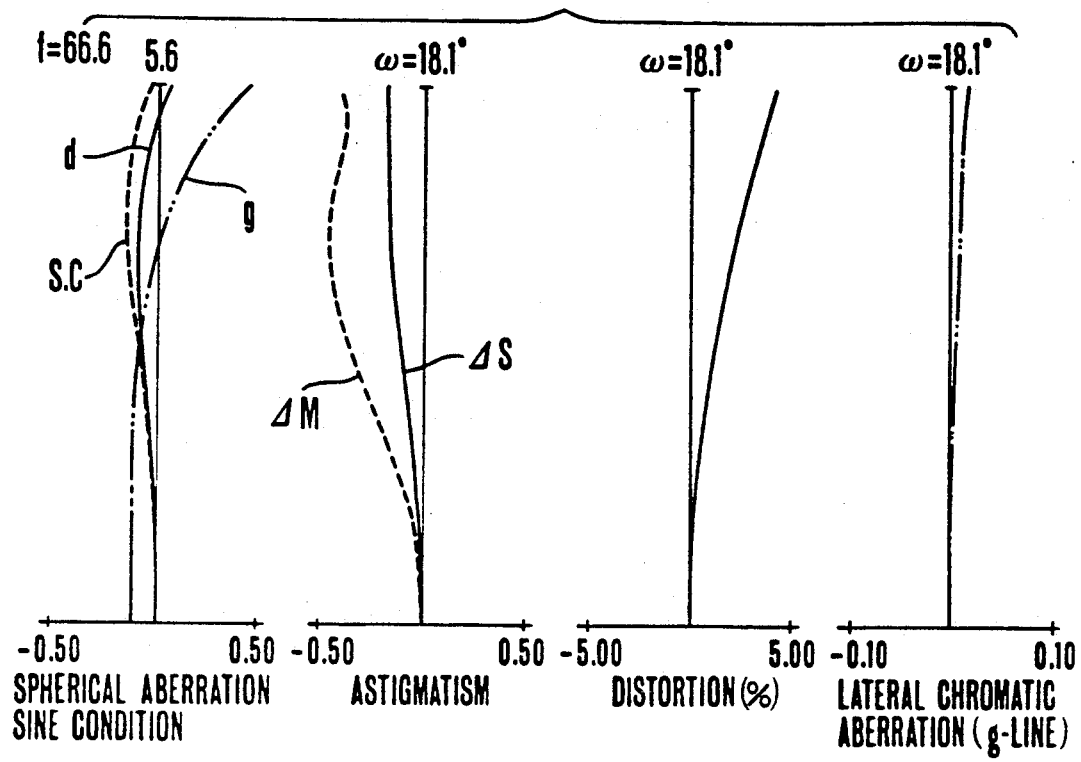
Figure 29A:
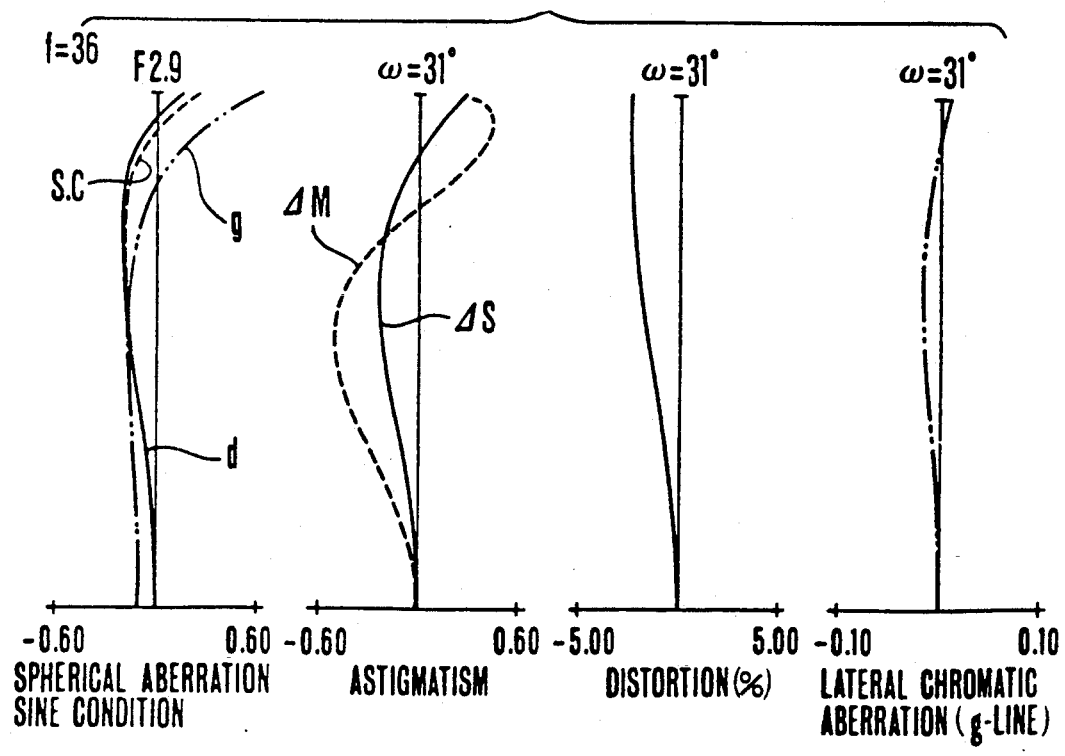
Figure 29B:
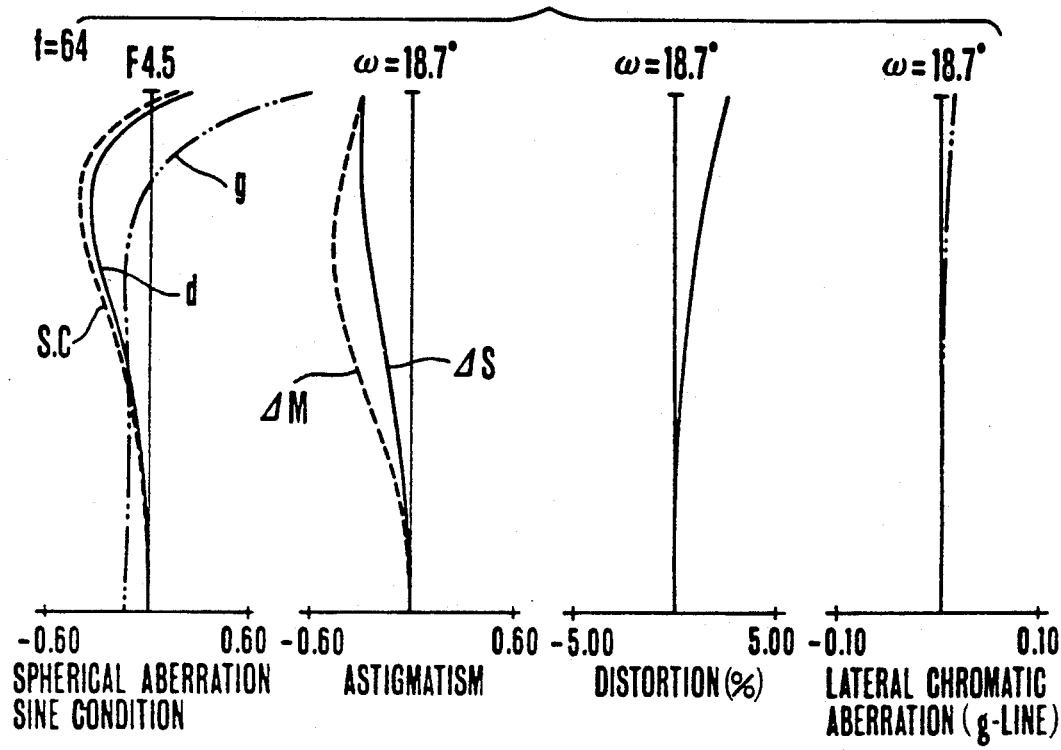
Figure 29C:
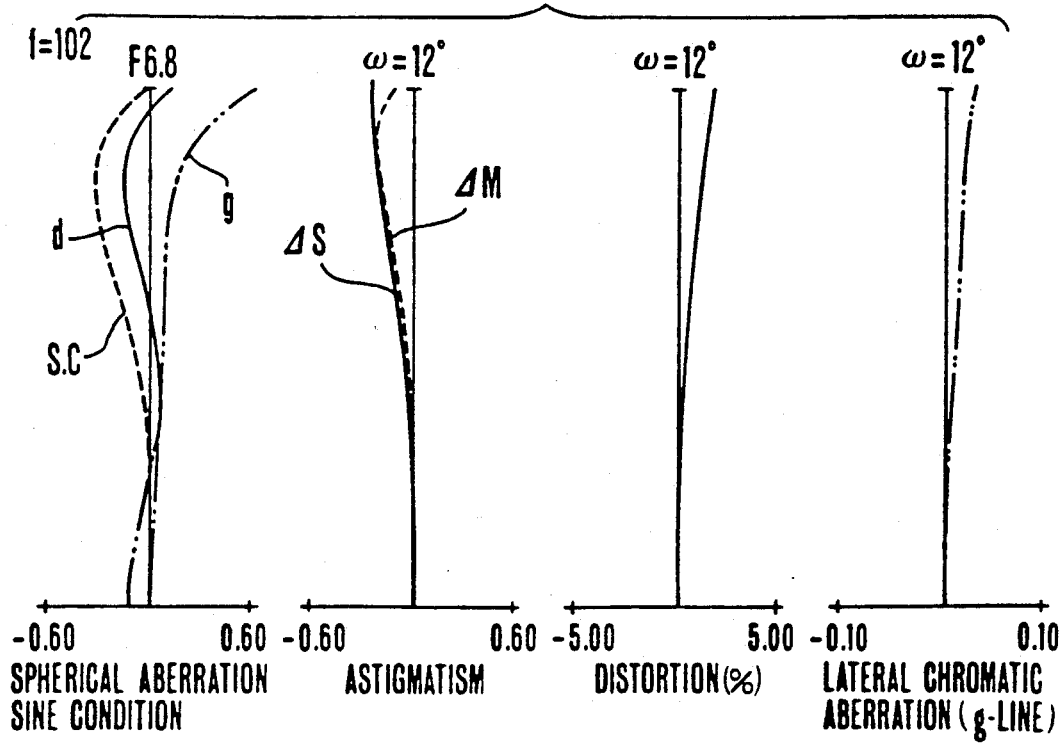

In the lens block diagrams, I, II and III represent the first, second and third lens units respectively with their arrows indicating the direction of movement during zooming from the wide angle to the telephoto end. In the aberration curves, the suffixes (A), (B) and (C) of the figure numbers represent the wide angle, middle and telephoto settings respectively d and g are d- and g-lines of the spectrum respectively S.C. is the sine condition, and ΔS and ΔM are the sagittal and meridional image surfaces respectively.

DETAILED DESCRIPTION OF THE PREFERRED EMBODIMENTS

FIGS. 1(A) and (B) in schematic diagram are taken to explain the principle of design of the zoom lens of reduced size according to the invention. Its wide angle and telephoto positions are shown in FIGS. 1(A) and 1(B), respectively. The firs±lens unit I of negative power is stationary during zooming. The second lens unit II of positive power and the third lens unit III of negative power, when zooming, axially move in different paths from each other as shown by the respective arrows. IS is an image surface at which photographic film is to be placed.

In this general embodiment, the zoom lens is designed in such a way as, in a basic arrangement, to have the features of both the retrofocus and telephoto types of the two-groups form of zoom lens. Thus, in the zooming position at the wide angle end the refractive power of the composite lens part L2 composed of the positive second and negative third lens units II and III is made positive, so that the entire lens system is of the retrofocus type. In this embodiment, the separation between the first lens unit and the second lens unit is made greater than the separation between the second lens unit and the third lens unit. However, the structure may be made just the opposite without any problem. Thus, the separation between the first lens unit and the second lens unit may be smaller than that between the second lens unit and the third lens unit. And, as zooming from the wide angle to the telephoto end, the first lens unit I is made to remain stationary, and the first and second lens units II and III are made to axially move forward in differential relation. Thus, a valuable increase in the zoom ratio is achieved.

And, in zooming position at the telephoto end the refractive power of the composite lens part L1 composed of the first and second lens units I and II is made positive so that the entire lens system is of the telephoto type. In this embodiment, the differential relation is such that the separation between the first lens unit and the second lens- unit is narrower than the separation between the second lens unit and the third lens unit. However, the relation may be modified without any problem. Thus, the separation between the first lens unit and the second lens unit may be greater than that between the second lens unit and the third lens unit.

In such a manner, according to the invention, the refractive powers of all the constituent lens units and their variable air separations with zooming are so determined that as zooming from the wide angle to the telephoto end, the zoom lens of the two-groups form is changed over from the retrofocus type to the telephoto type of a smaller telephoto ratio. By this, the increase in the maximum angular field can be achieved with ease. Moreover, the range of variation of the image magnification can be extended without causing an unduly large increase of stress upon the operating mechanism. Hence, the present invention has achieved a zoom lens of reduced size with the total length shortened.

In a specific embodiment of the invention, a range for the refractive power of the third lens unit III is given by the following inequalities (1).

$$0.5f_W < |f_3| < 4f_T \qquad (1)$$

where $f_3$ is the focal length of the third lens unit III, and $f_W$ and $f_T$ are the shortest and longest focal lengths of the entire lens system.

When this condition is satisfied, the merits of both lens types, or the retrofocus and telephoto types, are advantageously obtained. If the refractive power of the third lens unit is too strong as beyond the lower limit of the inequalities of condition (1). the contribution of the third lens unit to the variation of the image magnification must be unduly made large or increased. Another disadvantage is that, for the purpose of well correcting aberrations, the positive refractive power of the second lens unit cannot be so much increased. As a result, the negative refractive power of the first lens unit is so weakened that a power distribution of the retrofocus type becomes difficult to establish in the wide angle positions. In other words, the proportion of that region of the zooming range which has the power distribution of the telephoto type is very much increased. For this reason, the disadvantage of the telephoto type of the two-groups form of zoom lens becomes apparent. That is, the responsiveness of the image shift to the movement of the the second lens unit of positive power is increased objectionably.

When the refractive power of the third lens unit becomes so weak and is beyond the upper limit of the inequalities of condition (1), the reverse situation to the above is encountered, or it becomes difficult to form the power distribution of the telephoto type in the telephoto positions. This implies that the zoom lens of the two-group form is of the retrofocus type throughout almost the entire zooming range. As a result, the telephoto ratio for the telephoto positions has a larger value than desired, or the distance from the front vertex to the image surface is increased objectionably.

For example, in this embodiment, if emphasis is laid on the shortening of the above-defined distance, or total length, it is preferred to set forth $|f_3|<2f_T$.

With the good of achieving such a minimization of the size of the entire lens system, in order to widen the maximum angular field and maintain a good stability of optical performance throughout the entire zooming range, the following conditions are set forth:

$$0.5<f_2/f_W<2 \tag{2}$$

$$0.5f_W<|f_1|<4f_T \tag{3}$$

$$0.25<f_3/f_1<4 \tag{4}$$

$$0<e_{1T}/f_T<0.3 \tag{5}$$

where $f_1$ and $f_2$ are the focal lengths of the first and second lens units respectively, and $e_{1T}$ is the interval distance between the principal points of the first and second lens units in the telephoto end.

The inequalities of condition (2) gives a range for the refractive power of the second lens unit. When the refractive power becomes so strong as to be beyond the lower limit, variation of aberrations with zooming is increased. Particularly the spherical aberration in the telephoto positions becomes difficult to correct well. When it becomes too weak as to be beyond the upper limit, the total length of the lens system is increased objectionably.

The inequalities of condition (3) gives a range for the negative refractive power of the first lens unit. When the negative refractive power becomes so strong as to be beyond the lower limit, the telephoto ratio in the telephoto end is increased with increase of the total length. When it becomes so weak as to be beyond the upper limit, the magnification varying action of the second lens unit is weakened. For the prescribed zoom ratio to be obtained, the total zooming movements of the second and third lens units have to be increased. As a result, the inclination of the cam for variation of the magnification increases. Further, the responsiveness to the second lens unit is increased objectionably.

The inequalities of condition (4) gives a range for the ratio of the refractive powers of the first and third lens units particularly for the purpose of making symmetrical the power distribution over the entire lens system to correct aberrations, and particularly distortion for a high grade of imagery over the entire area of the picture format. When the lower limit of the inequalities of condition (4) is exceecded, a poor symmetry of the power arrangement results, and the refractive power of the first lens unit becomes too weak. Therefore, as has been described above, the magnification varying action of the second lens unit is weakened, and the responsiveness of the second lens unit is increased objectionably.

When the refractive power of the first lens unit becomes so strong compared with that of the third lens unit as beyond the upper limit of the inequalities of condition (4), a poor symmetry of the power arrangement results, and the telephoto ratio in the telephoto end is increased which in turn increases the total length objectionably.

The inequalities of condition (5) give a range for the interval distance between the principal points of the first and second lens units in the telephoto end to allow for sufficient total movement of all the zoom lens units.

Since, in this embodiment, the only lens unit of positive power is the second one, because, as zooming from the wide angle to the telephoto end, the second lens unit is made to linearly move forward to obtain the required zoom ratio efficiently, the interval distance between the principal points of the first and second lens units takes a minimum value.

On this account, the inequalities of condition (5) are set forth to hold a proper range of variation of the principal points of the first and second lens units. When the lower limit is exceeded, the first and second lens units interfere with each other mechanically. When the upper limit is exceeded, it becomes difficult to obtain the zoom ratio efficiently.

To achieve a further improvement of the contrastive balance between the retrofocus and telephoto types of the two-groups formof zoom lens in the wide angle and telephoto ends respectively, the present invention sets forth the following additional conditions:

$$0.5<|f_1|/f_{23W}<8 \tag{6}$$

$$0.3<f_{12T}/|f_3|<4 \tag{7}$$

$$0<e_{2W}/e_{1W}<3 \tag{8}$$

$$0<e_{1T}/e_{2T}<0.8 \tag{9}$$

where $f_{23W}$ is the overall focal length of the second and third lens units in the wide angle end, $e_{1W}$ and $e_{2W}$ are the principal point interval distance between the first and second lens units and between the second and third lens units in the wide angle end respectively, $f_{12T}$ is the overall focal length of the first and second lens units in the telephoto end, and $e_{2T}$ is the principal point interval distance between the second and third lens units in the telephoto end.

When the negative refractive power of the first lens unit becomes so strong as to be beyond the lower limit of the inequalities of condition (6), the optical features of the retrofocus type become so prominent as to unduly largely increase the total length of the lens system. When the negative refractive power of the first lens unit becomes too weak as beyond the upper limit, the optical features of the retrofocus type conversely become so faint that the desired increase of the maximum angular field is difficult to achieve.

When the negative refractive power becomes so weak as to be beyond the lower limit of the inequalities of condition (7), the optical features of the telephoto type becomes so poor as to unduly increase the total length of the lens system. When it becomes so strong as to be beyond the upper limit, the optical features of the telephoto type conversely become so prominent as to increase the responsiveness to the second lens unit of positive power objectionably.

When the spacing between the second and third lens units becomes shorter than the lower limit of the inequalities of condition (8), a mechanical interference will result. When the upper limit is exceeded, the good symmetry of the refractive power arrangement over all the lens units is broken so as to increase the difficulty of well correcting the aberrations, particularly the distortion.

When the spacing between the first and second lens units becomes shorter than the lower limit of the inequalities of condition (9), the tendency to mechanical interference between the first and second lens units is intensified. When it becomes longer than the upper limit, it becomes difficult to obtain the zoom ratio advantageously. Also, when the spacing between the second and third lens units becomes shorter than the upper limit, the responsiveness to the second lens unit of positive power is increased objectionably as in the telephoto type of the a two-groups form of zoom lens.

To maintain the stress on the operating mechanism for all the zoom units at a minimum, the invention further sets forth the following conditions:

$$0.01 < |M_2|/(Z \cdot f_T) < 0.3$$
$$0.01 < |M_3|/(Z \cdot f_T) < 0.3 \quad (10)$$
$$|M_2 - M_3|/(Z \cdot f_T) < 0.1 \quad (11)$$

where Mi is the movement of the i-th lens unit when zooming from the wide angle to the telephoto end, Z is the zoom ratio and i has the value 1, 2 or 3.

The inequalities of condition (10) specify the total zooming movement of each of the second and third lens units in terms of the longest focal length of the entire system and the zoom ratio.

When the lower limit is exceeded, the responsivenesses to the second and third lens units both are increased although the total zooming movement of each of these lenses is reduced to effect an equivalent zoom ratio to the required one. In order to retain the accuracy of zooming control, the complexity of structure of the operating mechanism has to be increased.

When the upper limit is exceeded, the total movement of each zoom unit must be increased with the result of an increased total length of the lens system. Or otherwise, the required value of the zoom ratio would not be obtained.

The inequality of condition (11) specifies the difference between the total zooming movements of the second and third lens units in terms of the longest focal length of the entire system and the zoom ratio. When this condition is violated, the inclination of the cam for variation of the magnification is so increased as to increase the difficulty of moving the zoom units with high accuracy.

To stabilize good correction of aberrations, particularly spherical aberration in the telephoto positions, the compact zoom lens of the invention is preferably constructed from a first lens unit consisting of at least one negative lens which turns its concave surface toward the rear, and at least one positive lens in the meniscus form that is convex toward the front.

Even though, in this embodiment, the focusing from infinity to the minimum object distance is performed by moving the first lens unit, the lens system may otherwise be bodily moved to effect focusing. Another focusing method as by moving the third lens alone may be employed. There is still another usable focusing method of moving the first and second lens units in unison or the second and third lens units in unison.

Examples of specific zoom lenses of the invention can be constructed in accordance with the numerical data given in the following tables for the radii of curvature, R, the axial thicknesses or air separations, D, and the refractive indices, N, and Abbe numbers, $\nu$, of the glasses of the various lens elements with the subscripts numbered consecutively from front to rear.

The shape of an aspheric surface is expressed in coordinates with its X-axis in the optical axis and an H-axis in the direction perpendicular to the optical axis, the direction in which light advances being taken positive, by the following equation:

$$X = \frac{(1/R) H^2}{1 + \sqrt{1 - (H/R)^2}} + AH^2 + BH^4 + CH^6 + DH^8 + EH^{10}$$

wherein R represents the radius of curvature of the osculating sphere and A, B, C, D and E are the aspheric coefficients.

Numerical Example 1: (FIGS. 2(A), 2(B), 8(A) to 8(C))

F = 100 − 188.9    FNo = 1:3.6 − 5.1    $2\omega$ = 62.0° − 35.3°

| | | |
|---|---|---|
| R1 = 564.61 | D1 = 4.72 | N1 = 1.74400  $\nu$1 = 44.7 |
| R2 = 53.18 | D2 = 6.22 | |
| R3 = 56.79 | D3 = 11.82 | N2 = 1.72825  $\nu$2 = 28.5 |
| R4 = 111.01 | D4 = Variable | |
| R5 = 61.69 | D5 = 11.74 | N3 = 1.60311  $\nu$3 = 60.7 |
| R6 = −670.44 | D6 = 0.42 | |
| R7 = 43.08 | D7 = 9.96 | N4 = 1.51633  $\nu$4 = 64.1 |
| R8 = 272.08 | D8 = 2.51 | |
| R9 = −172.38 | D9 = 11.51 | N5 = 1.80518  $\nu$5 = 25.4 |
| R10 = 42.99 | D10 = 3.14 | |
| R11 = 125.38 | D11 = 7.70 | N6 = 1.72825  $\nu$6 = 28.5 |
| R12 = −89.25 | D12 = Variable | |
| R13 = −89.16 | D13 = 12.35 | N7 = 1.59270  $\nu$7 = 35.3 |
| R14 = −53.44 | D14 = 6.75 | |
| R15 = −49.55 | D15 = 3.61 | N8 = 1.60311  $\nu$8 = 60.7 |
| R16 = −84.89 | D16 = 6.46 | |
| R17 = −49.40 | D17 = 4.17 | N9 = 1.60311  $\nu$9 = 60.7 |
| R18 = −98.91 | | |

| | f = 100 | f = 138.9 | f = 188.9 |
|---|---|---|---|
| D4 | 48.87 | 26.65 | 2.21 |
| D12 | 36.71 | 21.12 | 19.15 |

Numerical Example 2: (FIGS. 3(A), 3(B), 9(A) to 9(C))

F = 100 − 188.9    FNo = 1:4.1 − 5.8    $2\omega$ = 62.0° − 35.3°

| | | |
|---|---|---|
| R1 = −1295.06 | D1 = 4.72 | N1 = 1.74400  $\nu$1 = 44.7 |
| R2 = 50.40 | D2 = 7.86 | |
| R3 = 58.45 | D3 = 10.63 | N3 = 1.72825  $\nu$2 = 28.5 |
| R4 = 149.56 | D4 = Variable | |
| R5 = 54.94 | D5 = 9.77 | N3 = 1.51633  $\nu$3 = 64.1 |
| R6 = −185.41 | D6 = 0.42 | |
| R7 = 43.43 | D7 = 13.55 | N4 = 1.51633  $\nu$4 = 64.1 |
| R8 = 217.43 | D8 = 1.93 | |
| R9 = −159.29 | D9 = 8.94 | N5 = 1.80518  $\nu$5 = 25.4 |
| R10 = 38.19 | D10 = 2.97 | |
| R11 = 115.08 | D11 = 5.11 | N6 = 1.72825  $\nu$6 = 28.5 |
| R12 = −101.53 | D12 = Variable | |
| R13 = 3490.42 | D13 = 8.18 | N7 = 1.63980  $\nu$7 = 34.5 |
| R14 = −90.63 | D14 = 4.76 | |
| R15 = −65.39 | D15 = 4.17 | N8 = 1.60311  $\nu$8 = 60.7 |
| R16 = 257.28 | | |

R2: Aspheric Coefficients
A = 0, B = 7.105 × $10^{-8}$, C = 1.598 × $10^{-11}$
D = −5.112 × $10^{-16}$, E = −2.340 × $10^{-20}$

| | f = 100 | f = 138.9 | f = 188.9 |
|---|---|---|---|
| D4 | 50.27 | 26.33 | 2.21 |
| D12 | 31.97 | 16.52 | 23.63 |

Numerical Example 3: (FIGS. 4(A), 4(B), 10(A) to 10(C))

F = 100 − 188.9    FNo = 1:3.6 − 4.6    $2\omega$ = 6.20° − 35.3°

| | | |
|---|---|---|
| R1 = −1131.44 | D1 = 4.72 | N1 = 1.74400  $\nu$1 = 44.7 |
| R2 = 56.30 | D2 = 4.14 | |
| R3 = 55.18 | D3 = 10.89 | N2 = 1.72825  $\nu$2 = 28.5 |
| R4 = 129.37 | D4 = Variable | |
| R5 = 60.65 | D5 = 9.00 | N3 = 1.51633  $\nu$3 = 64.1 |

-continued

| | | |
|---|---|---|
| R6 = −203.85 | D6 = 0.42 | |
| R7 = 44.05 | D7 = 8.07 | N4 = 1.51633 ν4 = 64.1 |
| R8 = 391.18 | D8 = 2.10 | |
| R9 = −174.84 | D9 = 11.66 | N5 = 1.80518 ν5 = 25.4 |
| R10 = 45.49 | D10 = 2.97 | |
| R11 = 112.71 | D11 = 5.70 | N6 = 1.72825 ν6 = 28.5 |
| R12 = −106.08 | D12 = Variable | |
| R13 = −81.50 | D13 = 10.26 | N7 = 1.58347 ν7 = 30.2 |
| R14 = −49.51 | D14 = 10.87 | |
| R15 = −36.37 | D15 = 4.17 | N8 = 1.60311 ν8 = 60.7 |
| R16 = −212.41 | | |

R2: Aspheric Coefficients:
$A = 0, B = 2.807 \times 10^{-7}, C = 1.084 \times 10^{-10}$
$D = 1.499 \times 10^{-14}, E = 8.132 \times 10^{-18}$ R11: Aspheric Coefficients:
$A = 0, B = -8.093 \times 10^{-8}, C = -9.622 \times 10^{-11}$
$D = -2.517 \times 10^{-14}, E = 9.869 \times 10^{-16}$ R14: Aspheric Coefficients:
$A = 0, B = 6.544 \times 10^{-8}, C = 1.410 \times 10^{-10}$
$D = -1.246 \times 10^{-13}, E = -2.454 \times 10^{-21}$

| | f = 100 | f = 138.9 | f = 188.9 |
|---|---|---|---|
| D4 | 44.65 | 24.72 | 2.22 |
| D12 | 37.12 | 25.67 | 24.36 |

Numerical Example 4: (FIGS. 5(A), 5(B), 11(A) to 11(C))
F = 100 − 188.9   FNo = 1:4.1 − 5.8   2ω = 62.0 − 35.3°

| | | |
|---|---|---|
| R1 = −466.09 | D1 = 4.72 | N1 = 1.74400 ν1 = 44.7 |
| R2 = 48.77 | D2 = 7.37 | |
| R3 = 57.51 | D3 = 10.49 | N2 = 1.72825 ν2 = 28.5 |
| R4 = 157.16 | D4 = Variable | |
| R5 = 57.26 | D5 = 9.09 | N3 = 1.51633 ν3 = 64.1 |
| R6 = −174.24 | D6 = 0.42 | |
| R7 = 42.61 | D7 = 13.82 | N4 = 1.51633 ν4 = 64.1 |
| R8 = 184.25 | D8 = 2.72 | |
| R9 = −159.41 | D9 = 8.67 | N5 = 1.80518 ν5 = 25.4 |
| R10 = 37.58 | D10 = 2.56 | |
| R11 = 103.26 | D11 = 4.99 | N6 = 1.72825 ν6 = 28.5 |
| R12 = −88.34 | D12 = Variable | |
| R13 = −205.37 | D13 = 10.95 | N7 = 1.63636 ν7 = 35.4 |
| R14 = −65.07 | D14 = 4.17 | N8 = 1.60311 ν8 = 60.7 |
| R15 = 333.79 | | |

R2: Aspheric Coefficients:
$A = 0, B = 7.735 \times 10^{-8}, C = 1.374 \times 10^{-11}$
$D = -6.777 \times 10^{-16}, E = -9.742 \times 10^{-19}$

| | f = 100 | f = 138.9 | f = 188.9 |
|---|---|---|---|
| D4 | 48.70 | 24.77 | 2.22 |
| D12 | 37.06 | 32.86 | 48.40 |

Numerical Example 5: (FIGS. 6(A), 6(B), 12(A) to 12(C))
F = 100 − 188.9   FNo = 1:4.1 − 5.8   2ω = 62.0° − 35.3°

| | | |
|---|---|---|
| R1 = 63.88 | D1 = 4.72 | N1 = 1.74400 ν1 = 44.7 |
| R2 = 37.82 | D2 = 14.15 | |
| R3 = −351.29 | D3 = 3.61 | N2 = 1.74400 ν2 = 44.7 |
| R4 = 125.28 | D4 = 1.58 | |
| R5 = 62.20 | D5 = 7.58 | N3 = 1.72825 ν3 = 28.5 |
| R6 = 195.62 | D6 = Variable | |
| R7 = 53.59 | D7 = 8.42 | N4 = 1.60311 ν4 = 60.7 |
| R8 = −483.42 | D8 = 5.56 | |
| R9 = 41.84 | D9 = 10.00 | N5 = 1.51633 ν5 = 64.1 |
| R10 = 217.79 | D10 = 1.76 | |
| R11 = −153.24 | D11 = 9.07 | N6 = 1.80518 ν6 = 25.4 |
| R12 = 38.84 | D12 = 2.68 | |
| R13 = 148.32 | D13 = 5.56 | N7 = 1.72825 ν7 = 28.5 |
| R14 = −84.29 | D14 = Variable | |
| R15 = −281.49 | D15 = 9.88 | N8 = 1.63980 ν8 = 34.5 |
| R16 = −68.06 | D16 = 3.89 | |
| R17 = −54.06 | D17 = 4.17 | N9 = 1.60311 ν7 = 60.7 |
| R18 = −5803.50 | | |

| | f = 100 | f = 138.9 | f = 188.9 |
|---|---|---|---|
| D6 | 51.64 | 26.12 | 2.13 |
| D14 | 24.41 | 13.87 | 24.63 |

Numerical Example 6: (FIGS. 7(A), 7(B), 13(A) to 13(C))
F = 100 − 212.7   FNo = 1:4.1 − 5.8   2ω = 61.7° − 31.4°

| | | |
|---|---|---|
| R1 = −374.12 | D1 = 3.78 | N1 = 1.77250 ν1 = 49.6 |
| R2 = 50.90 | D2 = 5.47 | |

In FIGS. 14 to 21 there is shown an embodiment of the invention where the lens system comprises a first lens unit I of negative power, a second lens unit II of positive power and a third lens unit of negative power.

The zoom lens according to this embodiment is operated in such a manner that when zooming from the wide angle to the telephoto end, the second and third lens units are both made to move forward, but the speed of the third lens unit is faster than that of the second lens unit as indicated by the arrows.

Also, in the specific embodiments shown in FIGS. 14 to 19, when zooming from the wide angle to the telephoto end, the first lens unit, too, is made to move forward along with the second and third lens units. The effect of such movement into the first lens unit is to assist in shortening the total length of the entire system at the wide angle end. In other words, a refractive power arrangement that shortens the total length of the lens in the wide angle positions, and elongates it in the telephoto positions will result.

Further, in order to achieve a minimization of the bulk and size of the entire lens system while still maintaining good optical performance throughout the entire zooming range, the invention sets forth the following conditions.

The principal point interval distances E1w and E2w between the first and second lens units and between the second and third lens units respectively when in the wide angle end, and the focal length f3 of the third lens unit and the longest focal length FT of the entire lens system must lie within the following ranges:

$$0.25 < E1w/E2w < 2 \quad (12)$$

$$0.3 < |f3|/FT < 0.8 \quad (13)$$

Particularly when the above-described form of the three lens units is employed in the zoom lens, it is of importance that the principal point interval distance ratio or E1w/E2w satisfies the condition (12).

In this manner, not only the back focal distance for the wide angle end is shortened, but a great reduction of the total length of the lens in the wide angle end is achieved.

When the upper limit of the inequalities of condition (12) is exceeded, the back focal distance increases more than necessary. Meanwhile, when the lower limit is exceeded, the back focal distance conversely becomes so short that the third lens unit and the focal plane are too much close to each other to prevent drawbacks such as, for example, foreign particles on the lens surface being imaged on the photosensitive surface, and ghosting by the reflection from each lens surface.

To make narrower the range for the back focal distance, it is preferred to set the upper limit at 0.95, or to make the condition (12) set forth by inequalities: 0.25 < E1w/E2w < 0.95.

In this embodiment it is more preferred to alter the inequalities of condition (12) to 0.4 < E1w/E2w < 0.8.

Also, by giving a range for the ratio of the focal length f3 of the third lens unit to the longest focal length FT of the entire lens system as the inequalities of condition (13), a minimization of the bulk and size of the entire lens system is achieved while maintaining good optical performance throughout the entire zooming range.

In other words, since the refractive power of the third lens unit is made strong to a certain extent, because the entirety of lens system in the telephoto end is of the telephoto type in some measure, a good compromise exists between the requirements of increasing the focal length and minimizing the bulk and size of the entire lens system.

When the upper limit is exceeded, the tendency toward the telephoto type i-s weakened to increase the size of the entire lens system. When the lower limit is exceeded, the tendency toward the telephoto type is conversely too much intensified. Although the size of the entire lens system becomes easy to minimize, the curvature of field tends to be over-corrected, so that good optical performance becomes difficult to obtain.

If a more improved result is desired in this embodiment, it is preferred to alter the inequalities of condition (13) to $0.35 < |f3|/FT < 0.6$.

Though these conditions alone suffice for accomplishing the objects of the invention, a zoom lens of more compact form well corrected for good stability of aberrations over the entire focusing range is obtained when the following conditions are satisfied:

$$0.5 < Lw/FT < 1.15 \quad (14)$$

$$0.4 < |f1|/FT < 1.1 \quad (15)$$

where f1 is the focal length of the first lens unit and Lw is the distance from the frontmost lens surface to the image plane.

When the upper limit of the inequalities of condition (14) is exceeded, the lens system is entirely increased in size. When the lower limit is exceeded, the prescribed zoom ratio becomes difficult to obtain.

The inequalities of condition (15) set forth a proper focusing movement of the first lens unit with a minimum variation of aberrations over the focusing range. When the negative refractive power of the first lens unit becomes so weak as to exceed the upper limit of the condition (15), the total focusing movement is increased to increase the diameter of the front members objectionably. When the lower limit is exceeded, as the refractive power of the first lens unit becomes too strong, the range of variation of aberrations with focusing is increased objectionably, though the diameter of the front members can be decreased.

If a more improved result is desired in this embodiment, it is preferred to narrow the ranges of the conditions (14) and (15) as $0.7 < Lw/FT < 1.0$ and $0.55 < |f1|/FT < 0.85$ respectively.

To achieve a further improvement of the minimization of the size o: the entire lens system in this embodiment, it is preferred that when zooming the first lens unit is made to move along with the second and third lens units. And, to allow for such a movement of the first lens unit to be made easily, the total zooming movements of the second and third lens units denoted by "s" and "t" respectively must lie in the following range:

$$0.6 < s/t < 0.9 \quad (16)$$

When the third lens unit is made move at such a faster speed than that of movement of the second lens unit so as to satisfy the condition (16), it is facilitated to minimize the size of the entire lens system while securing the zoom ratio to the prescribed value.

When the total zooming movement of the third lens unit is so much longer than that of the second lens unit as exceed the lower limit of the condition (16), mechanical interference arises between the second and third lens units on the telephoto side. When the upper limit is exceeded, as the total movement of the third lens unit is so small compared with the second lens unit, despite the introduction of dependent movement to the first lens unit, it becomes difficult to advantageously minimize the size of the entire lens system.

In order while the size of the entire lens system is limited to a minimum, and the variation of aberrations with zooming is well corrected, the second lens unit is preferably constructed as comprising, from front to rear, not fewer than two positive lenses, a negative lens and a positive lens. In that way, particularly the second lens unit can well be corrected in itself for the less amount of aberrations produced.

It is also preferred to construct the third lens unit in such a way that it has a positive lens and at least one negative lens, and at least one of its lens surfaces is made aspherical with such a shape that the refracting power if negative becomes progressively weaker (if positive, stronger) toward the margin of the lens. According to this, good stability of correction of distortion and lateral chromatic aberration can be maintained throughout the entire zooming range.

Further, the first lens unit is preferably constructed in such a way that it has a negative lens and a positive lens, and one of its lens surfaces is made aspherical with such a shape that the refracting power if positive becomes progressively weaker (and if negative, then stronger) toward the margin of the lens. Accordingly, the barrel type distortion produced from the second lens unit can well be compensated for.

Besides this form and construction and arrangement of the zoom lens as embodied in the specific examples 7 to 14 whose numerical data will be shown later, there are preferred embodiments described below.

The first lens unit is constructed either with, from front to rear, a meniscus-shaped negative lens of forward convexity, a negative lens and a positive lens, totalling three lenses, or with a negative lens a meniscus-shaped positive lens of forward convexity, and a negative lens, totalling three lenses, or with a negative lens and two meniscus-shaped positive lenses of forward convexity, totalling three lenses.

The second lens unit is constructed either with two positive lenses, a meniscus-shaped positive lens of forward convexity, a negative lens and a positive lens, totalling five lenses, or with a positive lens, a meniscus-shaped positive lens of forward convexity, a negative lens and two positive lenses, totalling five lenses, or with a positive lens, a meniscus-shaped positive lens of forward convexity, two negative lenses and a positive lens, totalling five lenses.

The third lens unit is constructed either with a negative lens, a positive lens and a meniscus-shaped negative lens of rearward convexity, totalling three lenses, or with a positive lens, a negative lens, and a positive lens, totalling three lenses, or with two meniscus-shaped positive lenses of rearward convexity, and two meniscus-shaped negative lenses of rearward convexity, totalling four lenses.

Numerical examples 7 to 14 of the invention are shown below. In the numerical examples 7 to 14, Ri is the radius of curvature of the i-th lens surface counting from front, Di is the i-th lens thickness or air separation counting from front, and Ni and νi are respectively the refractive index and Abbe number of the glass of the i-th lens element counting from front.

The values of the factors in the above-defined conditions for the numerical examples 7 to 14 are listed in Table II.

The equation for the aspherical surface in co-ordinates with the X-axis in the optical axis and H-axis in the direction perpendicular to the optical axis, the direction in which light advances being taken as positive, is given by the following expression:

$$X = \frac{(1/R)H^2}{1 + \sqrt{(1-(H/R)^2)}} + AH^2 + BH^4 + CH^6 + DH^8 + EH^{10} + FH^{12} + GH^{14} + HH^{16} + A^1H^3 + B^1H^5 + C^1H^7 + D^1H^9 + \ldots$$

where R is the radius of curvature of the paraxial region, and A, B, C, D, E, ..., A', B', C', D', ... are the aspherical coefficients. Also, the expression (D-Ox), for example, stands for $10^{-x}$.

Numerical Example 7:
F = 36.8~101.7   FNo = 1:2.8~6.7   2ω = 61°~24°

| | | |
|---|---|---|
| R1 = −105.50 | D1 = 1.97 | N1 = 1.72000  ν1 = 50.2 |
| R2 = 32.25 | D2 = 0.56 | |
| R3 = 22.77 | D3 = 3.11 | N2 = 1.68893  ν2 = 31.1 |
| R4 = 39.83 | D4 = variable | |
| R5 = 41.72 | D5 = 3.20 | N3 = 1.57135  ν3 = 53.0 |
| R6 = −58.47 | D6 = 0.20 | |
| R7 = 17.08 | D7 = 3.29 | N4 = 1.57135  ν4 = 53.0 |
| R8 = 86.35 | D8 = 1.93 | |
| R9 = −54.28 | D9 = 3.14 | N5 = 1.84666  ν5 = 23.9 |
| R10 = 20.02 | D10 = 0.79 | |
| R11 = 37.61 | D11 = 4.32 | N6 = 1.68893  ν6 = 31.1 |
| R12 = −27.42 | D12 = 1.64 | |
| R13 = stop | D13 = variable | |
| R14 = −30.00 | D14 = 4.81 | N7 = 1.68893  ν7 = 31.1 |
| R15 = −16.25 | D15 = 3.26 | |
| R16 = −70.84 | D16 = 1.74 | N8 = 1.66672  ν8 = 48.3 |
| R17 = −71.15 | | |

| f | 36.8 | 74.6 | 101.7 |
|---|---|---|---|
| D4 | 18.80 | 1.56 | 0.39 |
| D13 | 12.42 | 7.72 | 2.63 |

Aspherical Coefficients:
R3

| A | B | C | D |
|---|---|---|---|
| 2.978D-05 | −6.943D-06 | −2.661D-08 | 4.975D-11 |

| E |
|---|
| −2.905D-13 |

| A' | B' | C' | D' |
|---|---|---|---|
| −5.434D-06 | 8.9680D-08 | −5.298D-10 | 2.249D-12 |

R16

| A | B | C | D |
|---|---|---|---|
| −3.497D-02 | −5.938D-05 | −1.356D-08 | −5.547D-10 |

| E |
|---|
| 4.771D-12 |

| A' | B' | C' | D' |
|---|---|---|---|
| 2.158D-05 | 7.697D-07 | −2.059D-08 | 1.551D-10 |

| F | G | H |
|---|---|---|
| −3.289D-13 | 1.870D-15 | −8.291D-19 |

Numerical Example 8:
F = 36.5~97.3   FNo = 1:3.4~7.7   2ω = 61.4°~25°

| | | |
|---|---|---|
| R1 = −88.79 | D1 = 1.95 | N1 = 1.72000  ν1 = 50.2 |
| R2 = 27.82 | D2 = 0.58 | |
| R3 = 21.34 | D3 = 3.58 | N2 = 1.68893  ν2 = 31.1 |
| R4 = 45.98 | D4 = variable | |
| R5 = 33.10 | D5 = 3.36 | N3 = 1.57135  ν3 = 53.0 |
| R6 = −59.40 | D6 = 0.59 | |
| R7 = 16.68 | D7 = 3.06 | N4 = 1.57135  ν4 = 53.0 |
| R8 = 98.52 | D8 = 0.72 | |
| R9 = −53.22 | D9 = 4.33 | N5 = 1.84666  ν5 = 23.9 |
| R10 = 19.17 | D10 = 0.72 | |
| R11 = 41.10 | D11 = 3.69 | N6 = 1.68893  ν6 = 31.1 |
| R12 = −27.53 | D12 = 1.59 | |
| R13 = stop | D13 = variable | |
| R14 = −34.08 | D14 = 3.96 | N7 = 1.68893  ν7 = 31.1 |
| R15 = −15.52 | D15 = 2.75 | |
| R16 = −58.60 | D16 = 1.69 | N8 = 1.66672  ν8 = 48.3 |
| R17 = −94.33 | | |

| f | 36.5 | 70.7 | 97.3 |
|---|---|---|---|
| D4 | 16.07 | 1.05 | 0.69 |
| D13 | 13.11 | 8.37 | 2.45 |

Aspherical Coefficients:
R3

| A | B | C | D |
|---|---|---|---|
| 3.063D-05 | −7.446D-06 | −2.976D-08 | 7.224D-11 |

| E |
|---|
| −3.603D-13 |

R16

| A | B | C | D |
|---|---|---|---|
| −3.597D-02 | −6.077D-05 | −7.158D-08 | −8.399D-10 |

| E |
|---|
| −5.079D-12 |

Numerical Example 9:
F = 29.2~48.6   FNo = 1:3.6~5.5   2ω = 73°~48°

| | | |
|---|---|---|
| R1 = −117.68 | D1 = 1.40 | N1 = 1.72000  ν1 = 50.2 |
| R2 = 20.47 | D2 = 0.29 | |
| R3 = 13.95 | D3 = 2.26 | N2 = 1.68893  ν2 = 31.1 |
| R4 = 19.99 | D4 = variable | |
| R5 = 24.28 | D5 = 3.49 | N3 = 1.57135  ν3 = 53.0 |
| R6 = −38.33 | D6 = 0.18 | |
| R7 = 10.79 | D7 = 2.50 | N4 = 1.57135  ν4 = 53.0 |
| R8 = 39.73 | D8 = 0.73 | |
| R9 = −33.36 | D9 = 3.10 | N5 = 1.84666  ν5 = 23.9 |
| R10 = 12.05 | D10 = 0.30 | |
| R11 = 18.24 | D11 = 2.85 | N6 = 1.68893  ν6 = 31.1 |
| R12 = −16.49 | D12 = 1.01 | |
| R13 = stop | D13 = variable | |
| R14 = −17.28 | D14 = 2.77 | N7 = 1.68893  ν7 = 31.1 |
| R15 = −10.09 | D15 = 2.40 | |
| R16 = −41.95 | D16 = 1.07 | N8 = 1.66672  ν8 = 48.3 |
| R17 = −36.50 | | |

| f | 29.2 | 41 | 48.6 |
|---|---|---|---|
| D4 | 6.15 | 2.07 | 1.27 |
| D13 | 5.96 | 3.97 | 2.32 |

Aspherical Coefficients:
R3

| A | B | C | D |
|---|---|---|---|
| 4.818D-05 | −2.838D-05 | −2.690D-07 | 1.640D-09 |

| E |
|---|
| −1.997D-11 |

| A' | B' | C' | D' |
|---|---|---|---|
| −1.422D-05 | 6.144D-07 | −9.503D-09 | 1.056D-10 |

-continued

R16

| A | B | C | D |
|---|---|---|---|
| −5.658D-02 | −2.415D-04 | 1.226D-07 | −1.517D-08 |

| E |
|---|
| −5.988D-10 |

| A' | B' | C' | D' |
|---|---|---|---|
| 5.650D-05 | 5.273D-06 | −3.693D-07 | 7.281D-09 |

| F | G | H |
|---|---|---|
| 4.509D-12 | −1.168D-13 | 2.784D-16 |

Numerical Example 10:
F = 29.2~67.1    FNo = 1:3.4~6.8    2ω = 73°~35.6°

| R1 = −102.90 | D1 = 1.82 | N1 = 1.72000 | ν1 = 50.2 |
| R2 = 21.35 | D2 = 0.45 | | |
| R3 = 16.73 | D3 = 3.51 | N2 = 1.68893 | ν2 = 31.1 |
| R4 = 32.21 | D4 = variable | | |
| R5 = 27.30 | D5 = 3.16 | N3 = 1.57135 | ν3 = 53.0 |
| R6 = −59.14 | D6 = 0.43 | | |
| R7 = 13.17 | D7 = 2.65 | N4 = 1.57135 | ν4 = 53.0 |
| R8 = 91.04 | D8 = 0.60 | | |
| R9 = −42.82 | D9 = 3.39 | N5 = 1.84666 | ν5 = 23.9 |
| R10 = 15.57 | D10 = 0.45 | | |
| R11 = 32.62 | D11 = 2.69 | N6 = 1.68893 | ν6 = 31.1 |
| R12 = −21.48 | D12 = 1.27 | | |
| R13 = stop | D13 = variable | | |
| R14 = −29.25 | D14 = 3.08 | N7 = 1.68893 | ν7 = 31.1 |
| R15 = −12.37 | D15 = 2.11 | | |
| R16 = −43.38 | D16 = 1.35 | N8 = 1.66672 | ν8 = 48.3 |
| R17 = −83.38 | | | |

| f | 29.2 | 50.5 | 67.1 |
|---|---|---|---|
| D4 | 13.16 | 3 | 2.25 |
| D13 | 10.42 | 6.96 | 2.8 |

Aspherical Coefficients:

R3

| A | B | C | D |
|---|---|---|---|
| 3.833D-05 | −1.468D-05 | −8.615D-08 | 4.011D-10 |

| E |
|---|
| −2.762D-12 |

R16

| A | B | C | D |
|---|---|---|---|
| −4.502D-02 | −1.211D-04 | −2.423D-07 | −2.279D-09 |

| E | F | G | H |
|---|---|---|---|
| −7.527D-11 | 6.036D-15 | 8.063D-15 | −4.076D-17 |

Numerical Example 11:
F = 36.1~81.6    FNo = 1:3.6~7.2    2ω = 61.8°~27.6°

| R1 = −108.20 | D1 = 1.99 | N1 = 1.72000 | ν1 = 50.2 |
| R2 = 28.03 | D2 = 1.00 | | |
| R3 = 21.52 | D3 = 3.06 | N2 = 1.68893 | ν2 = 31.1 |
| R4 = 40.65 | D4 = variable | | |
| R5 = 35.11 | D5 = 3.81 | N3 = 1.57135 | ν3 = 53.0 |
| R6 = −59.17 | D6 = 0.69 | | |
| R7 = 16.18 | D7 = 3.28 | N4 = 1.57135 | ν4 = 53.0 |
| R8 = 107.77 | D8 = 1.00 | | |
| R9 = −54.48 | D9 = 4.36 | N5 = 1.84666 | ν5 = 23.9 |
| R10 = 18.17 | D10 = 0.47 | | |
| R11 = 37.62 | D11 = 4.86 | N6 = 1.68893 | ν6 = 31.1 |
| R12 = −26.25 | D12 = 0.70 | | |
| R13 = stop | D13 = variable | | |
| R14 = −31.17 | D14 = 3.53 | N7 = 1.68893 | ν7 = 31.1 |
| R15 = −15.47 | D15 = 2.86 | | |
| R16 = −69.69 | D16 = 1.40 | N8 = 1.66672 | ν8 = 48.3 |
| R17 = −86.90 | | | |

| f | 36.1 | 58 | 81.6 |
|---|---|---|---|
| D4 | 13.8 | 3 | 2.24 |
| D13 | 12.69 | 8.98 | 2.45 |

Aspherical Coefficients:

R3

| A | B | C | D |
|---|---|---|---|
| 3.134D-05 | −7.611D-06 | −3.365D-08 | 9.151D-11 |

| E |
|---|
| −4.708D-13 |

| A' | B' | C' | D' |
|---|---|---|---|
| −6.019D-06 | 1.100D-07 | −7.199D-10 | 3.385D-12 |

R16

| A | B | C | D |
|---|---|---|---|
| −3.680D-02 | −6.623D-05 | −3.254D-09 | −1.453D-09 |

| E |
|---|
| −1.169D-11 |

| A' | B' | C' | D' |
|---|---|---|---|
| 2.390D-05 | 9.441D-07 | −2.797D-08 | 2.333D-10 |

| F | G | H |
|---|---|---|
| 2.767D-13 | −2.130D-15 | 2.362D-20 |

Numerical Example 12:
F = 36~67.9    FNo = 1:3.6~6.3    2ω = 62°~35.3°

| R1 = −48.92 | D1 = 1.20 | N1 = 1.72000 | ν1 = 50.2 |
| R2 = 33.35 | D2 = 0.13 | | |
| R3 = 17.60 | D3 = 2.95 | N2 = 1.68893 | ν2 = 31.1 |
| R4 = 27.81 | D4 = variable | | |
| R5 = 21.83 | D5 = 3.42 | N3 = 1.57135 | ν3 = 53.0 |
| R6 = −40.38 | D6 = 0.18 | | |
| R7 = 12.73 | D7 = 2.92 | N4 = 1.57135 | ν4 = 53.0 |
| R8 = 33.66 | D8 = 0.77 | | |
| R9 = −42.35 | D9 = 1.98 | N5 = 1.84666 | ν5 = 23.9 |
| R10 = 13.66 | D10 = 0.73 | | |
| R11 = 21.97 | D11 = 2.29 | N6 = 1.68893 | ν6 = 31.1 |
| R12 = −23.54 | D12 = 1.20 | | |
| R13 = stop | D13 = variable | | |
| R14 = −33.98 | D14 = 3.16 | N7 = 1.68893 | ν7 = 31.1 |
| R15 = −12.34 | D15 = 1.26 | | |
| R16 = −11.68 | D16 = 1.00 | N8 = 1.77250 | ν8 = 49.6 |
| R17 = −39.09 | D17 = 2.40 | | |
| R18 = −13.02 | D18 = 1.27 | N9 = 1.77250 | ν9 = 49.6 |
| R19 = −22.84 | | | |

| f | 36 | 49.5 | 67.9 |
|---|---|---|---|
| D4 | 7.4 | 3 | 2.43 |
| D13 | 8.44 | 6.27 | 1.87 |

Aspherical Coefficients:

R3

| A | B | C | D |
|---|---|---|---|
| 4.062D-05 | −1.887D-05 | −1.151D-07 | 4.735D-10 |

| E |
|---|
| −5.007D-12 |

| A' | B' | C' | D' |
|---|---|---|---|
| −1.011D-05 | 3.103D-07 | −3.411D-09 | 2.694D-11 |

Numerical Example 13:
F = 36~66.6    FNo = 1:3.6~5.6    2ω = 62°~36.2°

| R1 = −1042.62 | D1 = 1.73 | N1 = 1.74400 | ν1 = 44.7 |
| R2 = 20.45 | D2 = 1.46 | | |
| R3 = 20.13 | D3 = 4.35 | N2 = 1.72825 | ν2 = 28.5 |
| R4 = 47.39 | D4 = variable | | |
| R5 = 21.57 | D5 = 2.83 | N3 = 1.51633 | ν3 = 64.1 |
| R6 = −84.83 | D6 = 0.15 | | |
| R7 = 15.78 | D7 = 2.78 | N4 = 1.51633 | ν4 = 64.1 |
| R8 = 110.63 | D8 = 0.62 | | |
| D9 = −68.35 | D9 = 4.47 | N5 = 1.80518 | ν5 = 25.4 |
| R10 = 16.15 | D10 = 0.70 | | |
| R11 = 43.51 | D11 = 1.73 | N6 = 1.72825 | ν6 = 28.5 |
| R12 = −36.25 | D12 = 1.21 | | |
| R13 = stop | D13 = variable | | |
| D14 = −29.14 | D14 = 4.62 | N7 = 1.58347 | ν7 = 30.2 |

-continued

| | | | |
|---|---|---|---|
| R15 = −16.62 | D15 = 3.68 | | |
| R16 = −11.64 | D16 = 1.33 | N8 = 1.60311 | ν8 = 60.7 |
| R17 = −63.11 | | | |

| f | 36 | 55 | 66.6 |
|---|---|---|---|
| D4 | 20.963 | 10.783 | 5.33 |
| D13 | 11.704 | 6.959 | 6.523 |

Aspherical Coefficients:

R2

| A | B | C | D |
|---|---|---|---|
| 0.0 | 5.346D-06 | 9.493D-09 | 2.747D-11 |

| E |
|---|
| 1.128D-13 |

R15

| A | B | C | D |
|---|---|---|---|
| 0.0 | −1.635D-05 | 8.199D-08 | −6.834D-10 |

| E |
|---|
| −1.265D-11 |

Numerical Example 14:
F = 36 − 102   FNO = 1:29 − 6.8   2ω = 61.7 − 24.1°

| | | | |
|---|---|---|---|
| R1 = −66.840 | D1 = 2.20 | N1 = 1.80518 | ν1 = 25.4 |
| R2 = −42.680 | D2 = 1.00 | | |
| R3 = −49.553 | D3 = 1.10 | N2 = 1.88300 | ν2 = 40.8 |
| R4 = 26.923 | D4 = 0.15 | | |
| R5 = 20.655 | D5 = 3.60 | N3 = 1.68893 | ν3 = 31.1 |
| R6 = 101.425 | D6 = variable | | |
| R7 = 72.649 | D7 = 2.80 | N4 = 1.48749 | ν4 = 70.2 |
| R8 = −31.394 | D8 = 0.15 | | |
| R9 = 15.395 | D9 = 3.60 | N5 = 1.66672 | ν5 = 48.3 |
| R10 = −1169.650 | D10 = 1.00 | N6 = 1.92286 | ν6 = 21.3 |
| R11 = 54.093 | D11 = 1.80 | | |
| R12 = stop | D12 = 1.80 | | |
| R13 = −32.304 | D13 = 1.22 | N7 = 1.75520 | ν7 = 27.5 |
| R14 = 20.991 | D14 = 1.35 | | |
| R15 = 58.071 | D15 = 2.59 | N8 = 1.68893 | ν8 = 31.1 |
| R16 = −20.716 | D16 = variable | | |
| R17 = −33.059 | D17 = 3.16 | N9 = 1.68893 | ν9 = 31.1 |
| R18 = −17.339 | D18 = 2.91 | | |
| R19 = −12.746 | D19 = 1.10 | N10 = 1.72916 | ν10 = 54.7 |
| R20 = −70.756 | D20 = 15.41 | | |

| f | 36 | 64 | 102 |
|---|---|---|---|
| D6 | 18.83 | 5.24 | 0.38 |
| D16 | 8.92 | 5.16 | 1.05 |

Aspherical Coefficients:

R5

| A | B | C | D |
|---|---|---|---|
| 0 | −1.505D-05 | 5.090D-08 | −8.986D-10 |

| E |
|---|
| 2.451D-12 |

R16

| A | B | C | D |
|---|---|---|---|
| 0 | 1.408D-5 | 1.007D-08 | −1.436D-09 |

| E |
|---|
| 1.749D-11 |

R18

| A | B | C | D |
|---|---|---|---|
| 0 | −2.344D-05 | 2.380D-07 | −2.749D-09 |

| E |
|---|
| 1.088D-11 |

TABLE 11

| condition | Numerical Examples | | | | | | | |
|---|---|---|---|---|---|---|---|---|
| | 7 | 8 | 9 | 10 | 11 | 12 | 13 | 14 |
| (12) E1w/E2w | 0.774 | 0.686 | 0.517 | 0.686 | 0.654 | 0.433 | 0.846 | 0.928 |
| (13) \|f3\|/FT | 0.413 | 0.42 | 0.534 | 0.486 | 0.489 | 0.453 | 0.609 | 0.391 |
| (14) Lw/FT | 0.749 | 0.745 | 0.962 | 0.89 | 0.859 | 0.784 | 1.13 | 0.738 |
| (15) \|f1\|/FT | 0.617 | 0.627 | 0.797 | 0.725 | 0.731 | 0.677 | 0.993 | 0.576 |
| (16) s/t | 0.8 | 0.777 | 0.757 | 0.748 | 0.735 | 0.758 | 0.751 | 0.838 |

Figure 30:
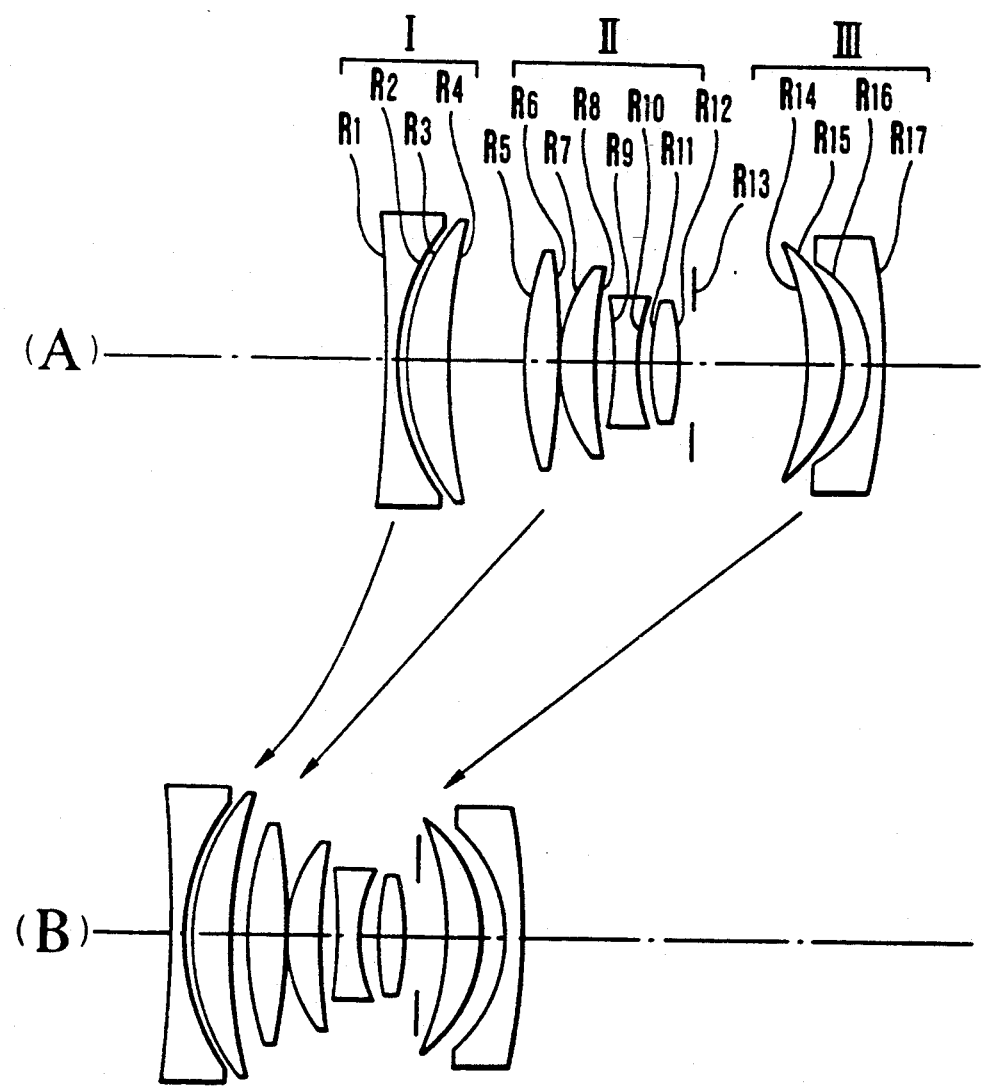
FIGS. 30 to 32 are longitudinal section view: of numerical examples 15 to 17 of specific lenses of the invention respectively.
Figure 31:
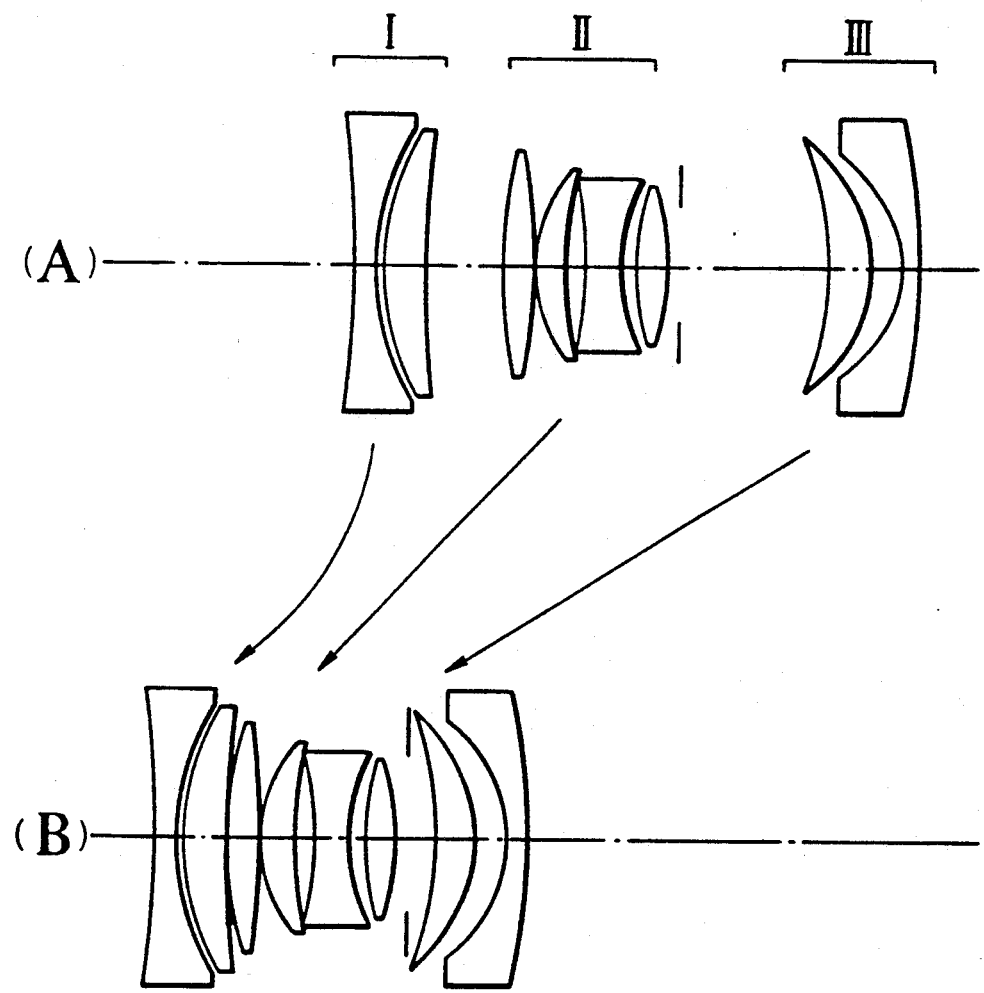
Figure 32:
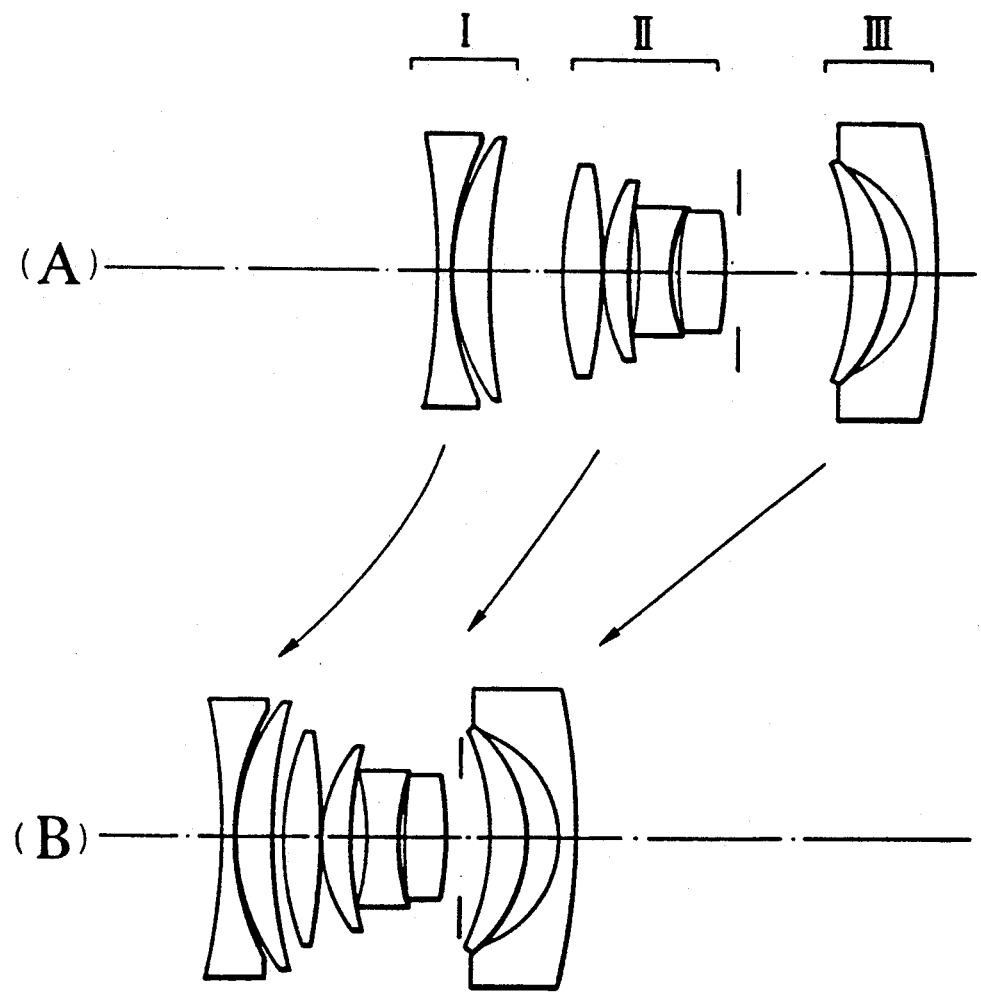
Figure 33A:
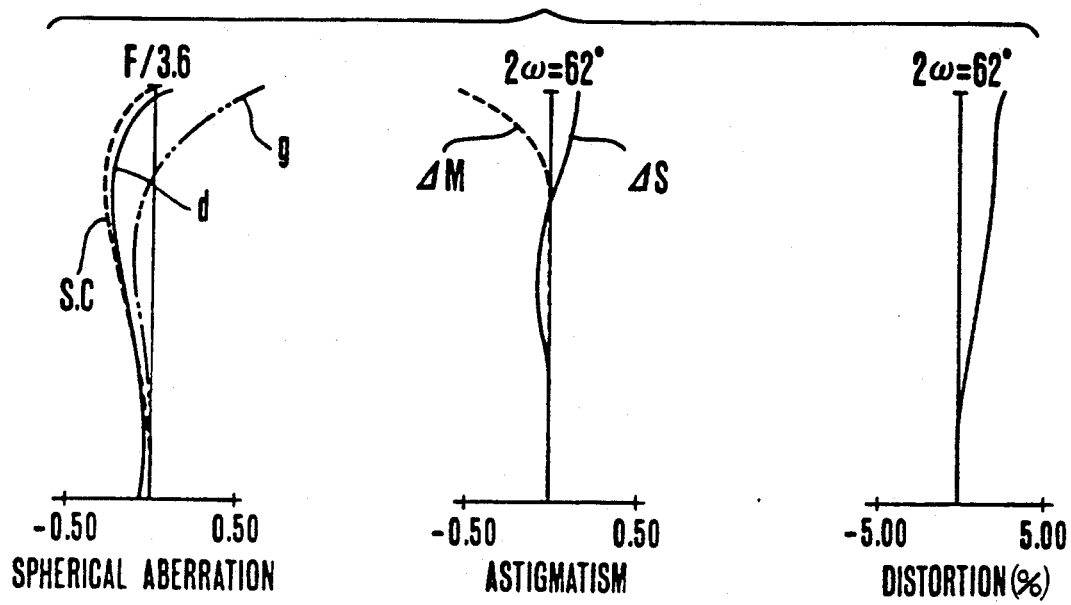
FIGS. 33(A)-33(C) to 35(A)-35(C) are graphic representations of the various aberrations of the lenses of FIGS. 30 to 32 respectively.
Figure 33B:
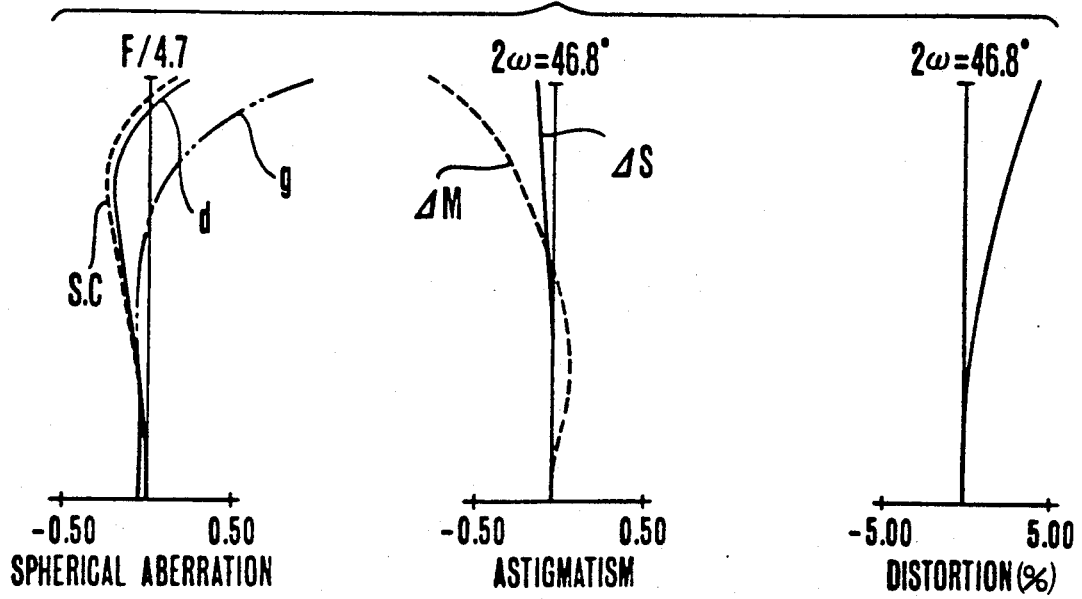
Figure 33C:
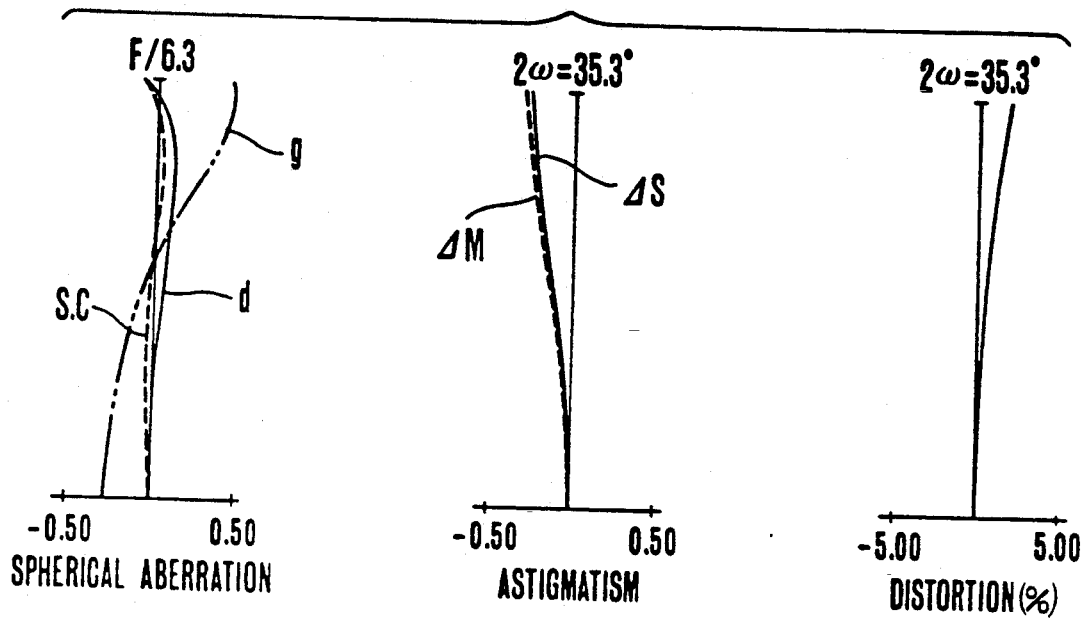
Figure 34A:
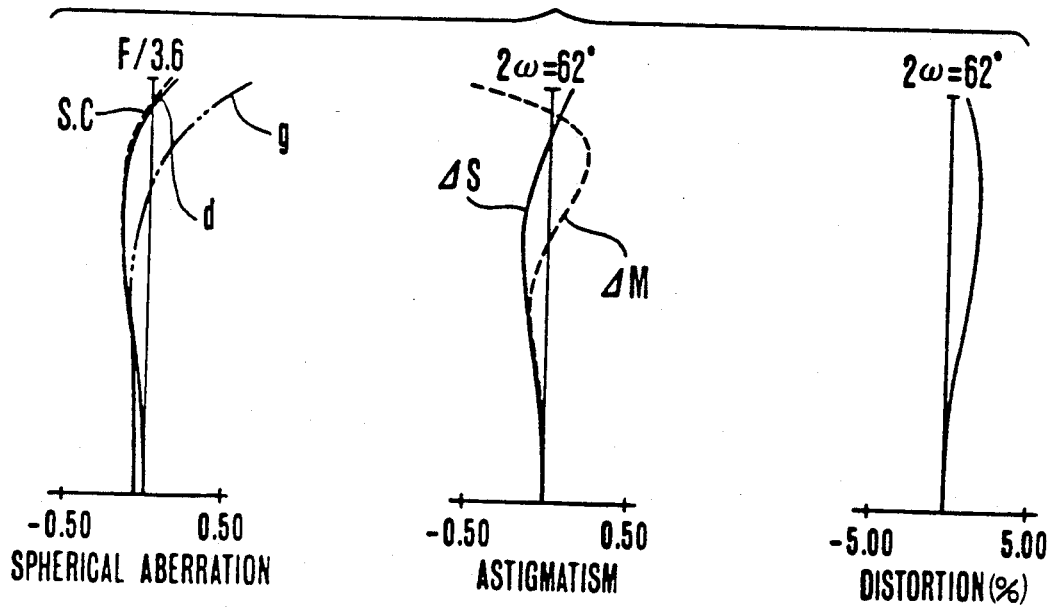
Figure 34B:
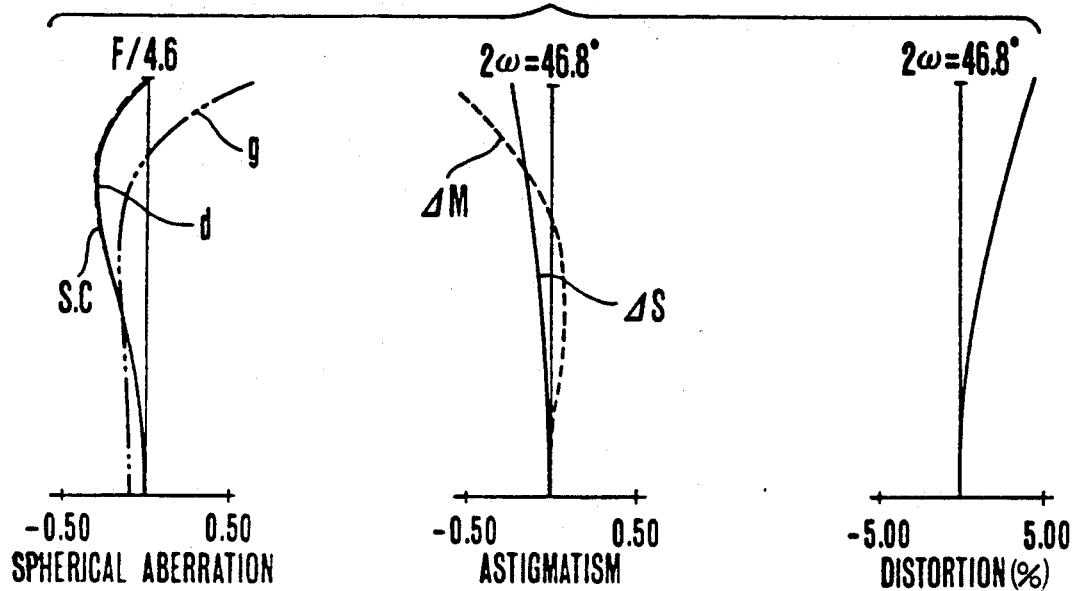
Figure 34C:
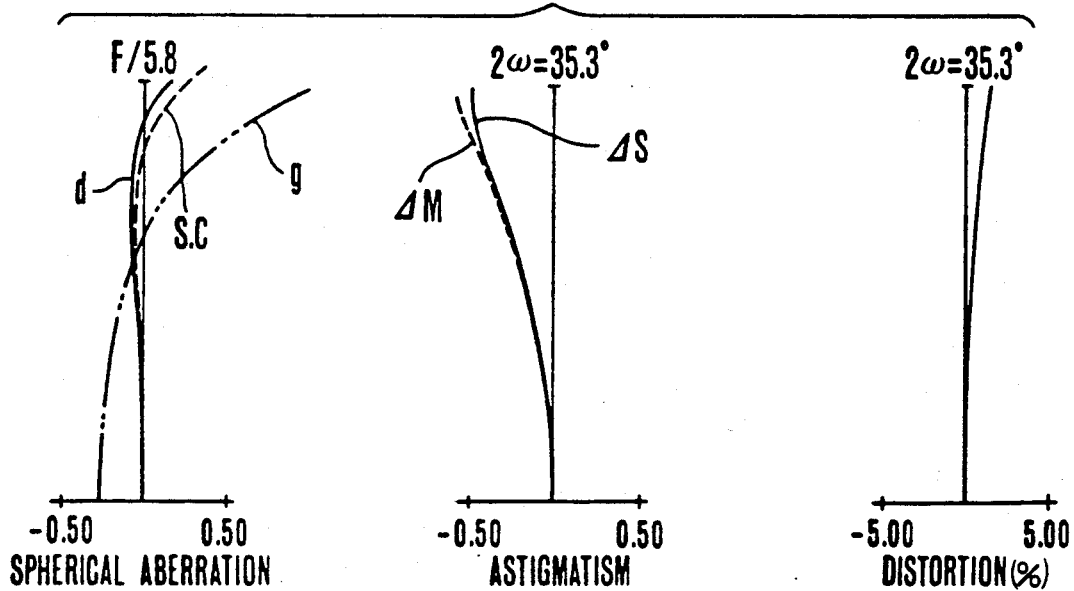
Figure 35A:
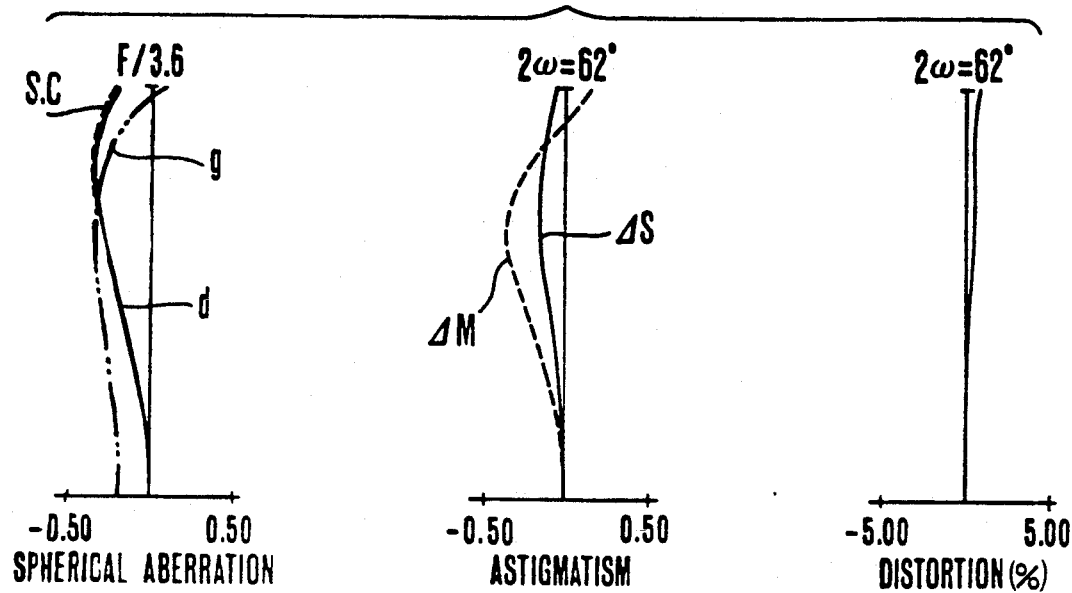
Figure 35B:
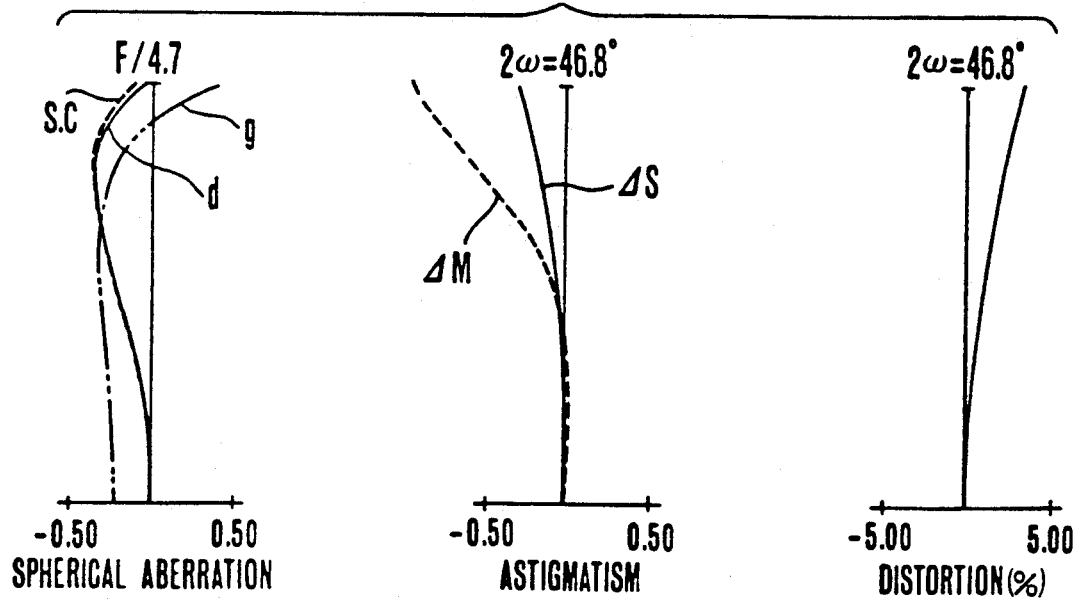
Figure 35C:
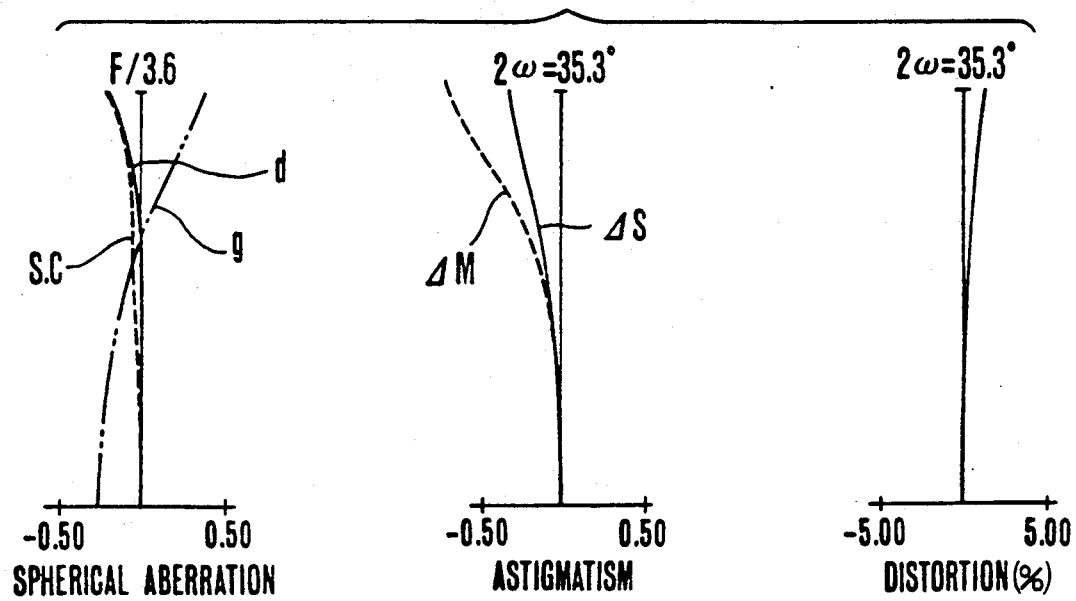

Another embodiment of the zoom lens according to the invention is next described wherein particular attention is paid to the amount of movement of each lens unit so that an advance in compactness is achieved. FIG. 30, FIG. 31 and FIG. 32 are lens block diagrams of specific examples 15, 16 and 17 of the invention respectively. In these figures, (A) and (B) represent the zooming positions for the wide angle and telephoto ends respectively. The zoom lens comprises a first lens unit I of negative power, a second lens unit II of positive power and a third lens unit III of negative power with their directions of movement during zooming being indicated by the respective arrows.

In these embodiment, the first and third lens units each have at least one positive and one negative lenses, and the second lens unit has a plurality of positive lenses and at least one negative lens.

Further, in order to construct such a zoom lens in compact form as the photographic lens, the invention sets forth the following conditions:

$$0.27Z < M1/M3 < 0.5Z \quad (17)$$

$$0.3Z < M2/M3 < 0.47Z \quad (18)$$

$$1.8 < e1W/e1T < 11.0 \quad (19)$$

where Z is the zoom ratio, Mi is the zooming movement of the i-th lens from the wide angle to the telephoto end, and e1W and e1T are the interval distances between the first and second lens units in the wide angle and telephoto ends respectively.

The zoom lens according to this embodiment is constructed from three lens units of predetermined refractive powers. When zooming to the wide angle end, the zoom lens takes fundamentally the retrofocus type, and when to the telephoto end, the telephoto type. For this purpose, the refractive powers of all the lens units and their zooming movements are determined so as to satisfy the above-defined rules of design. As a result, the total zooming movement of the third lens unit is longer than any of those of the first and second lens units.

Further, the first, second and third lens units all are made axially to move independently of each other in such a manner that when in the telephoto end, each of them takes a more front position than when in the wide angle end, thereby giving an advantage of shortening the entire lens system.

Another feature according to the embodiments shown in FIG. 30–FIG. 32 is that during zooming, the first lens unit is moved non-linearly, while the second and third lens units are moved linearly, and the relation in which they move is made so that the axial separations between the first and second lens units and between the second and third lens units each is narrower when in the telephoto end than when in the wide angle end. This enables the prescribed zoom ratio to be obtained with ease and the variation with zooming of the aberrations to be corrected well.

It should be noted that in this embodiment, the non-linear zooming movement may be given, instead of to the first lens unit, either to the second lens unit or to the third lens unit.

Next, the technical significance of each of the above-defined conditions is explained.

The condition (17) concerns with the ratio of the amounts of movement of the first and third lens units when zooming, and is to move the third lens unit at a faster speed than the first lens unit, whereby the total length of the lens is prevented from increasing when the prescribed zoom ratio is obtained.

When the total zooming movement of the first lens unit is larger than the upper limit, the total length of the lens in the telephoto end becomes much too long. When the lower limit is exceeded by decreasing the movement of the first lens unit or increasing the movement of the third lens unit, the separations between the first and second lens units and between the second and third lens units in the telephoto end each are much too short. To avoid this, in the wide angle end, they must be widened. As a result, the total length of the lens in the wide angle end is increased objectionably.

The condition (18) concerns with the ratio of the zooming movements of the second and third lens units, and cooperates with the condition (17) to shorten the total lengths of the lens for the wide angle and telephoto ends into a good balance, while securing the prescribed zoom ratio.

When the movement of the second lens unit is much too large compared with the third lens unit so as to be beyond the upper limit, the first and second lens units come too close to each other in the telephoto end. When the lower limit is exceeded, as the movement of the third lens unit becomes much too large, by now, the second and third lens units come too close to each other. For this reason, the separations between successive two of each of the lens units must be sufficiently largely secured in the wide angle end. This leads to increase the total length of the lens objectionably.

The condition (19) concerns the ratio of the principal point interval distances between the first and second lens units in the wide angle and telephoto ends, and is given particularly for the purpose of maintaining the total length of the lens in good balance over the entire zooming range, provided the refractive powers of the first and second lens units are preserved at the predetermined values.

When the upper limit is exceeded, the movement of the second lens unit is so much restricted that the prescribed zoom ratio becomes difficult to secure. When the lower limit is exceeded, the total length of the lens in the telephoto end increases so much that the size of the entire lens system becomes difficult to minimize.

The invention has the above-defined various conditions sufficient for achieving a high performance compact zoom lens. Yet, to achieve a further reduction of the variation with zooming of aberrations for stability of high optical performance throughout the entire zooming range, the invention sets forth the following additional conditions:

$$0.018|f1| < (e1W-e1T)/Z < 0.166|f1| \quad (20)$$

$$0.3 < f2/fw < 0.66 \quad (21)$$

$$0.6 < |f3/fw| < 2.0 \quad (22)$$

where fi is the i-lens unit counting from front, and fw is the shortest focal length of the entire lens system.

The condition (20) concerns the ratio of the negative refractive power of the first lens unit, to the difference between the principal point interval distances for the wide angle and telephoto ends between the first and second lens units, and is given particularly for the purpose of obtaining the prescribed zoom ratio with ease although the first lens unit also is moved axially during zooming, while still permitting the variation of aberrations to be minimized.

When the upper limit is exceeded, despite the zoom ratio being rather small, the total length of the lens becomes too much long. When the lower limit is exceeded, the refractive powers of the second and third lens units must be strengthened. This causes the image surface characteristics to be worsened, and particularly the tendency toward under-correction to be intensified objectionably.

The condition (21) concerns the refractive power of the second lens unit. When the refractive power is so strong as to be beyond the lower limit, the range of variation of aberration with zooming becomes so large that particularly the spherical aberration on the telephoto side is difficult to correct well. When the refractive power of the second lens unit is so weak as to be beyond the upper limit, the total length of the lens is increased objectionably.

The condition (22) concerns the proportion of the refractive power of the third lens unit and cooperates with the condition (17) to permit the refractive power arrangement to be made symmetric over the entire lens system. This enables the image aberrations, particularly distortion, to be well corrected. When the refractive, power of the third lens unit is so strong as to be beyond the lower limit of the condition (22), good symmetry of the refractive power arrangement becomes difficult to maintain. Also, the magnification varying function of the second lens unit is weakened. Further the degree of responsiveness of the second lens unit is increased objectionably.

When the upper limit of the condition (22) is exceeded, the refractive power of the third lens unit becomes too weak to maintain the refractive power arrangement at good symmetry. At the same time, the telephoto ratio in the longest focal length positions becomes so large as to increase the total length of the lens objectionably.

Another feature of this embodiment is that the arrangement of each of the lens units is specified as follows: When zooming from the wide angle to the telephoto end, the image magnification of the second lens unit is made always negative, and the image magnification of every lens unit is always increasing within a range which does not exceed unity.

Particularly for the second lens unit, letting its image magnifications in the wide angle and telephoto ends be denoted by $\beta 2W$ and $\beta 2T$ respectively, the following condition is satisfied:

$$1.05 < \beta 2T/\beta 2W < 1.8 \quad (23)$$

When the lower limit of the condition (23) is exceeded, it implies that the second lens unit either minifies, or does not magnify at any rate, and the total zooming movement of the third lens unit is caused to increase to compensate for that. Because of this, the diameter of the third lens unit must be increased. In addition thereto, the total length of the entire lens system is caused to increase improperly. When the upper limit is exceeded, the movement of the first lens unit is so large that as it comes too close to the first lens unit in the telephoto end the prescribed zoom ratio becomes difficult to secure.

Another feature of this embodiment is that when zooming from the wide angle to the telephoto end, the image magnification of the third lens unit always takes positive values falling within a range which exceeds unity.

In particular, letting the image magnifications of the third lens unit in the wide angle and telephoto ends be denoted by $\beta 3W$ and $\beta 3T$ respectively, the following condition is to be satisfied:

$$1.05 < \beta 3T/\beta 3W < 2.7 \tag{24}$$

When the lower limit of the condition (24) is exceeded, the total zooming movement of the first lens unit is increased objectionably. When the upper limit is exceeded, the relative movement of the second and third lens units is increased objectionably.

To obtain good stability of aberration correction over the entire zooming range with the limitation of the total length of the lens to be a minimum, it is desired that the first lens unit is included with at least one meniscus-shaped positive lens of forward convexity, and the third lens unit with at least one meniscus-shaped positive lens of rearward convexity, particularly for correction of distortion on the wide angle side.

As to the second lens unit, it is desired that it has a positive lens whose front surface is convex toward the front, a positive meniscus lens, a bi-concave lens and a bi-convex lens, totalling four lenses, arranged in this order from the front. The use of such a construction and arrangement of the lens elements enables the principal point of the second lens unit to be positioned on the object side, thus making it possible to shorten the total length of the lens with ease.

Also, it is preferred that the refractive index of the negative lens in the second lens unit denoted by N2N lies within the following range $$N2N > 1.7 \tag{25}$$

If it falls outside this range, over-correction of image surface characteristics results. The spherical aberration also is unduly under-corrected.

Further, it is desired to introduce into at least one lens surface in the first lens unit an aspheric surface whose refracting power if positive becomes progressively weaker, or if negative stronger, toward the margin of the lens. The use of such a configuration enables the under-corrected spherical aberration of the second lens unit to be corrected well.

It is also desired to introduce into at least one lens surface in the third lens unit an aspheric surface whose refracting power if negative becomes progressively weaker, or if positive stronger, toward the margin of the lens, thereby it being made possible to well correct the pincushion type distortion which the third lens unit is liable to produce.

It should be noted in the embodiments of the invention that for focusing from an infinitely distant object to objects at shorter distances, though moving first lens unit is advantageous at a lesser variation of aberrations, the second or third lens unit may be moved instead. Also, the entire lens system may be moved as a whole.

The diaphragm which moves along with the second lens unit is preferably positioned behind it with an advantage that the structure of construction of the lens mounting mechanism can be simplified.

Examples 15 to 17 of specific zoom lenses of the invention can be constructed in accordance with the numerical data given below. In these examples 15 to 17, Ri is the radius of curvature of the i-th lens surface counting from front, Di is the i-th lens thickness or air separation counting from front, and Ni and $\nu i$ are the refractive index and Abbe number of the glass of the i-th lens element counting from front. An equation for the aspherical surface in coordinates with the X-axis in the optical axis, and Y-axis in the direction perpendicular to the optical axis with the original point at the vertex on the optical axis, the direction in which light advances being taken as positive, is given by the following expression:

$$X = \frac{(1/R) Y^2}{1 + \sqrt{1 - (Y/R)^2}} + a_1 Y^2 + a_2 Y^4 + a_3 Y^6 + a_4 Y^8 + a_5 Y^{10} + b_1 Y^3 + b_2 Y^5 + b_3 Y^7 + b_4 Y^9$$

where R is the radius of curvature of the paraxial region of the lens surface, and $a_1$, $a_2$, $a_3$, 4, $a_5$, $b_1$, $b_2$, $b_3$, and $b_4$ are the aspherical coefficients.

Also, the expression, for example, (D-03), stands for $10^{-3}$.

| Numerical Example 15: | | |
|---|---|---|
| F = 36~68 | FNo = 1:3.6~6.3 | $2\omega = 62° \sim 35.3°$ |
| R1 = −142.73 | D1 = 1.19 | N1 = 1.77250  $\nu$1 = 49.6 |
| R2 = 18.08 | D2 = 0.39 | |
| R3 = 15.84 | D3 = 3.50 | N2 = 1.64769  $\nu$2 = 33.8 |
| R4 = 43.89 | D4 = variable | |
| R5 = 24.09 | D5 = 2.83 | N3 = 1.57135  $\nu$3 = 53.0 |
| R6 = −60.56 | D6 = 0.09 | |
| R7 = 11.08 | D7 = 2.85 | N4 = 1.57135  $\nu$4 = 53.0 |
| R8 = 45.12 | D8 = 1.24 | |
| R9 = −48.60 | D9 = 2.01 | N5 = 1.84666  $\nu$5 = 23.9 |
| R10 = 12.04 | D10 = 1.16 | |
| R11 = 24.03 | D11 = 2.14 | N6 = 1.64769  $\nu$6 = 33.8 |
| R12 = −19.08 | D12 = 1.00 | |
| R13 = stop | D13 = variable | |
| R14 = 24.01 | D14 = 2.85 | N7 = 1.72825  $\nu$7 = 28.5 |
| R15 = −11.61 | D15 = 1.93 | |
| R16 = ∞ | D16 = 1.27 | N8 = 1.72000  $\nu$8 = 50.2 |
| R17 = −51.80 | | |

| | W | T |
|---|---|---|
| D4 | 5.89 | 0.99 |
| D13 | 8.88 | 2.17 |

| Aspherical Coefficients: | | |
|---|---|---|
| R2 | | |
| $a_1$ = 0.0 | $a_2$ = 9.55D-06 | $a_3$ = 1.66D-07 |
| $a_4$ = −1.38D-09 | $a_5$ = 9.50D-12 | |
| $b_1$ = 2.08D-05 | $b_2$ = −1.03D-08 | $b_3$ = 9.24D-11 |
| $b_4$ = 7.38D-12 | | |
| R16 | | |
| $a_1$ = −5.80D-02 | $a_2$ = −1.57D-04 | $a_3$ = −2.94D-07 |
| $a_4$ = −7.33D-09 | $a_5$ = 2.68D-12 | |
| $b_1$ = 7.37D-05 | $b_2$ = 1.11D-06 | $b_3$ = −1.10D-09 |
| $b_4$ = 3.74D-11 | | |

| Numerical Example 16: | | |
|---|---|---|
| f = 36~68 | FNo = 1:3.6~5.8 | $2\omega$ 62°~35.3° |

-continued

| | | |
|---|---|---|
| R1 = −95.46 | D1 = 1.50 | N1 = 1.77250  ν1 = 49.6 |
| R2 = 20.95 | D2 = 0.49 | |
| R3 = 18.75 | D3 = 3.58 | N2 = 1.64769  ν2 = 33.8 |
| R4 = 81.69 | D4 = variable | |
| R5 = 35.89 | D5 = 2.35 | N3 = 1.61484  ν3 = 51.2 |
| R6 = −64.22 | D6 = 0.09 | |
| R7 = 12.31 | D7 = 2.72 | N4 = 1.61484  ν4 = 51.2 |
| R8 = 48.28 | D8 = 1.12 | |
| R9 = −50.39 | D9 = 2.99 | N5 = 1.84666  ν5 = 23.9 |
| R10 = 13.68 | D10 = 1.29 | |
| R11 = 28.10 | D11 = 2.39 | N6 = 1.64769  ν6 = 33.8 |
| R12 = −20.04 | D12 = 1.00 | |
| R13 = stop | D13 = variable | |
| R14 = −29.71 | D14 = 3.20 | N7 = 1.68893  ν7 = 31.1 |
| R15 = −13.63 | D15 = 2.46 | |
| R16 = ∞ | D16 = 1.50 | N8 = 1.72000  ν8 = 50.2 |
| R17 = −60.50 | | |

| | W | T |
|---|---|---|
| D4 | 6.03 | 0.1 |
| D13 | 2.29 | 32.59 |

Aspherical Coefficient:

R2
| | | |
|---|---|---|
| $a_1$ = 0.0 | $a_2$ = 6.57D-06 | $a_3$ = 1.18D-08 |
| $a_4$ = 1.09D-09 | $a_5$ = 6.07D-12 | |
| $b_1$ = 0.0 | $b_2$ = 0.0 | $b_3$ = 0.0 |
| $b_4$ = 0.0 | | |

R16
| | | |
|---|---|---|
| $a_1$ = −4.93D-02 | $a_2$ = −8.85D-05 | $a_3$ = −2.19D-07 |
| $a_4$ = −1.44D-09 | $a_5$ = 8.51D-12 | |
| $b_1$ = 0.0 | $b_2$ = 0.0 | $b_3$ = 0.0 |
| $b_4$ = 0.0 | | |

Numerical Example 17:

| F = 36∼68 | FNo = 1:3.6∼6.3 | 2ω = 62°∼35.3° |
|---|---|---|

| | | |
|---|---|---|
| R1 = −65.83 | D1 = 1.21 | N1 = 1.72000  ν1 = 50.2 |
| R2 = 23.22 | D2 = 0.14 | |
| R3 = 16.92 | D3 = 2.55 | N2 = 1.68893  ν2 = 31.1 |
| R4 = 35.47 | D4 = variable | |
| R5 = 23.80 | D5 = 3.03 | N3 = 1.57135  ν3 = 53.0 |
| R6 = −48.05 | D6 = 0.19 | |
| R7 = 12.58 | D7 = 2.37 | N4 = 1.57135  ν4 = 53.0 |
| R8 = 42.04 | D8 = 0.70 | |
| R9 = −43.93 | D9 = 2.76 | N5 = 1.84666  ν5 = 23.9 |
| R10 = 14.15 | D10 = 0.74 | |
| R11 = 24.43 | D11 = 3.20 | N6 = 1.68893  ν6 = 31.1 |
| R12 = −20.77 | D12 = 1.00 | |
| R13 = stop | D13 = variable | |
| R14 = −21.46 | D14 = 2.82 | N7 = 1.59551  ν7 = 39.2 |
| R15 = −11.56 | D15 = 2.51 | |
| R16 = −1767.75 | D16 = 1.27 | N8 = 1.58913  ν8 = 61.0 |
| R17 = −69.54 | | |

| | W | T |
|---|---|---|
| D4 | 5.89 | 0.99 |
| D13 | 8.99 | 2.29 |

Aspherical Coefficients:

R3
| | | |
|---|---|---|
| $a_1$ = −7.89D-04 | $a_2$ = −1.93D-05 | $a_3$ = −1.07D-07 |
| $a_4$ = 5.91D-10 | $a_5$ = −9.75D-12 | |
| $b_1$ = −8.18D-06 | $b_2$ = 4.72D-07 | $b_3$ = −8.36D-09 |
| $b_4$ = 7.52D-11 | | |

R16
| | | |
|---|---|---|
| $a_1$ = −5.78D-02 | $a_2$ = −1.52D-04 | $a_3$ = −4.68D-07 |
| $a_4$ = −6.69D-10 | $a_5$ = −1.60D-10 | |
| $b_1$ = 3.88D-05 | $b_2$ = 1.04D-06 | $b_3$ = −3.58D-08 |
| $b_4$ = 7.55D-10 | | |

What is claimed is:

1. A compact zoom lens comprising, from front to rear, a first lens unit of negative power, a second lens unit of positive power, and a third lens unit of negative power, said first lens unit being fixed, said second lens unit and said third lens unit being moved while an axial space therebetween is changed to effect the zooming, said second and third lens units being made to move to perform variation of the image magnification, and said zoom lens satisfying the following condition:

$$0.5f_W < |f_3| < 4f_T$$

where $f_3$ is the focal length of said third lens units, and $f_W$ and $f_T$ are respectively the shortest and longest focal lengths of the entire lens system.

2. A zoom lens according to claim 1, satisfying the following conditions:

$$0.5 < f_2/f_W < 2$$

$$0.5f_W < |f_1| < 4f_T$$

$$0.25 < f_3/f_1 < 4$$

$$0 < e_{1T}/f_T < 0.3$$

where $f_1$ and $f_2$ are the focal lengths of said first and said second lens units respectively and $e_{1T}$ is the interval between the principal points of said first and said second lens units in the zooming position for the longest focal length.

3. A zoom lens according to claim 2, wherein said first lens unit includes at least one negative lens having its rear surface concave toward the rear, and at least one positive lens having its front surface convex toward the front.

4. A zoom lens according to claim 1, satisfying the following conditions:

$$0.5 < |f_1|/f_{23W} < 8$$

$$0.3 < f_{12T}/|f_3| < 4$$

$$0 < e_{2W}/e_{1W} < 3$$

$$0 < e_{1T}/e_{2T} < 0.8$$

where $f_{23W}$ is the overall focal length of said second and said third lens units in the wide angle end, $e_{1W}$ and $e_{2W}$ are the principal point intervals between said first and said second lens units and between said second and said third lens units respectively, $f_{12T}$ is the overall focal length of said first and said second lens units in the telephoto end and $e_{2T}$ is the principal point interval between said second and said third lens units in the telephoto end.

5. A zoom lens according to claim 1, satisfying the following conditions:

$$0.01 < |M_2|/(Z \cdot f_T) < 0.3$$

$$0.01 < |M_3|/(Z \cdot f_T) < 0.3$$

$$|M_2 - M_3|/(Z \cdot f_T) < 0.1$$

where $M_i$ is the movement of the i-th lens unit counting from front when zooming from the wide angle end to the telephoto end and Z is the zoom ratio.

6. A compact zoom lens comprising, from front to rear, a first lens unit of negative refractive power;

a second lens unit of positive refractive power; and
a third lens unit of negative refractive power, wherein variation of the image magnification is performed by varying the unit space between said first lens unit and said second lens unit and the unit space between said second lens unit and said third lens unit, and the following conditions are satisfied:

$$0.25 < E1w/E2w < 0.95$$

$$0.3 < |f3|/FT < 0.8$$

where E1w and E2w are the principal point intervals between said first and said second lens units and between said second and said third lens units in the wide angle end respectively, and f3 and FT are respectively the focal lengths of said third lens unit and the entire lens system in the telephoto end.

7. A compact zoom lens according to claim 6, wherein when zooming from the wide angle to the telephoto end, said second and said third lens units are moved axially forward in such relation that the amount of movement of said third lens unit is larger than that of movement of said second lens unit.

8. A compact zoom lens according to claim 7, satisfying the following condition:

$$0.6 < s/t < 0.9$$

where s and t are the total zooming movements of said second and said third lens units respectively.

9. A compact zoom lens according to claim 6, satisfying the following conditions:

$$0.5 < Lw/FT < 1.15$$

$$0.4 < |f1|/FT < 1.1$$

where f1 is the focal length of said first lens unit and Lw is the distance from the frontmost lens surface to an image plane.

10. A compact zoom lens comprising, from front to rear,
a first lens unit of negative refractive power;
a second lens unit of positive refractive power; and
a third lens unit of negative refractive power,
wherein variation of the image magnification is performed by varying the unit space between said first and said second lens units and the unit space between said second and said third lens units, and the following conditions are satisfied:

$$0.25 < E1w/E2w < 2$$

$$0.3 < |f3|/FT < 0.8$$

where E1w and E2w are the principal point interval distances between said first and said second lens units and between said second and said third lens units in the wide angle end respectively, and f3 and FT are the focal lengths of said third lens unit and the entire lens system in the telephoto end respectively.

11. A compact zoom lens according to claim 10, wherein when zooming from the wide angle to the telephoto end, said second and said third lens units are made to move axially forward in such relation that the amount of movement of said third lens unit is larger than that of movement of said second lens unit.

12. A compact zoom lens according to claim 11, satisfying the following condition:

$$0.6 < s/t < 0.9$$

where s and t are the total zooming movements of said second and said third lens units respectively.

13. A compact zoom lens according to claim 10, satisfying the following conditions:

$$0.5 < Lw/FT < 1.15$$

$$0.4 < |f1|/FT < 1.1$$

where f1 is the focal length of said first lens unit, and Lw is the distance from the frontmost lens surface to an image plane.

14. A compact zoom lens comprising, from front to rear,
a first lens unit of negative refractive power;
a second lens unit of positive refractive power; and
a third lens unit of negative refractive power,
wherein when zooming from the wide angle to the telephoto end, all said units are moved axially forward in such relation as to satisfy the following conditions:

$$0.27Z < M1/M3 < 0.5Z$$

$$0.3Z < M2/M3 < 0.47Z$$

where Z is the zoom ratio and Mi is the total zooming movement of the i-the lens unit, and wherein a unit space between said first lens unit and said second lens unit and a unit space between said second lens unit and said third lens unit are each smaller at the wide angle end than at the telephoto end.

15. A compact zoom lens according to claim 14, satisfying the following condition:

$$1.8 < e1W/e1T < 11.0$$

where e1W and e1T are the principal point intervals between said first and said second lens units in the wide angle and telephoto ends respectively.

16. A compact zoom lens according to claim 15, satisfying the following conditions:

$$0.018|f1| < (e1W-e1T)/Z < 0.166|f1|$$

$$0.3 < f2/fw < 0.66$$

$$0.6 < |f3/fw| < 2.0$$

where fi is the focal length of said i-th lens unit, and fw is the shortest focal length of the entire lens system.

17. A compact zoom lens according to claim 14, satisfying the following condition:

$$1.05 < \beta2T/\beta2W < 1.8$$

where $\beta2W$ and $\beta2T$ are the image magnifications of said second lens unit in the wide angle and telephoto ends respectively.

18. A compact zoom lens according to claim 17, satisfying the following condition:

$$1.05 < \beta3T/\beta3W < 2.7$$

where $\beta3W$ and $\beta3T$ are the image magnifications of said third lens unit in the wide angle and telephoto ends respectively.

19. A compact zoom lens comprising, from front to rear,
   a first lens unit of negative refractive power;
   a second lens unit of positive refractive power; and
   a third lens unit of negative refractive power,
wherein when zooming from the wide angle to the telephoto end, all said units are moved axially forward in such relation as to satisfy the following conditions:

$$0.27Z < M1/M3 < 0.5Z$$

where Z is the zoom ratio and Mi is the total zooming movement of the i-the lens unit, and i is the value 1, 2 or 3, and wherein a unit interval distance between said first lens unit and said second lens unit and a unit interval distance between said second lens unit and said third lens unit are each smaller at the wide angle end than at the telephoto end.

20. A compact zoom lens according to claim 19, which satisfies the condition:

$$0.3Z < M2/M3 < 0.47Z$$

wherein M2 is the movement amount of said second lens unit from the wide angle end to the telephoto end.

21. A compact zoom lens according to claim 20, satisfying the following conditions:

$$1.8 < e1W/e1T < 11.0$$

where e1W and e1T are the principal point intervals between said first and said second lens units in the wide angle and telephoto ends respectively.

22. A compact zoom lens according to claim 21, satisfying the following conditions:

$$0.018|f1| < (e1W - e1T)/Z < 0.166|f1|$$

$$0.3 < |f2/fw| < 0.66$$

$$0.6 < |f3/fw| < 2.0$$

where fi is the focal length of said i-th lens unit, and f2 is the shortest focal length of the entire lens system.

23. A compact zoom lens according to claim 19, satisfying the following condition:

$$1.05 < \beta2T/\beta2W < 1.8$$

where $\beta2W$ and $\beta2T$ are the magnifications of said second lens unit in the wide angle and telephoto ends respectively.

24. A compact zoom lens according to claim 23, satisfying the following condition:

$$1.05 < \beta3T/\beta3W < 2.7$$

where $\beta3W$ and $\beta3T$ are the image magnification of said third lens unit in the wide angle and telephoto ends respectively.

25. A compact zoom lens comprising, from front to rear,
   a first lens unit of negative refractive power;
   a second lens unit of positive refractive power; and
   a third lens unit of negative refractive power,
wherein when zooming from the wide angle to the telephoto end, all said units are moved axially forward in such relation as to satisfy the following conditions:

$$0.3Z < M2/M3 < 0.47Z$$

where Z is the zoom ratio and Mi is the total zooming movement of the i-th lens unit, and i has the value 1, 2 or 3.

26. A compact zoom lens according to claim 25, which satisfies the condition:

$$0.27Z \leq M1/M3 < 0.5Z.$$

27. A compact zoom lens according to claim 26, satisfying the following condition:

$$1.8 < e1W/e1T < 11.0$$

where e1W and e1T are the principal point interval distances between said first and said second lens units in the wide angle and telephoto ends respectively.

28. A compact zoom lens according to claim 27, satisfying the following conditions:

$$0.018|f1| < (e1W - e1T)/Z < 0.166|f1|$$

$$0.3 < |f2/fw| < 0.66$$

$$0.6 < |f3/fw| < 2.0$$

where fi is the focal length of said i-th lens unit, and f2 is the shortest focal length of the entire lens system.

29. A compact zoom lens according to claim 26, satisfying the following condition:

$$1.05 < \beta2T/\beta2W < 1.8$$

where $\beta2W$ and $\beta2T$ are the image magnifications of said second lens unit in the wide angle and telephoto ends respectively.

30. A compact zoom lens according to claim 29, satisfying the following conditions:

$$1.05 < \beta3T/\beta3W < 2.7$$

where $\beta3W$ and $\beta3T$ are the image magnifications of said third lens unit in the wide angle and telephoto ends respectively.

31. A compact zoom lens according to claim 25, satisfying the following conditions:

$$0.5 < f_2/f_W < 2$$

$$0.5 f_W < |f_1| < 4 f_T$$

$$0.25 < f_3/f_1 < 4$$

$$0 < e_{1T}/f_T < 0.3$$

where $f_1$ and $f_2$ are the focal lengths of said first and said second lens units respectively and $e_{1T}$ is the interval distance between the principal points of said first and said second lens units in the zooming position for the longest focal length.

32. A compact zoom lens according to claim 31, wherein said first lens unit includes at least one negative lens having its rear surface concave toward the rear, and at least one positive lens having its front surface convex toward the front.

33. A compact zoom lens according to claim 25, satisfying the following conditions:

$$0.5<|f_1|/f_{23W}<8$$

$$0.3<f_{12T}/|f3|<4$$

$$0<e_{2W}/e1W<3$$

$$0<e_{1T}/e_{2T}<0.8$$

where $f_{23W}$ is the overall focal length of said second and said third lens units in the wide angle end, $e_{1W}$ and $e_{2W}$ are the principal point interval distances between said first and said second lens units and between said second and said third lens units respectively, $f_{12T}$ is the overall focal length of said first and said second lens units in the telephoto end and $e_{2T}$ is the principal point interval distance between said second and said third lens units in the telephoto end.

34. A compact zoom lens according to claim 25, satisfying the following conditions:

$$0.01<|M_2|/(Z.f_T)<0.3$$

$$0.01<|M_3|/(Z.f_T)<0.3$$

$$|M_2-M_3|/(Z.f_T)<0.1$$

where Mi is the movement of the i-th lens units counting from front when zooming from the wide angle end to the telephoto end, Z is the zoom ratio and i has the value 1, 2 or 3.

35. A compact zoom lens comprising, from front to rear,
   a first lens unit of negative refractive power;
   a second lens unit of positive refractive power; and
   a third lens unit of negative refractive power,
wherein variation of the magnification is performed by varying the unit space between said first and said second lens units and the unit space between said second and said third lens units, and the following conditions are satisfied:

$$0.3<|f3|/FT<0.8$$

wherein f3 and T are the focal lengths of said third lens unit and the entire lens system in the telephoto end respectively, and wherein a unit space between said first lens unit and said second lens unit and a unit space between said second lens unit and said third lens unit are each smaller at the wide angle end than at the telephoto end.

36. A compact zoom lens according to claim 35 which satisfies the condition:

$$0.25<E1w/E2w<2$$

wherein E1w and E2w are the principal point interval distances between said first and said second lens units and between said second and said third lens units in the wide angle end respectively.

37. A compact zoom lens according to claim 36, wherein when zooming from the wide angle to the telephoto end, said second and said third lens units are made to move axially forward in such relation that the amount of movement of said third lens unit is larger than that of movement of said second lens unit.

38. A compact zoom lens according to claim 37, satisfying the following conditions:

$$0.5<Lw/FT<1.15$$

$$0.4<|f1|/FT<1.1$$

where f1 is the focal length of said first lens unit, and Lw is the distance from the frontmost lens surface to an image plane.

39. A compact zoom lens according to claim 36, satisfying the following conditions:

$$0.5<Lw/FT<1.15$$

$$0.4<|f1|/FT<1.1$$

where f1 is the focal length of said first lens unit, and Lw is the distance from the frontmost lens surface to an image plane.

40. A compact zoom lens according to claim 35, satisfying the following conditions:

$$0.5<f_2/f_W<2$$

$$0.5f_W<|f_1|<4f_T$$

$$0.25<f_3/f_1<4$$

$$0<e_{1T}/f_T<0.3$$

where $f_1$ and $f_2$ are the focal lengths of said first and said second lens units respectively and $e_{1T}$ is the interval between the principal points of said first and said second lens units in the zooming position for the longest focal length.

41. A compact zoom lens according to claim 40, wherein said first lens unit includes at least one negative lens having its rear surface concave toward the rear, and at least one positive lens having its front surface convex toward the front.

42. A compact zoom lens according to claim 35, satisfying the following conditions:

$$0.5<|f_1|/f_{23W}<8$$

$$0.3<f_{12T}/|f3|<4$$

$$0<e_{2W}/e1W<3$$

$$0<e_{1T}/e_{2T}<0.8$$

where $f_{23W}$ is the overall focal length of said second and said third lens units in the wide angle end, $e_{1W}$ and $e_{2W}$ are the principal point intervals between said first and said second lens units and between said second and said third lens units respectively, $f_{12T}$ is the overall focal length of said first and said second lens units in the telephoto end and $e_{2T}$ is the principal point interval distance between said second and said third lens units in the telephoto end.

43. A compact zoom lens according to claim 35, satisfying the following conditions:

$$0.01 < |M_2|/(Z \cdot f_T) < 0.3$$

$$0.01 < |M_3|/(Z \cdot f_T) < 0.3$$

$$|M_2 - M_3|/(Z \cdot f_T) < 0.1$$

where Mi is the movement of the i-th lens unit counting from front when zooming from the wide angle end to the telephoto end, Z is the zoom ratio and i has the value 1, 2 or 3.

44. A compact zoom lens comprising, from front to rear, a first lens unit of negative power, a second lens unit of positive power, and a third lens unit of negative power, said first lend unit being fixed, said second lens unit and said third lens unit being moved while an axial space therebetween is changed to effect the zooming, said second and third lens units being made to move to perform variation of the image magnification, and said zoom lens satisfying the following condition:

$$0.5 f_W < |f_3| < 4 f_T$$

where $f_3$ is the focal length of said third lens units, $f_W$ and $f_T$ are respectively the shortest and longest focal lengths of the entire lens system, and each of the lens units is composed of a plurality of lenses and the second lens unit has the smallest effective diameter.

45. A compact zoom lens according to claim 44, satisfying the following conditions:

$$0.5 < f_2/f_W < 2$$

$$0.5 f_W < |f_1| < 4 f_T$$

$$0.25 < f_3/f_1 < 4$$

$$0 < e_{1T}/f_T < 0.3$$

where $f_1$ and $f_2$ are the focal lengths of said first and said second lens units respectively and $e_{1T}$ is the interval between the principal points of said first and said second lens units in the zooming position for the longest focal length.

46. A compact zoom lens according to claim 45, wherein said first lens unit includes at least one negative lens having its rear surface concave toward the rear, and at least one positive lens having its front surface convex toward the front.

47. A compact zoom lens according to claim 44 satisfying the following conditions:

$$0.5 < |f_1|/f_{23W} < 8$$

$$0.3 < f_{12T}/|f_3| < 4$$

$$0 < e_{2W}/e_{1W} < 3$$

$$0 < e_{1T}/e_{2T} < 0.8$$

where $f_{23W}$ is the overall focal length of said second and said third lens units in the wide angle end, $e_{1W}$ and $e_{2W}$ are the principal point interval distances between said first and said second lens units and between said second and said third lens units respectively, $f_{12T}$ is the overall focal length of said first and said second lens units in the telephoto end and $e_{2T}$ is the principal point interval between said second and said third lens units in the telephoto end.

48. A compact zoom lens according to claim 44, satisfying the following conditions:

$$0.01 < |M_2|/(Z \cdot f_T) < 0.3$$

$$0.01 < |M_3|/(Z \cdot f_T) < 0.3$$

$$|M_2 - M_3|/(Z \cdot f_T) < 0.1$$

where Mi is the movement of the i-th lens units counting from front when zooming from the wide angle end to the telephoto end and Z is the zoom ratio, and i has the value 1, 2 or 3.

49. A compact zoom lens according to claim 44, which satisfies the condition:

$$0.25 < E1w/E2w < 2$$

wherein E1w and E2w are the principal point interval distances between said first and said second lens units and between said second and said third lens units in the wide angle end respectively.

50. A compact zoom lens according to claim 49, satisfying the following conditions:

$$0.5 < Lw/FT < 1.15$$

$$0.4 < |f1|/FT < 1.1$$

where f1 is the focal length of said first lens unit, and Lw is the distance from the frontmost lens surface to an image plane.

51. A compact zoom lens according to claim 50, satisfying the following condition:

$$0.6 < s/t < 0.9$$

where s and t are the total zooming movements of said second and said third lens units respectively.

52. A compact zoom lens comprising, from front to rear,
 a first lens unit of negative refractive power;
 a second lens unit of positive refractive power; and
 a third lens unit of negative refractive power, having a negative lens on the farthest image side;
 wherein variation of the image magnification is performed by varying the unit space between said first lens unit and said second lens unit and the unit space between said second lens unit and said third lens unit, and the following conditions are satisfied:

$$0.25 < f3/f1 < 4$$

wherein f1 and f3 are respectively a focal length of said first lens unit and said third lens unit.

53. A compact zoom lens according to claim 52, wherein said negative lens is of meniscus shape having a convex surface of the image side.

54. A magnification varying lens, comprising, from front to rear:
 a first lens unit of negative refractive power;
 a second lens unit of positive refractive power; and a third lens unit of negative refractive power, wherein variation of the image magnification is performed by varying a unit space between said first and said second lens units and a unit space between said second and said third lens units, and the following conditions are satisfied:

$$0.25 < E1w/E2w < 0.95$$

where E1w represents a principal point interval between said first lens unit and said second lens unit at a wide angle end of the whole system, and E2w represents a principal point interval between said second lens unit and said third lens unit at a wide angle end of the whole system.

55. A magnification varying lens according to claim 54, which further satisfies the condition:

$$0.5 < Lw/Ft < 1.15$$

wherein Lw represents the distance from a front most lens surface at the wide angle end to an image plane, and Ft represents a focal length at a telephoto end of the whole system.

56. A magnification varying lens according to claim 54, which further satisfies the condition:

$$0.1 < s/t < 0.9$$

wherein s and t represent respectively a movement amount of said second lens unit and said third lens unit with magnification variation from the wide angle end to the telephoto end.

57. A magnification varying lens according to claim 54, wherein a unit interval between said first lens unit and said second lens unit and a unit interval between said second lens unit and said third lens unit are each smaller at the wide angle end than at the telephoto end.

58. A magnification varying lens according to claim 57, wherein said first, second and third lens units each move forward when shifting from the wide angle end to the telephoto end.

59. A magnification varying lens comprising, from front to rear,
a first lens unit of negative refractive power;
a second lens unit of positive refractive power;
and a third lens unit of negative refractive power,
wherein variation of the image magnification is performed by varying a unit space between said first and said second lens units and a unit space between said second and said third lens units, and the following conditions are satisfied:

$$0.5 < Lw/FT < 1.15$$

$$0.6 < |f_3/Fw| < 2.0$$

wherein Lw represents a distance from a front-most lens surface at a wide angle end to an image plane, Fw, and FT represent respectively a focal length at the wide angle end and at the telephoto end, and f3 represents a focal length of said third lens unit.

60. A magnification varying lens unit according to claim 59, which further satisfies the condition:

$$1.05 < \beta 2T/\beta 2W < 1.8$$

wherein $\beta 2W$ and $\beta 2T$ represent an image magnification of said second lens unit respectively at the wide angle end and at telephoto end.

61. A magnification varying lens unit according to claim 60, which further satisfies the condition:

$$1.05 < \beta 3T/\beta 3W < 2.7$$

wherein $\beta 3W$ and $\beta 3T$ represent an image magnification of said third lens unit respectively at the wide angle end and at the telephoto end.

62. A magnification varying lens according to claim 59, wherein a unit interval between said first lens unit and said second lens unit and a unit interval between said second lens unit and said third lens unit are each smaller at the wide angle end than at the telephoto end.

63. A magnification varying lens according to claim 62, wherein said first, second and third lens unit each move forward when shifting from the wide angle end to the telephoto end.

64. A magnification varying lens comprising, from front to rear;
a first lens unit of negative refractive power,
a second lens unit of positive refractive power, and
a third lens unit of negative refractive power,
wherein the magnification variation from a wide angle end to a telephoto end is effected by reducing a unit interval between said first lens unit and said second lens unit and a unit interval between said second lens unit and said third lens unit, and the following condition is satisfied:

$$0.6 < |f_3/Fw| < 2$$

wherein Fw represents a focal length of the whole system at the wide angle end, and f3 represents a focal length of said third lens unit.

65. A magnification varying lens according to claim 64, wherein all of said lens units are located in a more forward position at the telephoto end than at the wide angle end.

66. A magnification varying lens according to claim 65, which further satisfies the condition:

$$0.5 < Lw/Ft < 1.15$$

wherein Lw represents the distance from a front most lens surface at the wide angle end to an image plane, and Ft represents a focal length at a telephoto end of the whole system.

67. A magnification varying lens according to claim 64, wherein a unit interval between said first lens unit and said second lens unit and a unit interval between said second lens unit and said third lens unit are each smaller at the wide angle end than at the telephoto end.

68. A zoom lens, comprising in the order from the object side;
a first lens unit having a negative refractive power and consisting of a negative lens and a positive lens arranged from the object side,
a second lens unit having a positive refractive power and consisting of a positive lens, a positive lens, a negative lens and a positive lens arranged from the object side, and
a third lens unit having a negative refractive power and consisting of a positive lens and a negative lens arranged from the object side,
wherein zooming from a wide angle side to a telephoto side is performed by moving at least the second and third lens units.

69. A zoom lens according to claim 68, wherein the negative lens of the first lens is of bi-concave shape and the positive lens of the first lens unit is of meniscus shape with a convex surface on the object side.

70. A zoom lens according to claim 68, wherein the negative lens of the first lens unit is of meniscus shape with a convex surface on the object side, and the positive lens of the first lens unit is of meniscus shape with a convex surface on the object side.

71. A zoom lens, comprising in the order from the object side:
   a first lens unit having a negative refractive power and consisting of a negative lens and a positive lens arranged from the object side,
   a second lens unit having a positive refractive power and consisting of a positive lens, a positive lens, a negative lens and a positive lens arranged from the object side, and
   a third lens unit having a negative refractive power, and consisting of a positive lens, a negative lens and a negative lens arranged from the object side, wherein zooming from a wide angle side to a telephoto side is performed by at least the second and third lens units.

72. A zoom lens according to claim 71, wherein the negative lens of the first lens unit is of bi-concave shape and the positive lens of the first lens unit is of meniscus shape with a convex surface on the object side.

73. A zoom lens according to claim 71, wherein the negative lens of the first lens unit is of meniscus shape with a convex surface on the object side and the positive lens of the second lens unit is of meniscus shape with a convex surface on the object side.

74. A zoom lens, comprising in the order from the object side:
   a first lens unit having a negative refractive power,
   a second lens unit having a positive refractive power, and the smallest effective diameter of the lens units comprising the zoom lens, and
   a third lens unit having a negative refractive power, wherein zooming is performed by moving all of the lens units.

75. A zoom lens according to claim 74, wherein the first lens unit comprises a negative lens that is of biconcave shape and a positive lens that is of meniscus shape with a convex surface on the object side.

76. A zoom lens according to claim 74, wherein the rearmost lens, from the object side, of the third lens unit has a negative refractive power.

77. A zoom lens, comprising in the order from the object side:
   a first lens unit having a negative refractive power, and comprising a negative lens and a positive lens arranged from the object side, and
   a second lens unit having a positive refractive power and the smallest effective diameter of the lens units comprising the zoom lens, and
   a third lens unit having a negative refractive power and comprising a negative lens and a positive lens arranged from the image side,
   wherein zooming is performed by moving all of the lens units.

* * * * *

UNITED STATES PATENT AND TRADEMARK OFFICE
CERTIFICATE OF CORRECTION

PATENT NO. : 5,270,866  Page 1 of 12
DATED : December 14, 1993
INVENTOR(S) : KOUJI OIZUMI ET AL.

It is certified that error appears in the above-identified patent and that said Letters Patent is hereby corrected as shown below:

On the title page:

Item [63]:

Under Related U.S Application Data, "Ser. No. 187;277" should read --Ser. No. 187,277--.

COLUMN 1

Line 25, "two-groups" should read --two-group--.

COLUMN 2

Line 34, "distance" should read --distances--.

COLUMN 3

Line 29, "view:" should read --views--.
Line 42, "respectively" should read --respectively.--.

UNITED STATES PATENT AND TRADEMARK OFFICE
CERTIFICATE OF CORRECTION

PATENT NO. : 5,270,866      Page 2 of 12

DATED : December 14, 1993

INVENTOR(S) : KOUJI OIZUMI ET AL.

It is certified that error appears in the above-identified patent and that said Letters Patent is hereby corrected as shown below:

Line 52, "firs±lens" should read --first lens--.
        Line 62, "two-groups" should read --two-group--.

COLUMN 4

Line 18, "lens-" should read --lens--.
        Line 28, "two-groups" should read --two-group--.
        Line 50, "(1)." should read --(1),--.
        Line 52, "large" should read --larger--.
        Line 63, "two-groups" should read --two-group--.

COLUMN 5

Line 13, "good" should read --goal--.
        Line 67, "as" should read --as to be--.

UNITED STATES PATENT AND TRADEMARK OFFICE
CERTIFICATE OF CORRECTION

PATENT NO. : 5,270,866
DATED : December 14, 1993
INVENTOR(S) : KOUJI OIZUMI ET AL.

It is certified that error appears in the above-identified patent and that said Letters Patent is hereby corrected as shown below:

COLUMN 6

Line 9, "because, as" should read --and because when--.
    Line 13, "takes" should read --takes on--.
    Line 16, "of" (first occurrence) should read --of distance-- and "of" (second occurrence) should read --for--.
    Line 24, "two-groups form of" should read --two-group form of--.
    Line 37, "distance" should read --distances--.

COLUMN 7

Line 13, "the a two-groups" should read --a two-group--.
    Line 61, "alone" should read --alone,--.

UNITED STATES PATENT AND TRADEMARK OFFICE
CERTIFICATE OF CORRECTION

PATENT NO. : 5,270,866      Page 4 of 12
DATED : December 14, 1993
INVENTOR(S) : KOUJI OIZUMI ET AL.

It is certified that error appears in the above-identified patent and that said Letters Patent is hereby corrected as shown below:

COLUMN 9

Line 68, "R2 = 50.90  D2 = 5.47" should read

-- $R_2$ = 50.90    $D_2$ = 5.47
    $R_3$ = 62.40    $D_3$ = 10.29    $N_2$ = 1.80518    $\nu_2$ = 25.4
    $R_4$ = 141.99    $D_4$ = Variable
    $R_5$ = 62.00    $D_5$ = 15.14    $N_3$ = 1.60311    $\nu_3$ = 60.7
    $R_6$ = -185.58    $D_6$ = 0.48
    $R_7$ = 38.74    $D_7$ = 14.17    $N_4$ = 1.60311    $\nu_4$ = 60.7
    $R_8$ = 261.41    $D_8$ = 1.08
    $R_9$ = -1584.44    $D_9$ = 8.47    $N_5$ = 1.84666    $\nu_5$ = 23.9
    $R_{10}$ = 31.16    $D_{10}$ = 4.41
    $R_{11}$ = 56.65    $D_{11}$ = 7.63    $N_6$ = 1.66680    $\nu_6$ = 33.0

UNITED STATES PATENT AND TRADEMARK OFFICE
CERTIFICATE OF CORRECTION

PATENT NO. : 5,270,866
DATED : December 14, 1993
INVENTOR(S) : KOUJI OIZUMI ET AL.

It is certified that error appears in the above-identified patent and that said Letters Patent is hereby corrected as shown below:

```
R12 = -218.25    D12 = Variable
R13 =  -38.16    D13 = 3.47    N 7 = 1.78590    ν 7 = 44.2
R14 =  -67.74    D14 = 8.70    N 8 = 1.58347    ν 8 = 30.2
R15 =  -45.96
```

R1: Aspheric Coefficients:

$A = 0$, $B = 1.890 \times 10^{-7}$, $C = -1.777 \times 10^{-11}$,
$D = 3.759 \times 10^{-15}$, $E = -1.143 \times 10^{-19}$ R2: Aspheric Coefficients:

$A = 0$, $B = 2.448 \times 10^{-7}$, $C = 2.527 \times 10^{-11}$,
$D = 5.550 \times 10^{-15}$, $E = -2.517 \times 10^{-19}$

UNITED STATES PATENT AND TRADEMARK OFFICE
CERTIFICATE OF CORRECTION

PATENT NO. : 5,270,866
DATED : December 14, 1993
INVENTOR(S) : KOUJI OIZUMI ET AL.

It is certified that error appears in the above-identified patent and that said Letters Patent is hereby corrected as shown below:

|     | f=100 | f=138.9 | f=212.7 |
|-----|-------|---------|---------|
| D 4 | 52.67 | 29.47   | 2.20    |
| D12 | 10.64 | 12.68   | 25.87   |

Table-1: The values of all the factors in the conditions for the numerical examples of zoom lenses of the invention:

UNITED STATES PATENT AND TRADEMARK OFFICE
CERTIFICATE OF CORRECTION

PATENT NO. : 5,270,866 Page 7 of 12
DATED : December 14, 1993
INVENTOR(S) : KOUJI OIZUMI ET AL.

It is certified that error appears in the above-identified patent and that said Letters Patent is hereby corrected as shown below:

| Factors | Numerical Examples | | | | | |
|---|---|---|---|---|---|---|
| | 1 | 2 | 3 | 4 | 5 | 6 |
| (1) $\|f_3\|/f_W$ $\|f_3\|/f_T$ | 1.63 0.861 | 2.54 1.35 | 1.20 0.634 | 2.26 1.19 | 2.75 1.46 | 1.13 0.532 |
| (2) $f_2/f_W$ | 0.753 | 0.770 | 0.719 | 0.726 | 0.757 | 0.573 |
| (3) $\|f_1\|/f_W$ $\|f_1\|/f_T$ | 1.71 0.907 | 1.45 0.769 | 1.70 0.901 | 1.26 0.668 | 1.37 0.726 | 1.06 0.497 |
| (4) $f_3/f_1$ | 0.950 | 1.75 | 0.703 | 1.79 | 2.01 | 1.07 |

UNITED STATES PATENT AND TRADEMARK OFFICE
CERTIFICATE OF CORRECTION

PATENT NO. : 5,270,866  
DATED : December 14, 1993  
INVENTOR(S) : KOUJI OIZUMI ET AL.

It is certified that error appears in the above-indentified patent and that said Letters Patent is hereby corrected as shown below:

| | | | | | | |
|---|---|---|---|---|---|---|
| (5) $e_{1T}/f_T$ | 0.0727 | 0.0723 | 0.0679 | 0.0785 | 0.0797 | 0.0618 |
| (6) $\|f_1\|/f_{23W}$ | 2.38 | 1.96 | 2.55 | 1.74 | 1.79 | 1.48 |
| (7) $f_{12T}/\|f_3\|$ | 0.723 | 0.537 | 0.919 | 0.594 | 0.492 | 0.871 |
| (8) $e_{2W}/e_{1W}$ | 1.38 | 1.41 | 1.47 | 1.19 | 1.13 | 0.546 |
| (9) $e_{1T}/e_{2T}$ | 0.210 | 0.173 | 0.188 | 0.176 | 0.207 | 0.26 |
| (10) $\|M_2\|/Z \cdot f_T$ <br> $\|M_3^2\|/Z \cdot f_T^T$ | 0.131 <br> 0.180 | 0.135 <br> 0.158 | 0.119 <br> 0.155 | 0.130 <br> 0.098 | 0.139 <br> 0.138 | 0.112 <br> 0.078 |
| (11) $\|M_2 - M_3\|/Z \cdot f_T$ | 0.049 | 0.023 | 0.036 | 0.032 | 0.001 | 0.034 |

UNITED STATES PATENT AND TRADEMARK OFFICE
CERTIFICATE OF CORRECTION

PATENT NO. : 5,270,866

DATED : December 14, 1993

INVENTOR(S) : KOUJI OIZUMI ET AL.

It is certified that error appears in the above-identified patent and that said Letters Patent is hereby corrected as shown below:

COLUMN 11

Line 9, "i-s" should read --is--.
Line 54, "o:" should read --of--.
Line 60, "respectively" should read --respectively,--.
Line 64, "made" should read --made to--.

COLUMN 12

Line 5, "as" should read --as to--.
Line 45, "lens" should read --lens,--.

COLUMN 17

Line 64, "Table 11" should read --Table II--.

UNITED STATES PATENT AND TRADEMARK OFFICE
CERTIFICATE OF CORRECTION

PATENT NO. : 5,270,866
DATED : December 14, 1993
INVENTOR(S) : KOUJI OIZUMI ET AL.

It is certified that error appears in the above-identified patent and that said Letters Patent is hereby corrected as shown below:

COLUMN 19

Line 54, "tions" should read --tions as--.

COLUMN 20

Line 37, "Further" should read --Further,--.

COLUMN 21

Line 42, "range" should read --range:--.

COLUMN 22

EXPL. 15, "R14 =24.01" should read --R14 = -24.01--.
Line 28, "$_4$," should read --$a_4$,--.

UNITED STATES PATENT AND TRADEMARK OFFICE
CERTIFICATE OF CORRECTION

PATENT NO. : 5,270,866
DATED : December 14, 1993
INVENTOR(S) : KOUJI OIZUMI ET AL.

It is certified that error appears in the above-identified patent and that said Letters Patent is hereby corrected as shown below:

COLUMN 23

EXPL. 16, "$a_5 = 6.07D-12$" should read --$a_5 = -6.07D-12$--.

COLUMN 24

Line 9, "units," should read --unit,--.
    Line 43, "$f_{23W}$is" should read --$f_{23W}$ is--.

COLUMN 27

Line 30, "conditions:" should read --condition:--.

COLUMN 28

Line 43, "conditions:" should read --condition:--.

UNITED STATES PATENT AND TRADEMARK OFFICE
CERTIFICATE OF CORRECTION

PATENT NO. : 5,270,866
DATED : December 14, 1993
INVENTOR(S) : KOUJI OIZUMI ET AL.

It is certified that error appears in the above-identified patent and that said Letters Patent is hereby corrected as shown below:

COLUMN 29

Line 41, "the magnification" should read --the image magnification--.
    Line 49, "T" should read --FT--.
    Line 56, "claim 35" should read --claim 35,--.

COLUMN 31

Line 13, "lend" should read --lens--.
    Line 47, "claim 44" should read --claim 44,--.

COLUMN 34

Line 7, "unit" should read --units--.
    Line 11, "rear;" should read --rear:--.
    Line 36, "front most" should read --frontmost--.
    Line 62, "first lens" should read --first lens unit--.

Signed and Sealed this

Twenty-eighth Day of April, 1998

*Attest:*

BRUCE LEHMAN

*Attesting Officer*     *Commissioner of Patents and Trademarks*